May 15, 1951     H. R. FREUND ET AL     2,552,882
PHOTOGRAPHIC TYPE COMPOSING MACHINE
Filed May 23, 1949     22 Sheets-Sheet 3
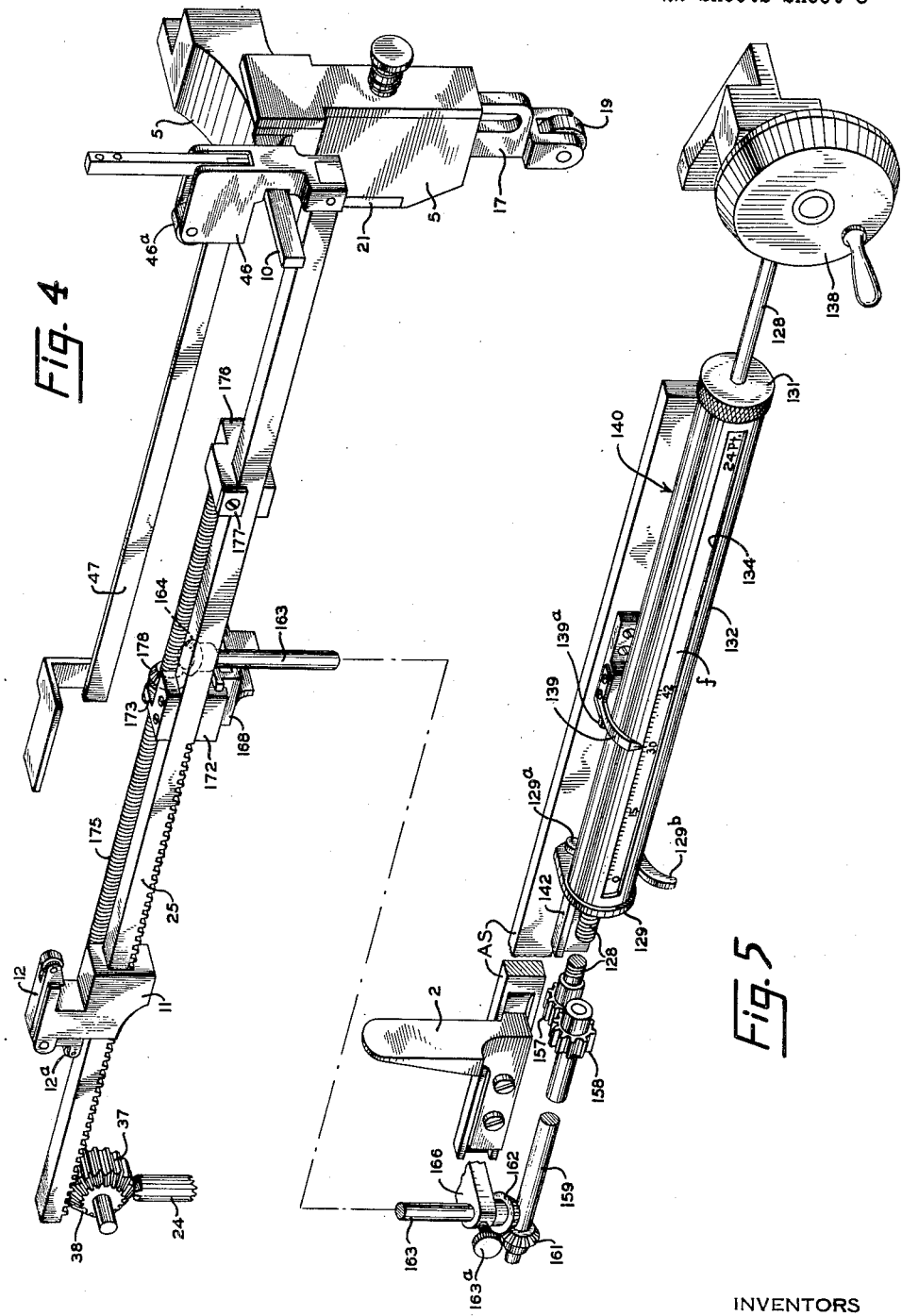
INVENTORS
HERMAN R. FREUND
FRITZ STADELMANN
BY
ATTORNEY

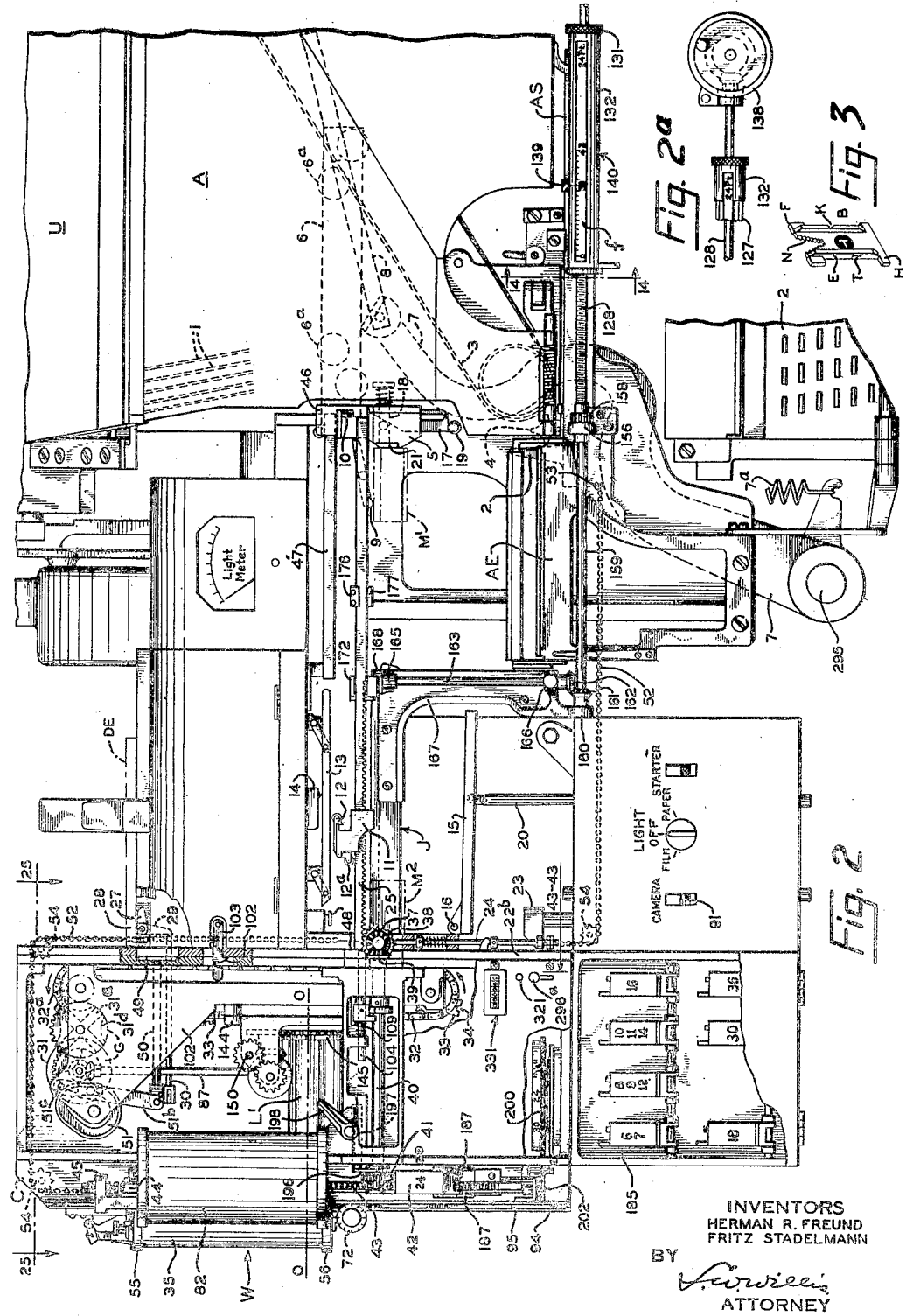

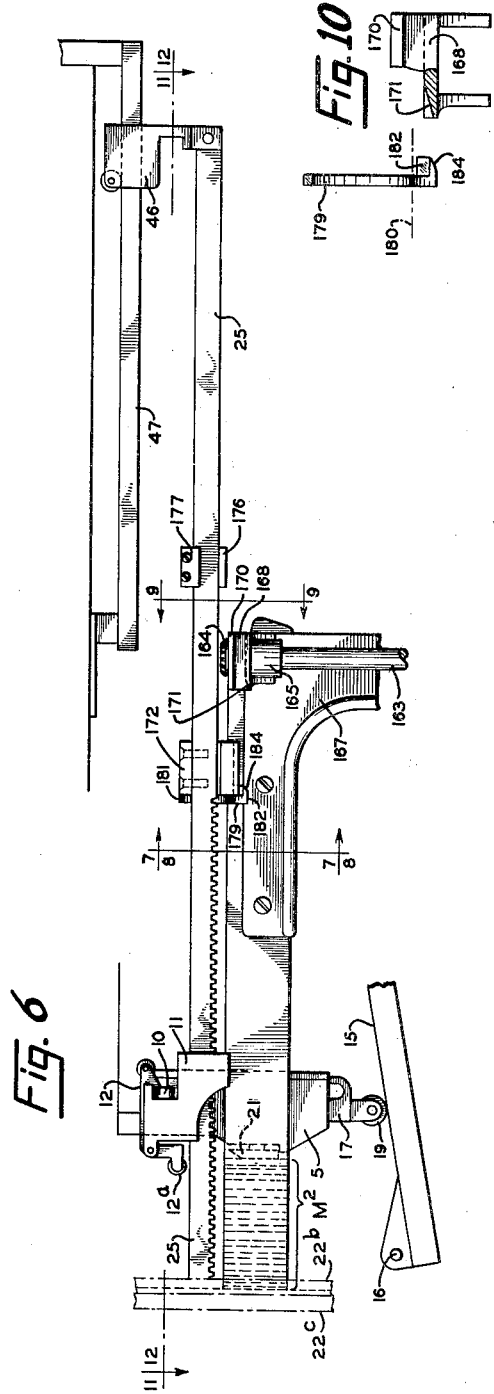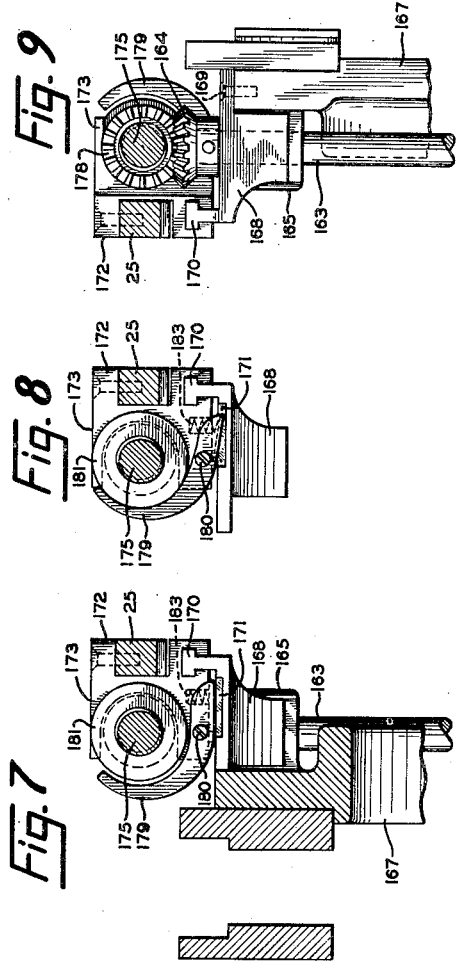

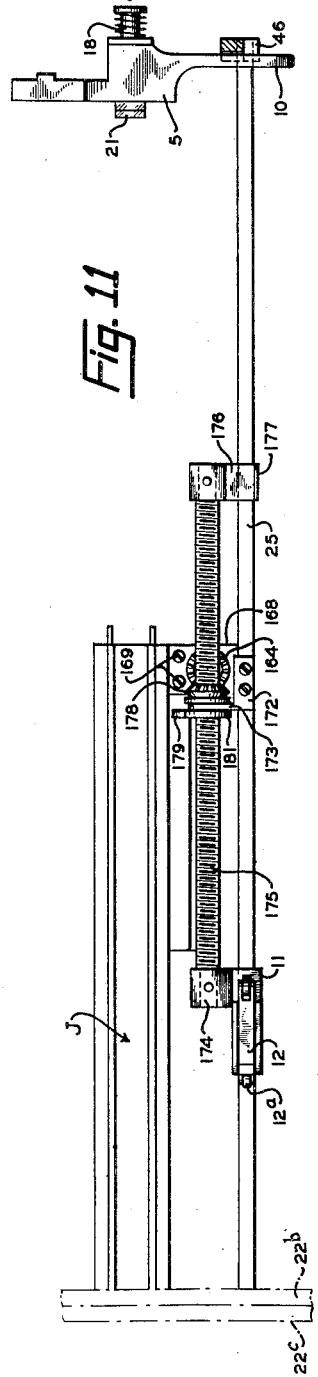
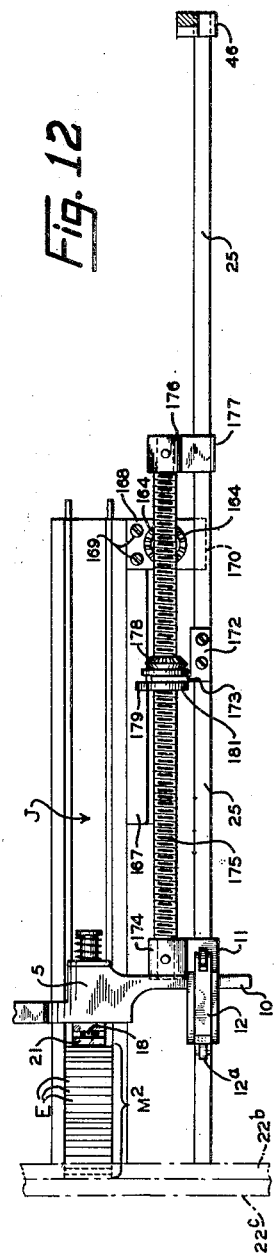
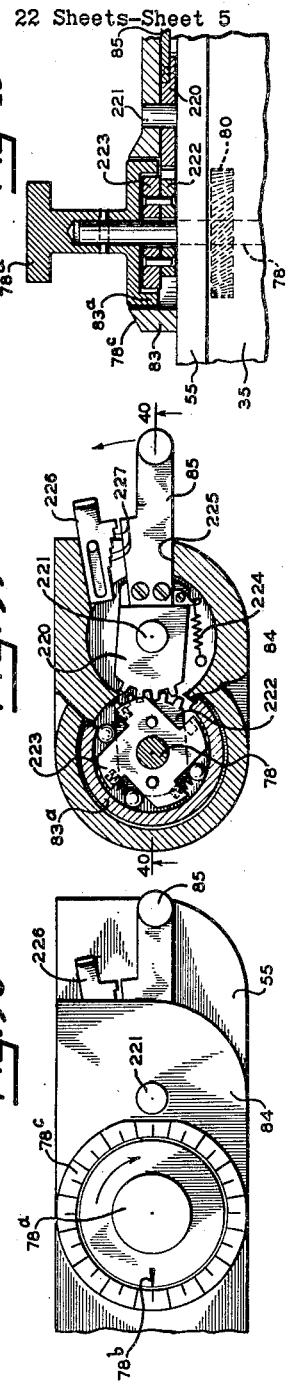
INVENTORS
HERMAN R. FREUND
FRITZ STADELMANN
BY
ATTORNEY May 15, 1951  H. R. FREUND ET AL  2,552,882
PHOTOGRAPHIC TYPE COMPOSING MACHINE
Filed May 23, 1949  22 Sheets-Sheet 6
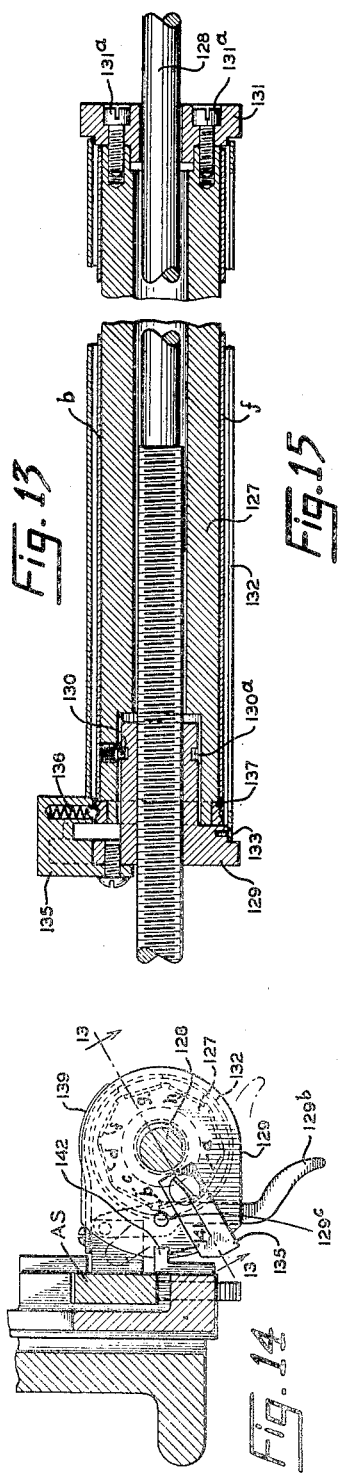
INVENTORS
HERMAN R. FREUND
FRITZ STADELMANN
BY
ATTORNEY

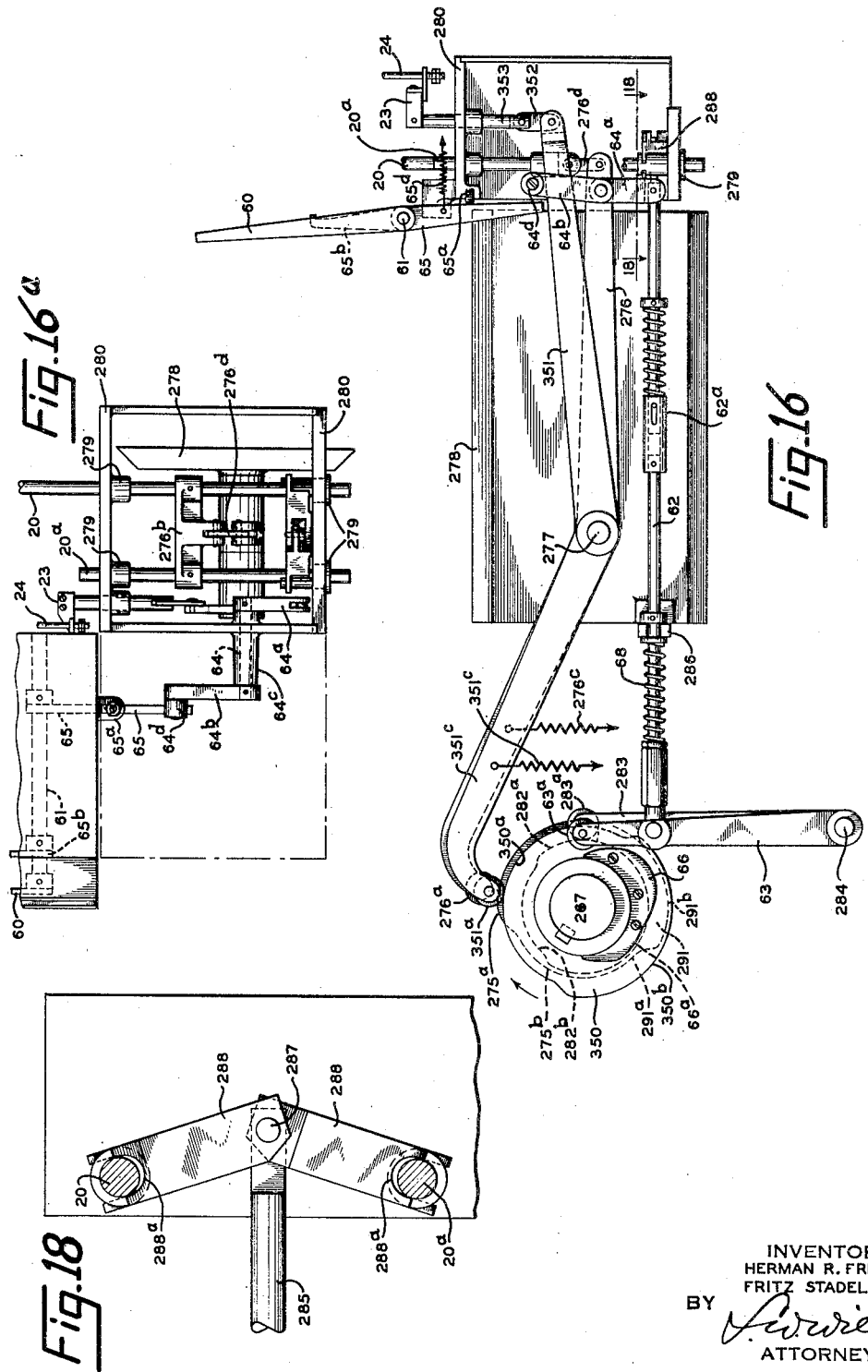

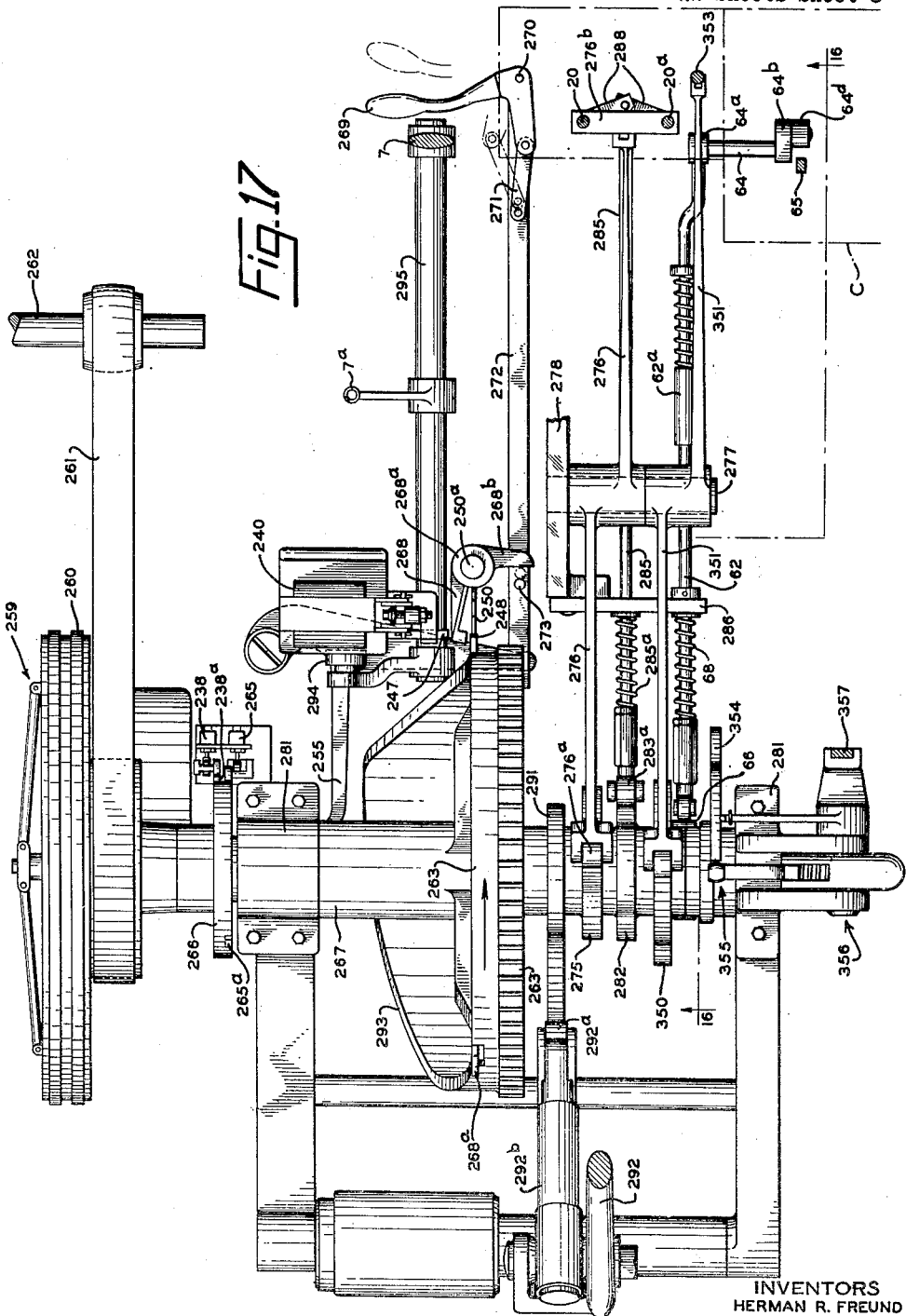

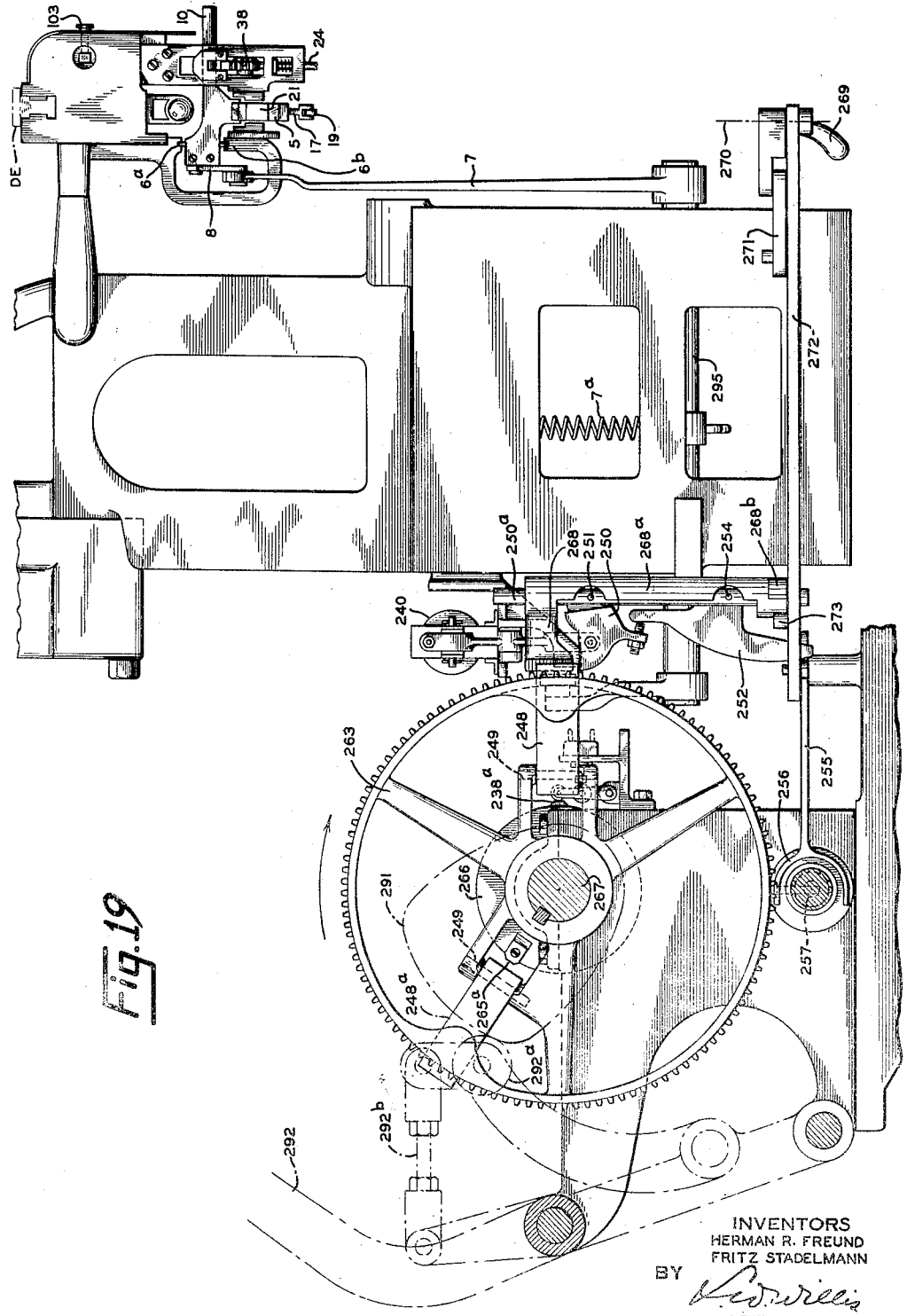

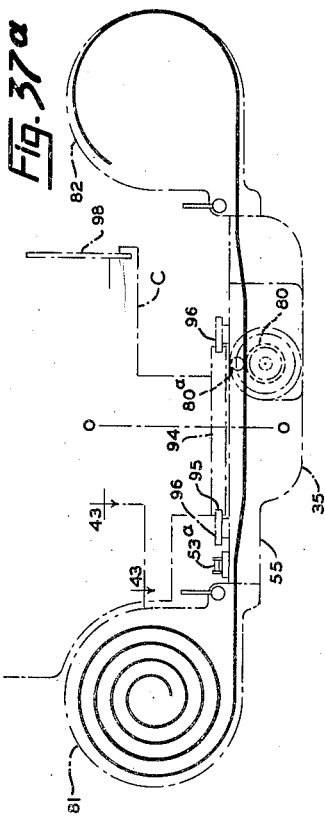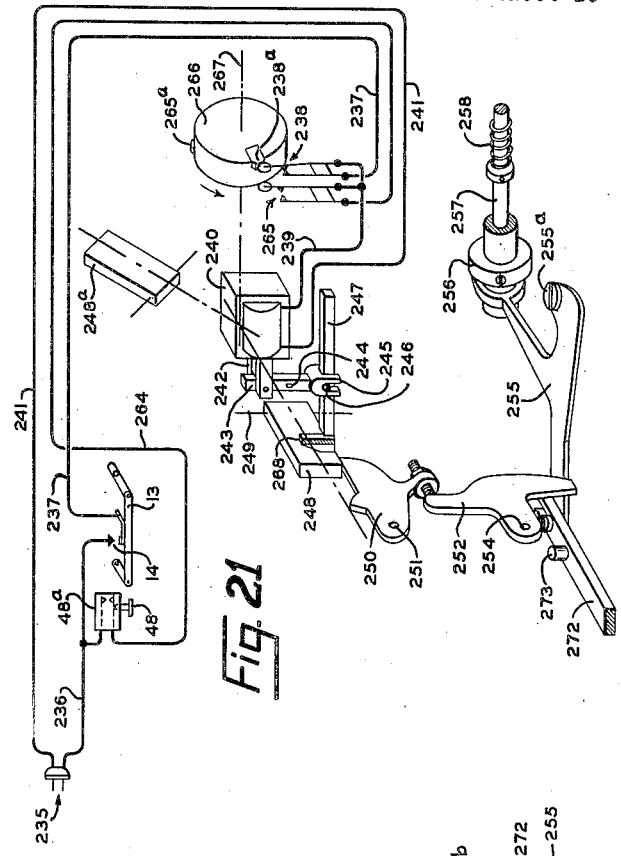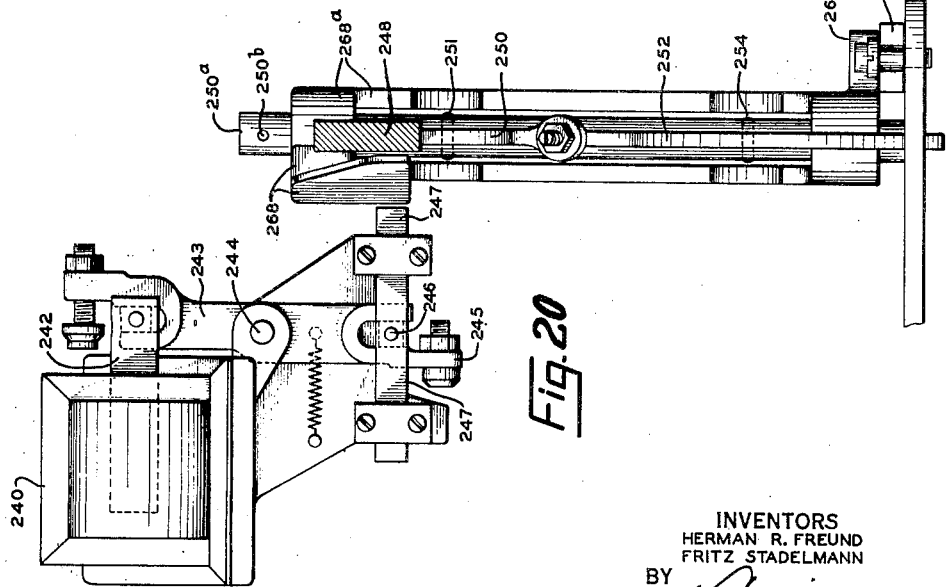

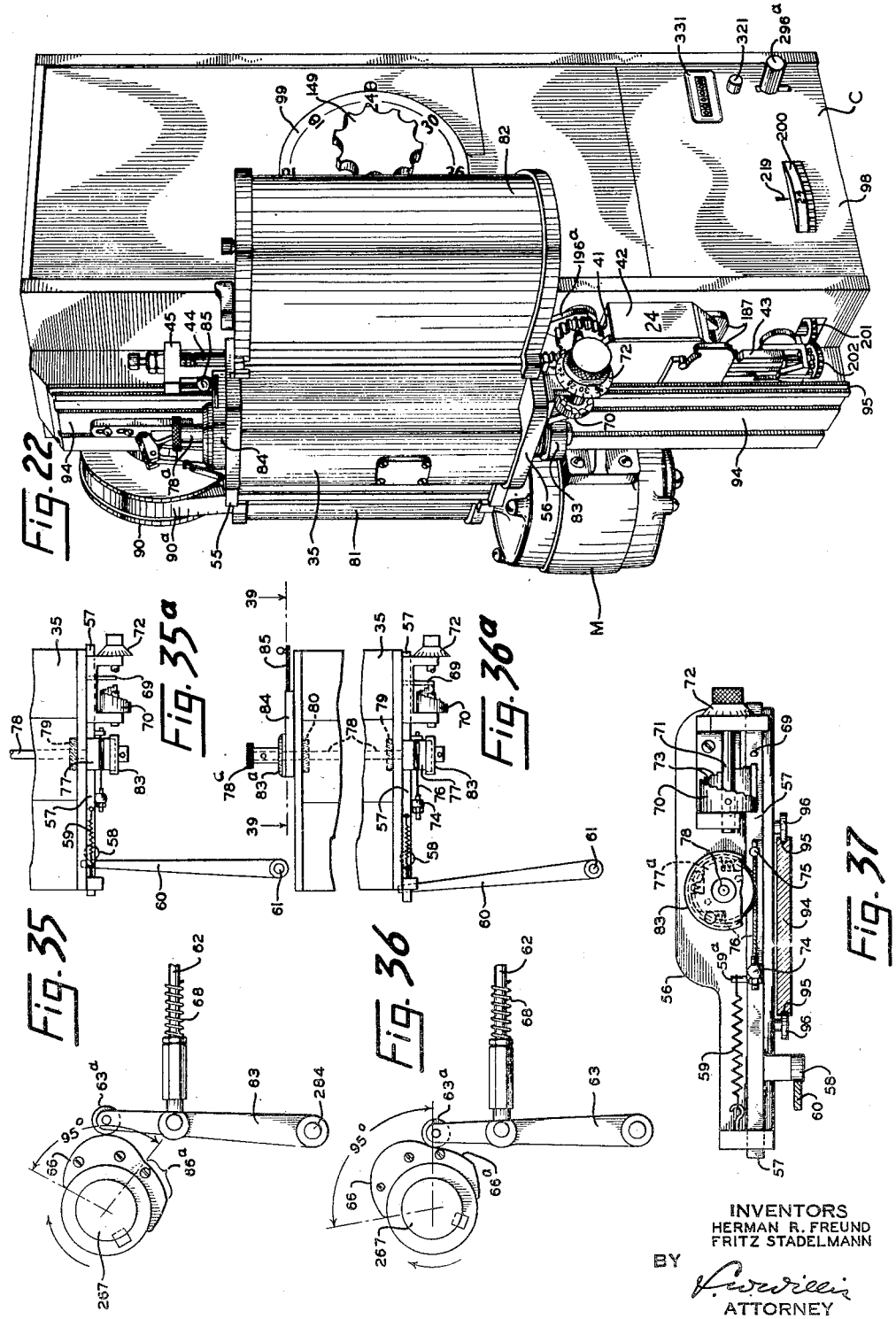

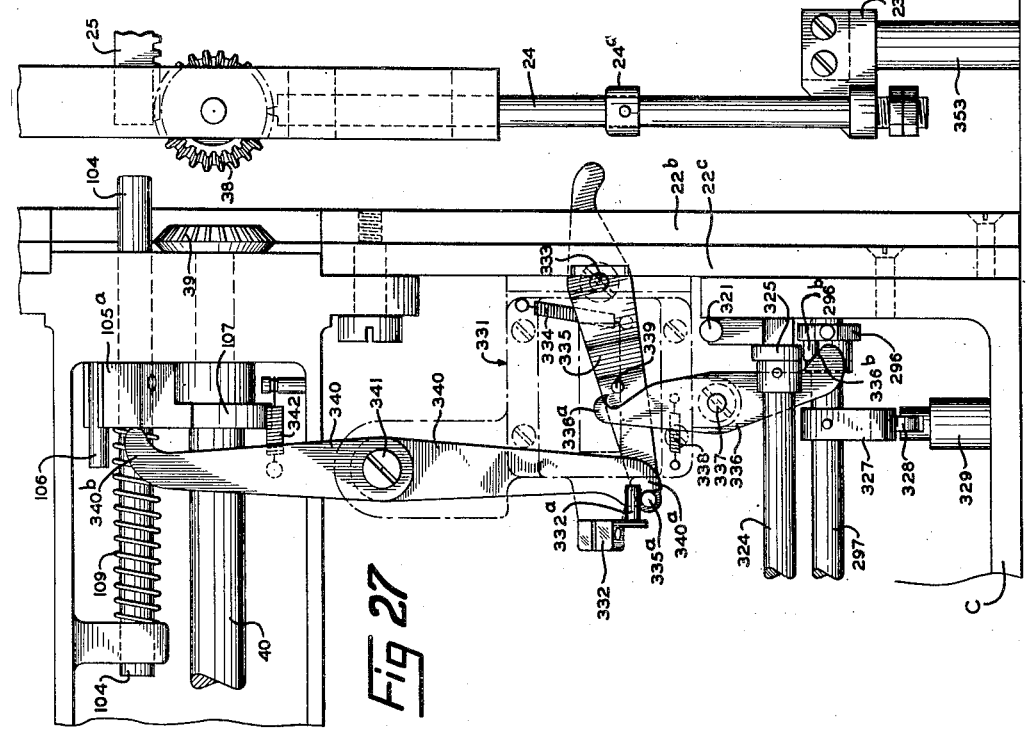
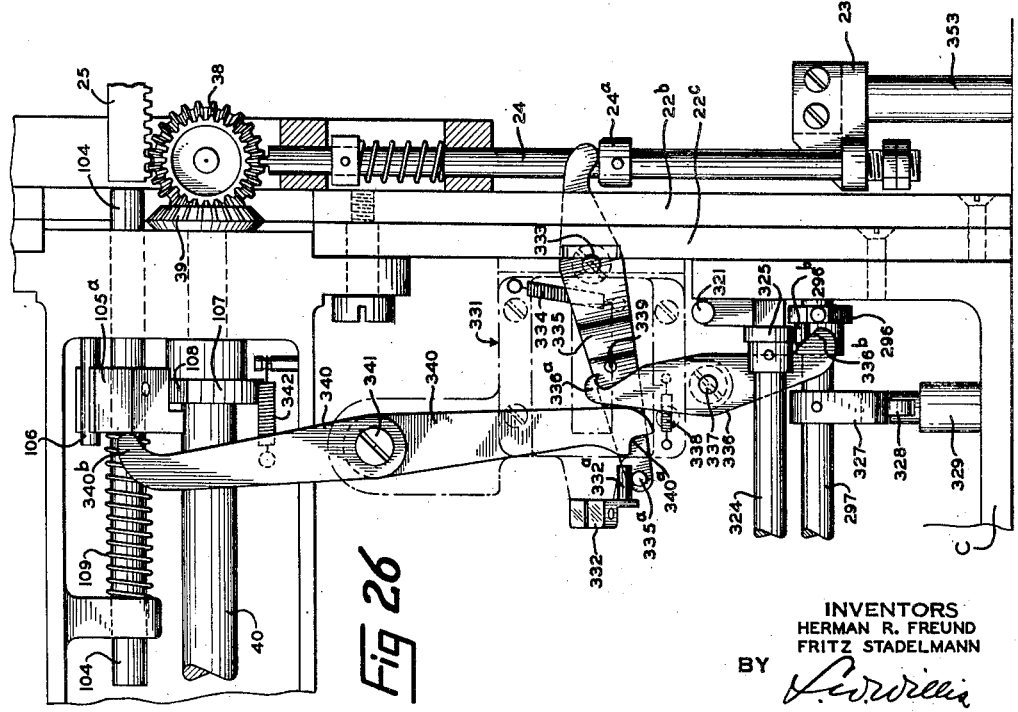

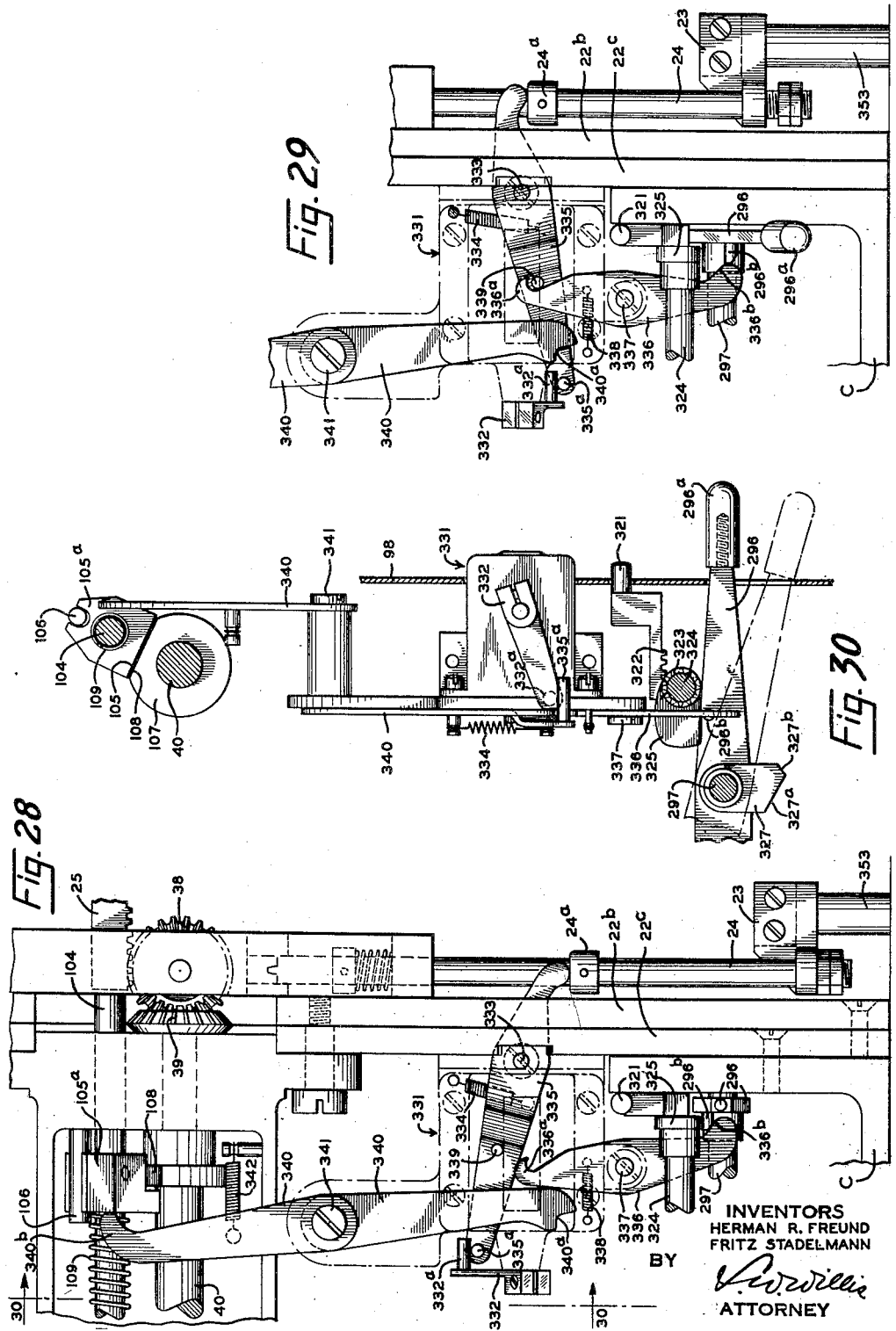

May 15, 1951 H. R. FREUND ET AL 2,552,882
PHOTOGRAPHIC TYPE COMPOSING MACHINE
Filed May 23, 1949 22 Sheets-Sheet 16
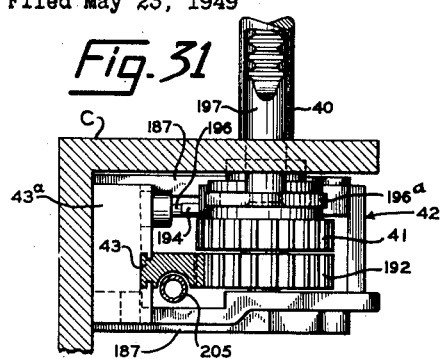
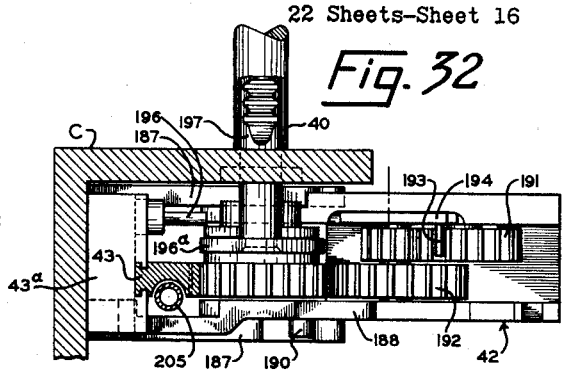
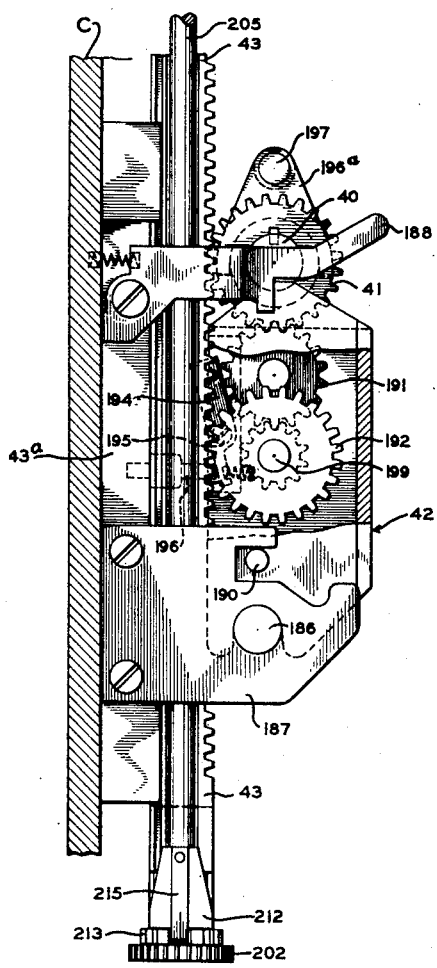
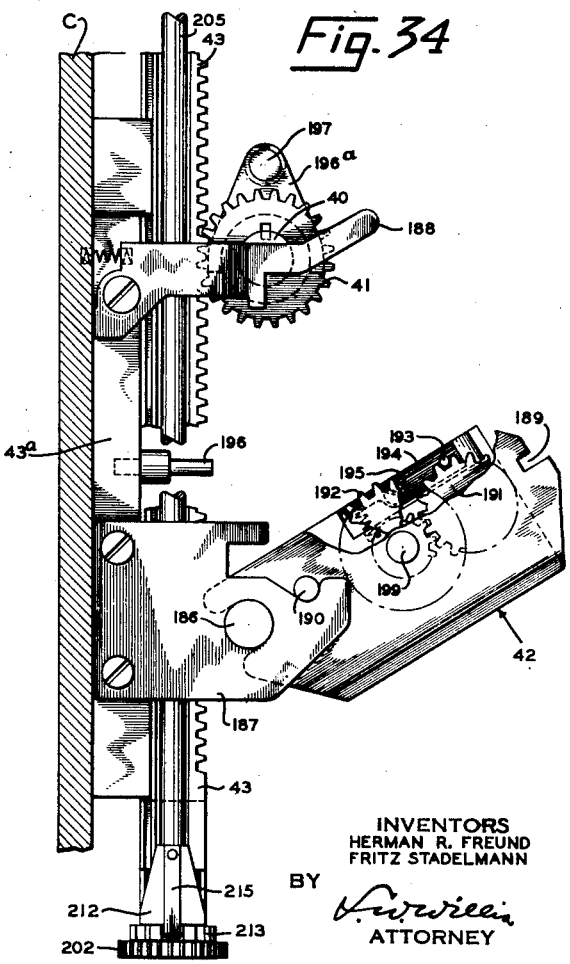
INVENTORS
HERMAN R. FREUND
FRITZ STADELMANN
BY
ATTORNEY May 15, 1951 — H. R. FREUND ET AL — 2,552,882
PHOTOGRAPHIC TYPE COMPOSING MACHINE
Filed May 23, 1949 — 22 Sheets-Sheet 17

INVENTORS
HERMAN R. FREUND
FRITZ STADELMANN
BY
ATTORNEY

May 15, 1951 H. R. FREUND ET AL 2,552,882
PHOTOGRAPHIC TYPE COMPOSING MACHINE
Filed May 23, 1949 22 Sheets-Sheet 18

INVENTORS
HERMAN R. FREUND
FRITZ STADELMANN
BY
ATTORNEY

May 15, 1951 H. R. FREUND ET AL 2,552,882
PHOTOGRAPHIC TYPE COMPOSING MACHINE
Filed May 23, 1949 22 Sheets-Sheet 19
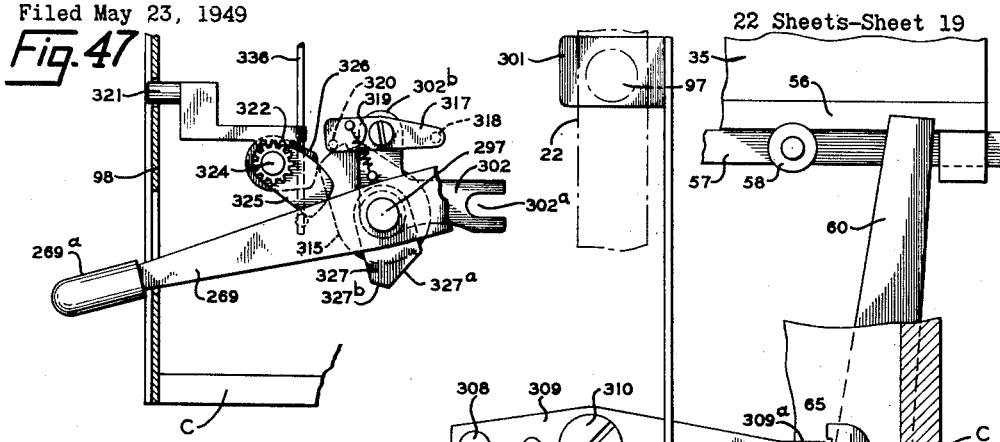
Fig. 47
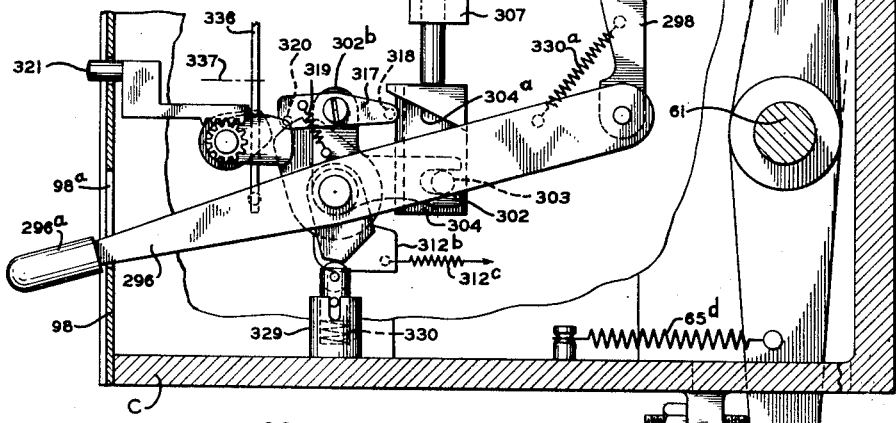
Fig. 44
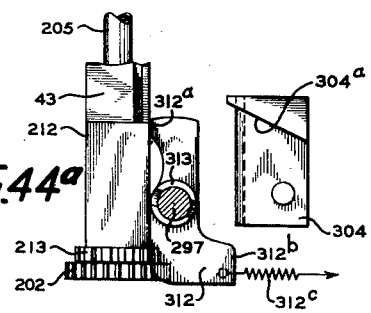
Fig. 44ᵃ
INVENTORS
HERMAN R. FREUND
FRITZ STADELMANN
BY
ATTORNEY

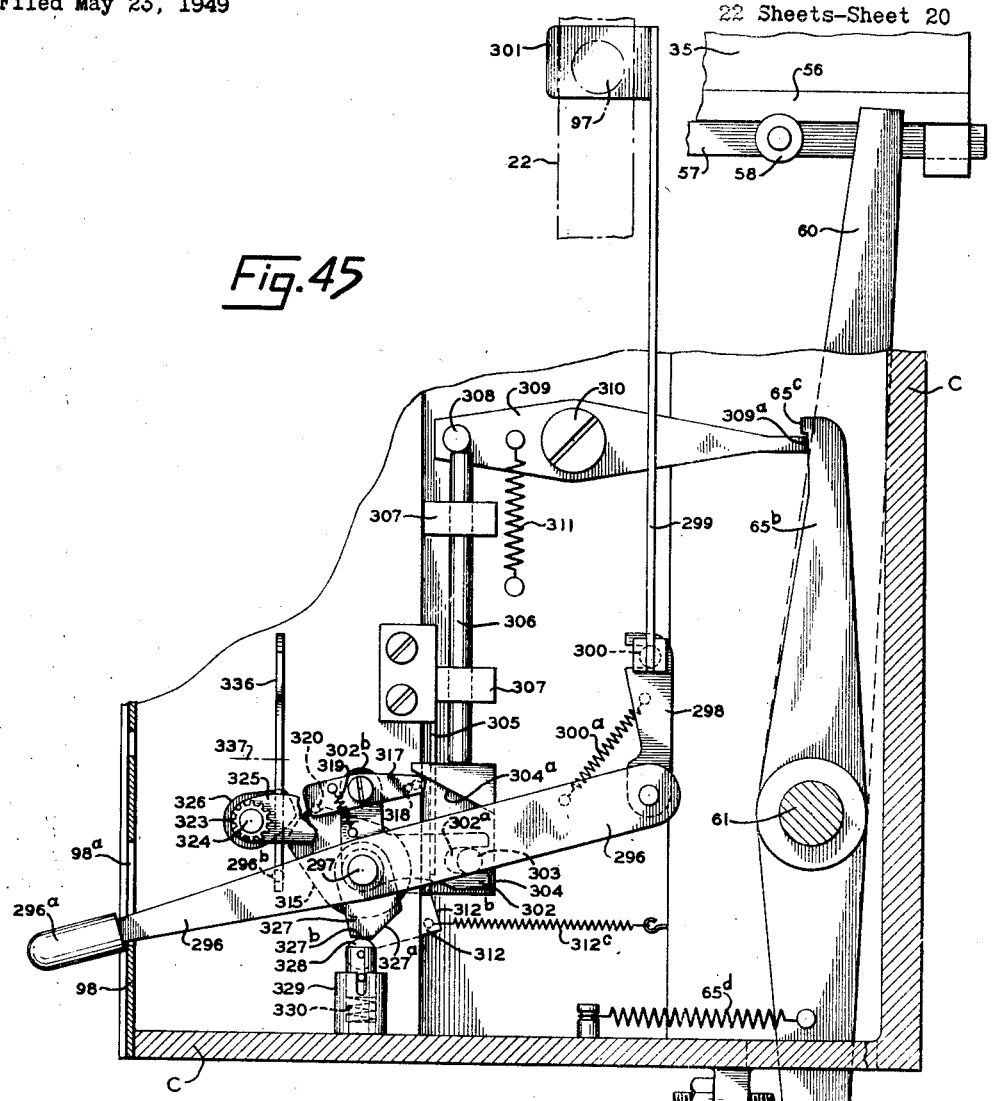
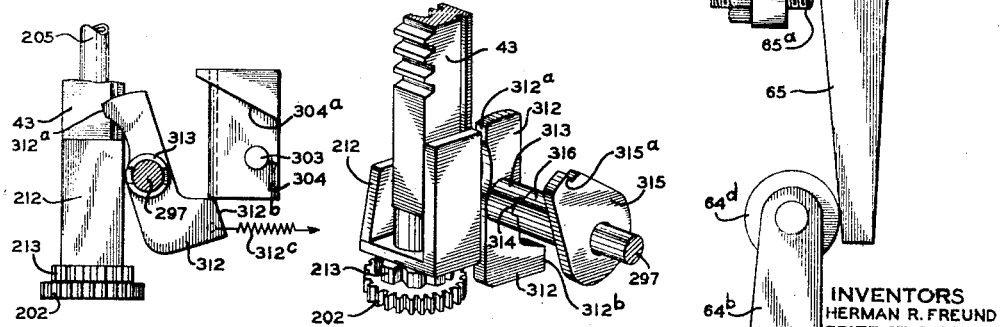

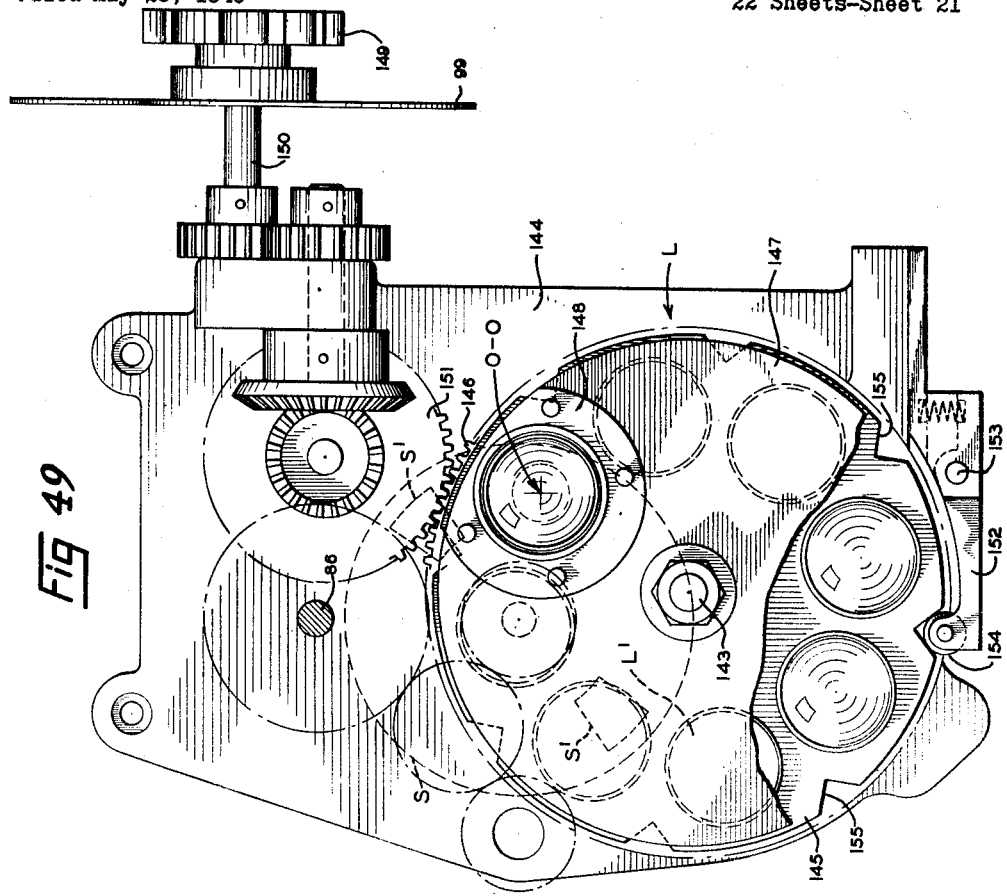

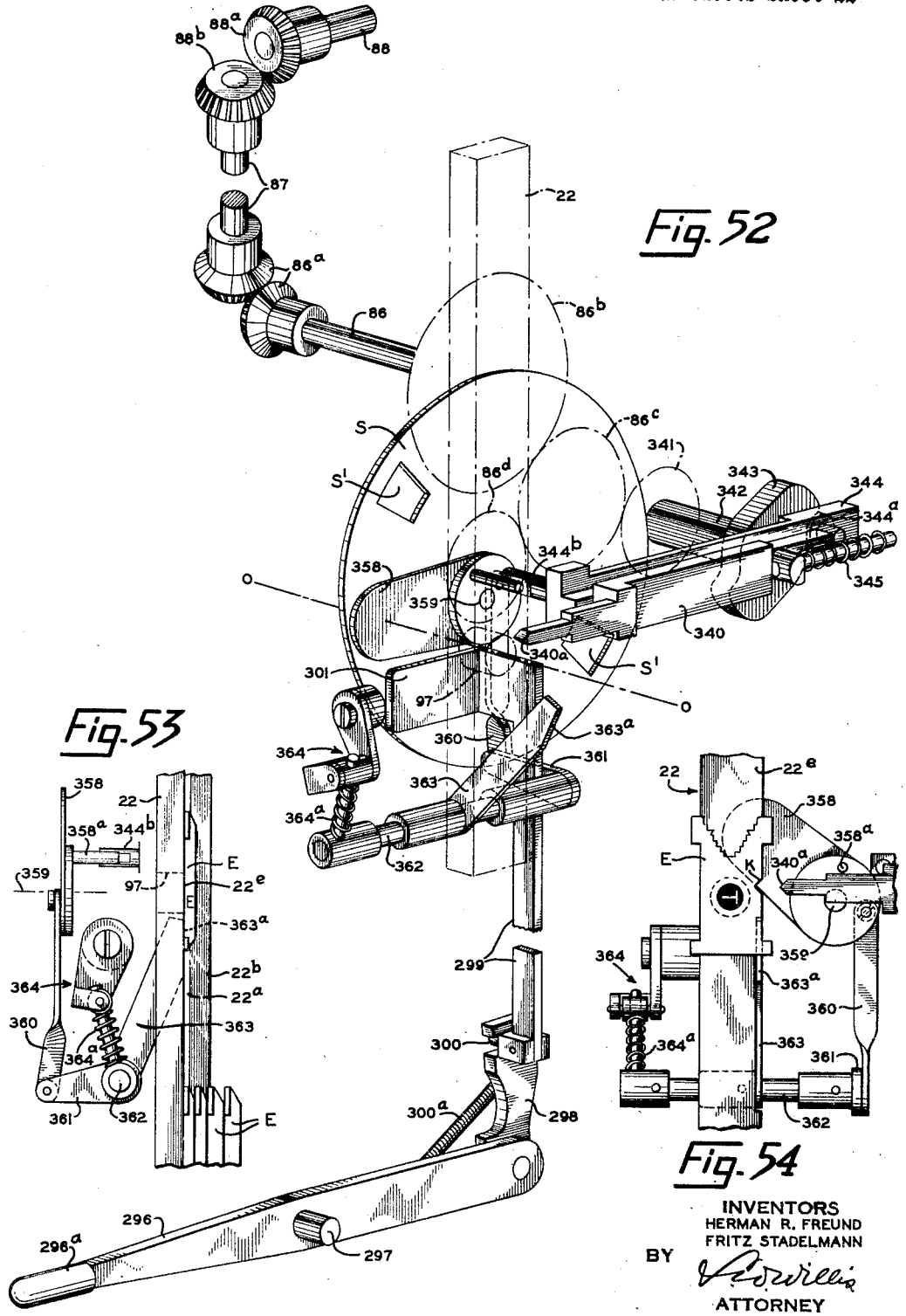

Patented May 15, 1951

2,552,882

UNITED STATES PATENT OFFICE 2,552,882

PHOTOGRAPHIC TYPE COMPOSING MACHINE

Herman R. Freund, Brooklyn, and Fritz Stadelmann, Valley Stream, N. Y., assignors to Intertype Corporation, Brooklyn, N. Y.

Application May 23, 1949, Serial No. 94,766

55 Claims. (Cl. 95—4.5)

This invention relates to typographical machines and more particularly to machines for photographically producing lines of type matter from composed lines of individual character-bearing elements directly on sensitized film or paper, from which may be prepared a printing plate suited particularly to offset and gravure printing processes.

A machine of this type is disclosed in U. S. Patent 2,391,021 to Klingberg et al., dated December 18, 1945. In such machines lines of type matter are produced letter by letter from composed lines of elements bearing photographable type characters of a basic point size and design. The elements may be of the general form of the matrices used in commercial line composing and type-slug casting machines of the organization disclosed in U. S. Patent No. 436,532, granted to O. Mergenthaler, September 16, 1890. In the machine of the Klingberg patent, elements of such general form but bearing a photographable character on the broad flat side thereof are composed into a line and are removed individually in succession out of the composed line to a camera for exposure of their respective characters to sensitized film or paper. The proper letter spacing and word spacing for the successive exposures is obtained by moving a film holder step by step for each exposure, the extent of the step-by-step movements being controlled by the edgewise thickness of the successively removed elements such thickness being equal to or proportionate to the setwise width of the particular character disposed on the broad side face of the element. Thus, the spacing between the successively reproduced images is a function of the variant widths of the characters as is usual in printed matter.

The present application is a continuation-in-part of our parent U. S. patent application, Serial No. 587,062, filed April 7, 1945, now abandoned.

In apparatus for photographically producing type matter for commercial use, speed, accuracy, justification, letter-spacing and alignment, fidelity of the photographic reproductions in different type sizes to the artist's design of the letters in such varying sizes, and flexibility of operation of the machine as a whole are important factors.

One of the objects of the present invention is to provide an improved photographic line-composing machine capable of rapid operation and economical quantity production (faster than the best operators can compose) over long periods of time, and capable of producing type matter of a quality superior to that obtainable from type-slug-casting machines and comparable to that obtainable by skilled hand typesetting.

The present-day need of type in a wide variety of sizes as well as in quantity in any of a variety of text sizes has created a demand for large numbers of fonts of different sizes which the printers are forced to stock. The expense involved in stocking the many fonts of different point sizes and type faces called for in everyday printing is tremendous. Photographic line-composing machines of the type shown in the Klingberg et al. patent may be used to enlarge or reduce the characters of a single font of character-bearing elements to produce type matter of many different point sizes without distortion in letters or spacing.

The improvements of the present invention enables such accomplishment in a simplified manner and afford other important facilities among which are; elimination of the necessity for the operator to calculate proportionate line composition measures when enlarging or reducing the type size of the images projected from a basic size font of type; provision of fixed-focus lenses suited to producing a variety of type sizes merely by setting up the required lens and inserting a gear-train pre-proportioned to the degree of optical enlargement or reduction; provision of facility to cancel or blank-out bad or unwanted lines and provision of means to control letter and line spacing movements of the film, or sensitized paper, to suit the varied requirements of copy-fitting or layout.

In the present embodiment of the invention, the character-bearing elements employed (see Figure 3) carry a photographically reproducible character disposed in a plane parallel to the broad side of the element body, an example of such elements being disclosed in Patent No. 2,231,899, granted February 18, 1941. The edgewise thickness T of the element body is equal to or proportional to the setwise width of the particular character borne by the element. The elements are provided with upper and lower pairs of ears F and H and with combination distributing teeth N which accommodate them in well-known manner to the matrix storage, assembling and distributing mechanisms such as are in wide use in commercial line-composing and type-slug casting machines of the organization disclosed in U. S. Patent 436,532. Figure 1 shows in outline a complete photo-composing machine of the present invention and which embodies such storage magazine, keyboard and distributing mechanisms.

Also in the present embodiment, after a line of elements is composed in an assembly elevator by manipulating a keyboard, the assembly elevator is moved bodily up to a delivery position M—1 and the composed line of elements is then shifted bodily endwise through a delivery channel to a position M—2 for justification and for subsequent disposition, element by element, to a camera unit. Upward movement of the assembly elevator automatically starts a first part of a machine cycle during which part-cycle the composed line of elements is moved through the delivery channel to the position M—2 and is there automatically measured to determine the amount by which it is short of the justified length of line required.

Spacer elements are inserted between words as the line of elements is composed. The line-measuring mechanism which operates at the position M—2 determines the difference between the length of the composed line of elements and a pre-determined justified line length, and later distributes this difference by increments among the letters and word spaces throughout the photographed line by varying the step-by-step movements of film. Distribution of the measured amount of line-length difference, whereby to produce a justified line of photographic impressions, actually takes place during the successive character photographing operations and under control of the body thicknesses of the respective character-bearing elements and word-space elements, the latter elements being of fixed thickness, as distinguished from expansible wedge spacebands used in the Klingberg et al. Patent No. 2,391,021. Devices such as shown in detail in Freund et al. U. S. Patent 2,395,659, dated February 26, 1946, are used in the present embodiment to accomplish the foregoing line-measuring and justifying operations.

Following the line-measuring operation, the elements are singly removed from the composed line at the position M—2 and moved along a channel to a photographing position in a camera unit. Mounted on the camera unit is a film holder that is moved step-by-step as the elements are displaced from the leading end of the composed line thereof at the position M—2, the length of the step-by-step movements being proportioned to the thickness of the respectively removed elements plus such increment of the measured amount of line-shortage as is proportionate the edgewise thickness of the individually removed elements.

After the elements of a composed line are successively photographed, the second part of the machine cycle starts, and during this cycle a distributing elevator adapted to receive all the photographed elements raises the accumulated line thereof to distributing mechanism; the film holder is returned to its starting position, and the film is advanced forwardly to present a fresh area thereof for receiving the next line of photographic impressions, whereupon a cycle of operation is completed and the machine is brought to a stop.

Meanwhile, however, the operator has composed a new line of elements in the assembly elevator, the justifying and photographing operations being so rapid that normally they are completed before the operator is ready with the next line, and a new line may be "sent-in" without waiting for distribution of the elements of a preceding line. Moreover, according to the invention, an unwanted line may be blanked-out while a new or substitute line is being composed, and the optical system may be readjusted or a shift from one type font to another be accomplished while a preceding line of elements is being photographed or circulated through the machine.

Various novel features are provided to make the improved machine of the present invention unusually rapid, versatile and useful, and such features will be pointed out in the ensuing description. The apparatus involved for performing the above-outlined and other operations will be described hereinafter in detail in connection with the embodiments shown in the accompanying drawings, and in the said parent application. However, the form of the machine as a whole as well as the form and arrangement of the various mechanisms and elements employed and their precise manner of operation for accomplishing the essential aims of the invention may differ from that herein shown and described without departure from the spirit of the invention. It is therefore to be understood that the invention is limited only insofar as expressed in the appended claims.

Important objects, other than those above-mentioned, will be in part obvious and in part pointed out as the description proceeds by reference to the drawings in which like reference characters refer to similar parts.

In the drawings:

Figure 2 is a partial front elevation of the machine of Figure 1;

Figure 2a is a detail showing a hand wheel that extends from the right end of the machine as shown in Figure 2, and is used to set the line-assembling scale to the length of line it is desired to reproduce.

Figure 3 is a perspective view of a character-bearing element useful with the present invention;

Figures 4 and 5 show in perspective details of mechanism which the operator uses to set the length of line to be reproduced in accordance with the point size of type matter to be produced;

Figure 6 shows in front elevation details of parts of the mechanism of Figures 4 and 5 and a portion of the line-justifying mechanism, a line-follower and associated parts being shown advanced against a line of elements delivered to the line-justifying mechanism and locked to a line-stop.

Figure 7 is a fragmentary side elevation, partly in section, as viewed generally on line 7—7 of Figure 6, and shows a brake (by which the line-stop setting is maintained) held in released position to permit adjustment of the line-stop;

Figure 8 is a view similar to Figure 7, but shows the brake locking the line-stop, as is necessary when the line follower is in the position of Figure 6;

Figure 9 is a detail partly in section and as viewed generally on line 9—9 of Figure 6, and looking at the brake mechanism from the opposite direction from that of Figure 7;

Figure 10 is a detail on an enlarged scale of cam mechanism for operating the brake of Figures 7–9;

Figure 11 is a top plan view, partly in section, taken generally on line 11—11 of Figure 6, showing the adjustable line-stop ready for manual adjustment by the hand wheel of Figure 2a;

Figure 12 is a view similar to Figure 11, but showing the line-stop after having been moved to the left, and showing also a composed line of elements measured by operation of the justification rail and confined between the line stop which is locked by the line-follower and the end wall along which elements are individually moved out of the line;

Figure 13 is an axial section taken on line 13—13 of Figure 14, showing in detail a multiple scale drum associated with the line-length adjusting mechanism;

Figure 14 is a section taken on line 14—14 of Figure 2 (refer to the right hand side of Figure 2) and shows in end elevation the multiple scale drum of Figure 13;

Figure 15 shows diagrammatically the several proportionate scales carried by the multiple scale drum of Figure 13;

Figure 16 shows in side elevation cams and levers for operating a justification bar, a locking device, a releasing bar and a line advancing lever;

Figure 16a is a front elevation of the mechanism shown in Figure 16;

Figure 17 is a top plan of the mechanism of Figure 16, and in addition shows a drive shaft and mechanism for starting and stopping the drive shaft. The arrow 17a of Figure 1 locates the approximate plane at which the mechanism of Figure 17 is located in the machine;

Figure 18 (Sheet 7) is a detail taken on line 18—18 of Figure 16;

Figure 19 is a side elevation of the mechanism of Figure 17, and shows in addition supporting frame members and parts, including the light-source, as related to the line-delivery channel.

Figure 20 shows in detail on an enlarged scale parts of the starting and stopping mechanism shown in Figures 17 and 19;

Figure 21 shows diagrammatically and in association with related parts, electrical circuits for controlling the starting and stopping mechanism;

Figure 22 shows in perspective end elevation the camera unit at the left side of the machine of Figure 1;

Figure 26 is a front elevation showing in detail mechanism for locking the film holder in raised position except when released for photographing purposes and for recording on the counter the number of reciprocations of the film holder. This figure is taken approximately on the line 26—26 of Figure 23, and the mechanism shown is inside the camera unit as seen at the left side of Figure 2;

Figure 27 shows the mechanism of Figure 26 but with the camera unit partially swung away from its normal operative position, and shows how the parts involved in locking the film holder and the line-counter are automatically upon swing of the camera unit out of operative position;

Figure 28 shows the mechanism of Figure 26, with the film holder lock released to permit movement of the film holder when the camera unit is closed or in operative position and to permit the line-counter mechanism to operate;

Figure 29 is a detail of the mechanism of Figure 28, showing the line-counter operating parts moved to an inoperative position by movement of a manually operated blank-out lever into active position;

Figure 30 is a left side elevation of the mechanism of Figure 28;

Figure 31 shows in section a part of the housing of the camera unit corresponding to that shown in the lower left hand corner of Figure 22. The figure shows in top plan a gear unit by which the film holder is moved in steps in proportion to movement of a line delivery lever likewise moved in steps as the elements are respectively removed from a composed line;

Figure 32 shows the mechanism of Figure 31, with the gear unit swung back into a removable position so that it may be replaced with a different gear unit;

Figure 33 shows in left side elevation the mechanism of Figure 31;

Figure 34 shows in left side elevation the mechanism of Figure 32;

Figure 23:
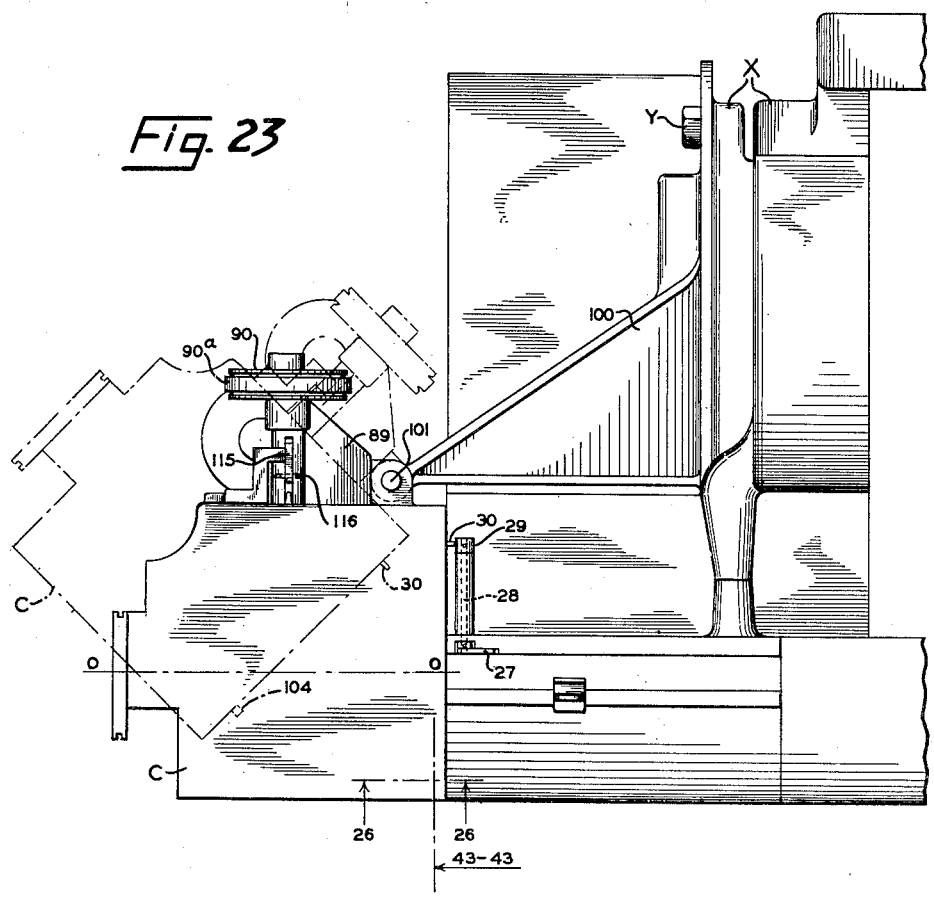
Figure 23 is a top plan looking down on the left end of the machine as shown in Figure 2, and shows in dotted lines the camera unit swung on hinges away from its normal operating position.
Figures 41, 42:
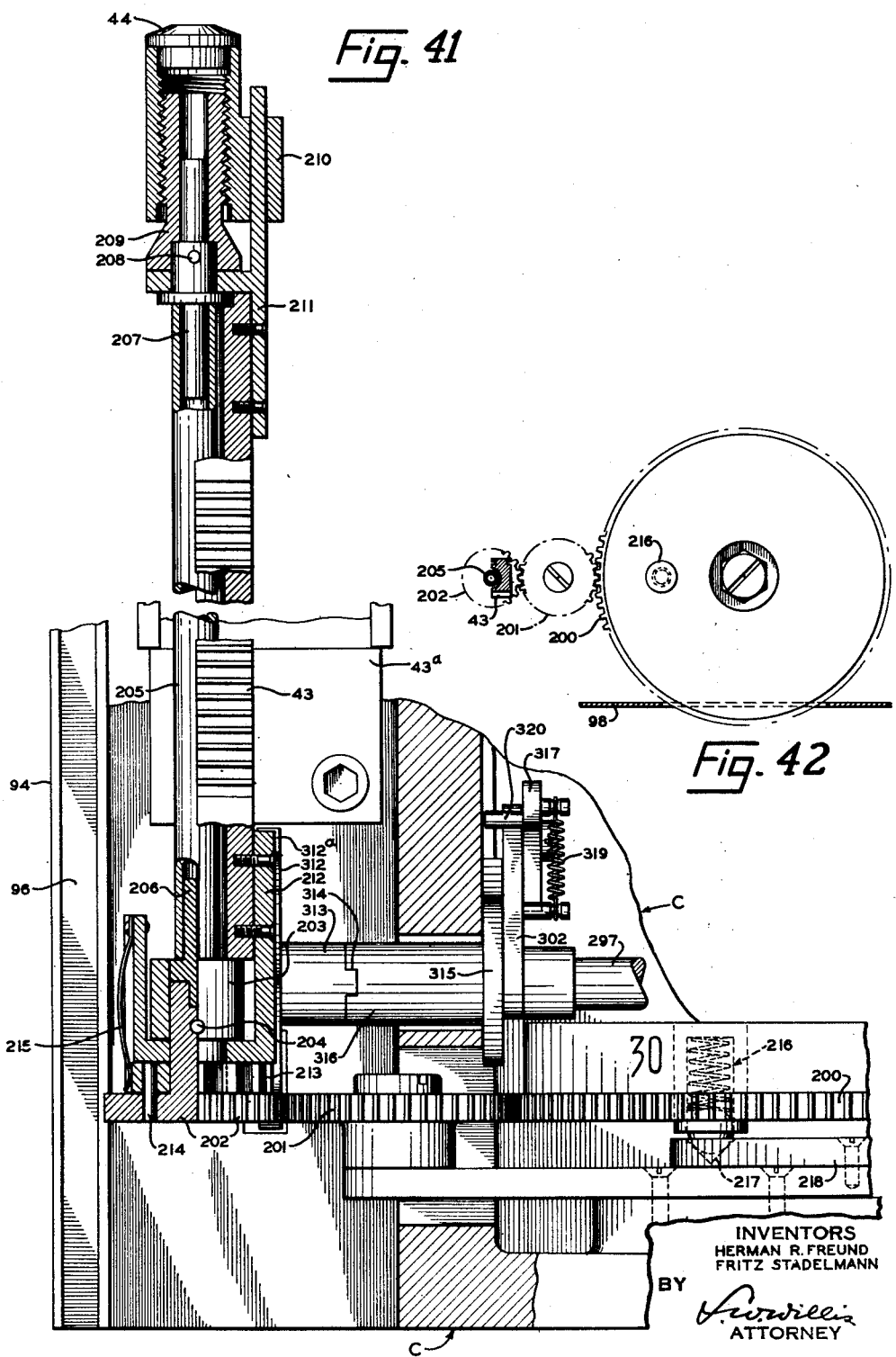
Figure 46:
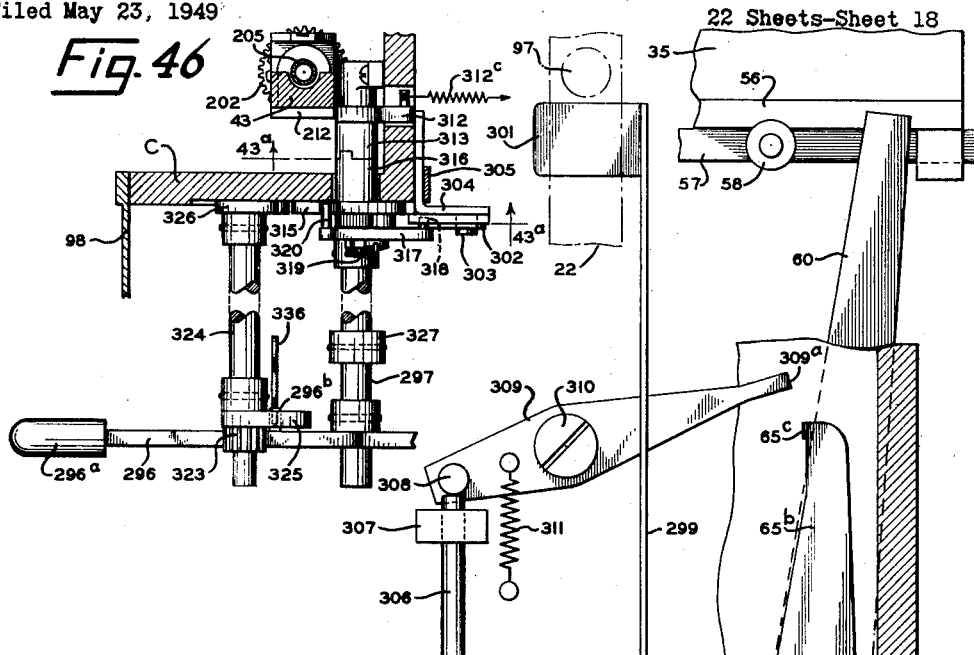
Figure 43:
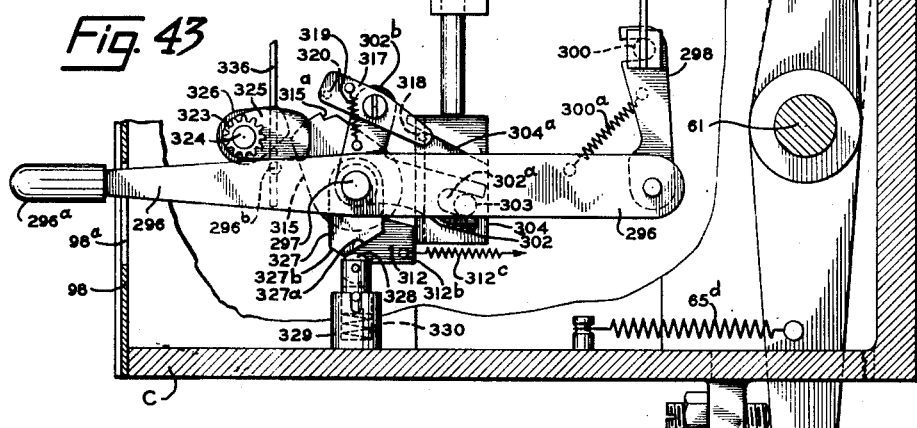
Figure 43A:
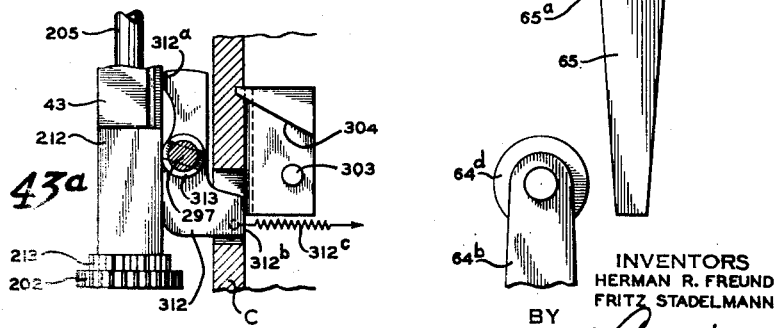

Figure 35 (Sheet 11) and Figure 35a are related views showing a cam and cam-follower that advances the film after a composed line of elements has been photographed;

Figures 36 and 36a are similar to Figures 35 and 35a, and show the cam and cam-follower in a different position;

Figure 37 shows details of the film line-advancing mechanism as viewed from the bottom of the film holder in Figure 22;

Figure 37a is a top plan phantom view of the film holder;

Figure 38 (Sheet 5) is a view looking down on the film line-advancing mechanism;

Figure 39 (Sheet 5) is a sectional view taken on line 39—39 of Figure 36a;

Figure 40 (Sheet 5) is a section taken on line 40—40 of Figure 39;

Figure 41 (Sheet 17) is an enlarged fragmentary view, partly in section, showing in detail the mechanism for adjusting the film holder supporting means of the camera unit shown in Figure 22, whereby to establish a uniform line-starting margin for lines reproduced in different type sizes;

Figure 42 is a top plan view of a dial and gear train for adjusting the mechanism of Figure 41;

Figure 43 shows partly in right side elevation and partly in section taken on line 43—43 of Figure 23, blank-out mechanism contained within the camera unit housing and which permits running character-bearing elements through the machine without photographing or line-space feeding of the film;

Figure 43a is a fragmentary detail of parts of the mechanism of Figures 43 and 41, this figure being taken on line 43a—43a of Figure 46;

Figure 44 is a view similar to Figure 43 showing the line blank-out mechanism in operating position. In Figures 43 and 44 the manually rotatable dial shown in Figure 42 would normally appear in elevation in front of several of the parts, but for the purpose of clarity the dial has been omitted in Figures 43 and 44;

Figure 44a is like Figure 43a but shows the parts in a different operating position;

Figure 45 is a view similar to Figure 44, but showing the parts in a still different position;

Figure 45a is like Figures 43a and 44a but shows the parts in a still different position;

Figure 46 (Sheet 18) is a top-plan view of the mechanism of Figure 43;

Figure 47 (Sheet 19) is a detail of the line blank-out mechanism of Figure 44, showing a holding button pressed inwardly to maintain the line blank-out lever in blanking-out position;

Figure 48 (Sheet 20) is a perspective view of parts of the line blank-out mechanism;

Figure 49 is an end elevation as viewed from the left of Figure 2, showing a lens turret within the camera unit housing and the knob and dial as seen in Figure 22 by which the turret is turned to position a desired lens on the optical axis;

Figure 50 is a fragmentary front elevation showing in detail a portion of one of the element feed chains that moves the elements of a composed line of elements successively therefrom to the photographing position and thence to the discharging position;

Figure 51 is a fragmentary view showing the juncture of the line delivery or transverse channel and the vertical feed channel, and shows an element about to leave upper supports of the transverse channel and engage a lower support provided at the base of the vertical feed channel;

Figure 52 is a front side perspective as viewed from the right of the machine of Figure 2, showing shutter operating parts, and blank-out auxiliary and safety shutters;

Figure 53 is a detail front elevation of safety shutter opening mechanism; and

Figure 54 is a right side elevation of the mechanism of Figure 53.

Corresponding reference characters indicate corresponding parts throughout the several views of the drawings.

As already indicated, the embodiment of the invention disclosed is applied to a machine equipped with element storage, assembling and distributing mechanisms such as employed in commercial typographical line-composing and slug-casting machines of the general type set forth in U. S. Patent No. 436,532. Since the construction and operation of such mechanisms is so well known to those skilled in the art, only the outlines of these mechanisms are shown.

Element storage assembling and distributing devices

Figure 1:
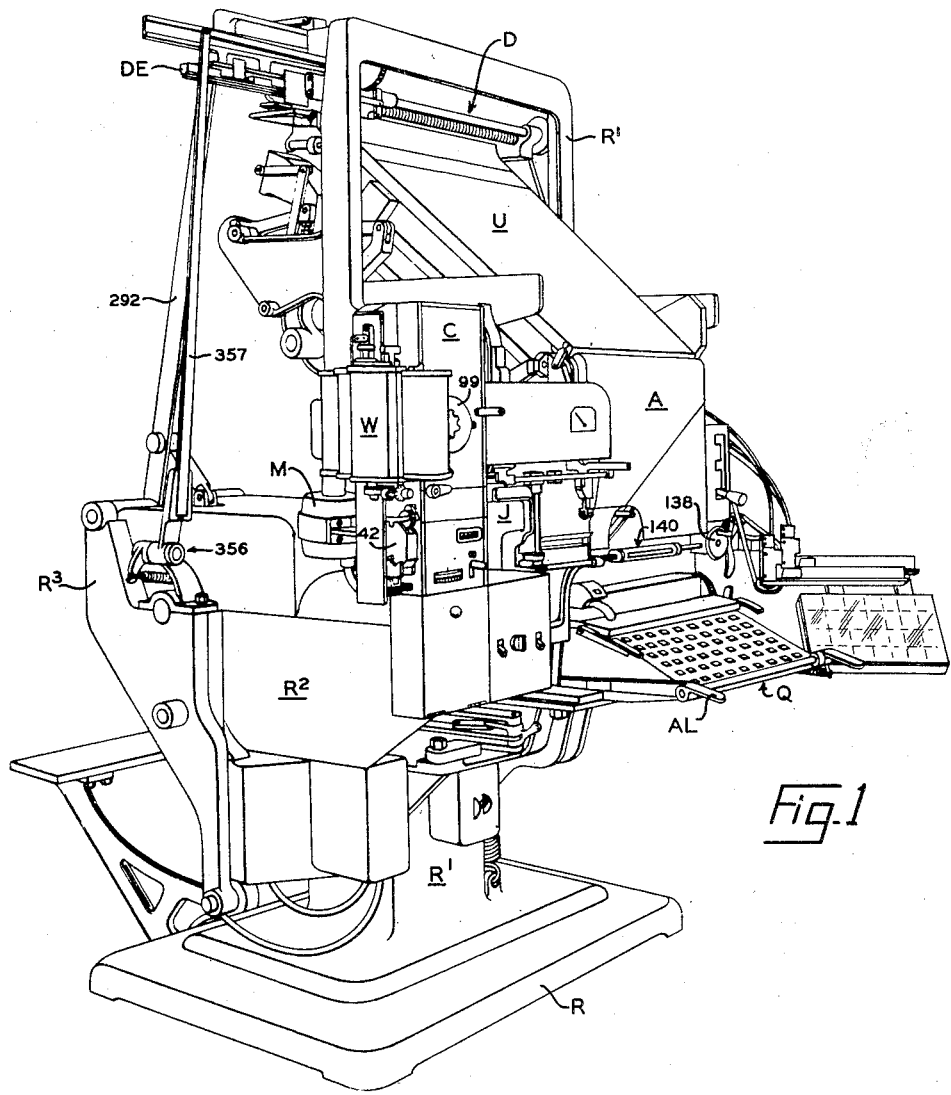
Figure 1 is a perspective view of a photographic line-composing machine embodying the improvements of the present invention.

Referring to Figure 1, the letter U designates a forwardly inclined storage magazine of the usual trapezoidal shape for storing conventionally shaped matrices from which character-bearing type slugs are cast. The magazine has top and bottom plates which are channeled on their opposed inner faces for supporting edgewise between the plates columns of the character-bearing elements or matrices. Each column is long enough to hold a supply of elements bearing a given character. There may be as many columns as is required to hold a complete font which usually comprises at least the lower case and the capital letters of the alphabet and the usual numerals and punctuation marks.

The upper end of the magazine U cooperates with conventional distributing mechanism D which conducts the elements back to their proper storage channels after they have been circulated through the various mechanisms of the machine for photographic reproduction. The well-known combination teeth N on the character-bearing elements, see Figure 3, support them while they are propelled, along a ribbed combination bar of the distributor to drop-off points vertically aligned with the respective magazine channels.

In the present embodiment the elements, as shown in Figure 3, carry plaque B which carry letters to be photographically reproduced. The thickness of each element is proportioned to the setwise width of the character it bears.

At its lower end the magazine U cooperates with a so-called assembler front A having a series of partitioned passages 1 (Figure 2) through which the elements fall by gravity when released by the operation of suitable escapements (one for each magazine channel) in response to manipulation of a keyboard Q. The released elements gravitate to a downwardly inclined, constantly running belt 3, which directs them over a rotating assembler star wheel 4 (Figure 2). The star wheel flips the elements upright into the usual line-supporting channel of the assembling elevator AE. Here the first incoming element encounters a line resistant or finger 2 which is secured in well-known manner to the left end of the usual assembler slide AS, the latter being under spring tension to the right and having a pointer 139. Using the pointer 139 and the cooperating scale F, the operator may follow the growth of the composed line by noting the leftward travel of the slide under the influence of the elements successively added to the composed line. As the length of the composed line approaches the ultimate desired line length, the operator ceases his composition and relies upon the justification operation to bring the reproduced line to the desired length.

When the operator has filled the assembly elevator with elements to bring the length of the composed line of elements as near as possible to the particular line measure desired, the operator raises the assembling elevator AE to raise the composed line of elements to the position $M^1$ indicated in Figure 2 by dotted lines. The operator does this by pushing down on the assembly elevator lever AL (Figure 1). Here the line of elements is disposed in front of the line-delivery finger 5 at the right and a transverse channel J at the left. As the elevator AE rises to its upper position, it trips a latch 9 which releases a delivery slide 6, carrying the finger 5, for movement leftward under the urge of a spring $7^a$ acting on a delivery lever 7, connected by links 8 to the delivery slide. Thus released, finger 5 operates to sweep the composed line of elements leftward from the assembling elevator into the transverse channel J to the dotted line position $M^2$ (Figure 2). During the leftward movement of finger 5, elevator AE is held up by a projection from finger 5, but as soon as the finger 5 passes to the left of the assembler elevator, the latter drops freely to its receiving position for the next line composition.

While the elements are held in transverse channel J, a justifying action takes place which subsequently serves properly to distribute space between letters and words to reproduce a line of type matter which has a predetermined, preset length.

As soon as the justifying action takes place, the machine removes the elements successively from the transverse channel to a photographing or camera unit C which photographs the letter of the elements on film carried by a film holder 35 (Figure 1). The film holder moves downwardly in steps proportioned to the individual thickness dimensions of the elements being photographed. After the elements are photographed, they are discharged to a distributor elevator DE, which subsequently raises the elements to the distributor D which acts to distribute the elements in known manner in their proper positions in the magazine M.

*Machine framework*

The machine is supported on a rigid pedestal or base R (Figure 1). Upon this base are erected the principal framework members such as the vertical column R¹, the front or face plate R² extending across the front of the machine, and main cam-shaft supporting brackets R³ (Figure 17). The vertical column R¹ supports the distributing mechanism D and the magazine U, all in a manner well known.

*Character-bearing elements*

A character-bearing element E of suitable form useful with the present invention is illustrated in Figure 3. It is similar to that disclosed in U. S. Patent No. 2,231,899, granted February 18, 1941, to H. R. Freund, and resembles generally the intaglio character-bearing matrices employed in the well-known typographical machines. Plaque B carrying the reproducible character may be a piece of film mounted on the body portion of element E and disposed in a plane parallel to the broad or flat sides of the element body. The edgewise thickness of the element body, the dimension T, is made equal to or proportional to the setwise width of the particular character on the plaque B, and this dimension is used, as will later be seen, to determine and control the actual advance of the sensitized film for each exposure. The characters are preferably placed recumbent relative to the height of the elements so to obtain the successive photographic exposures in line formation, the film holder may be fed downwardly with the aid of gravity.

The elements are provided with the usual upper and lower sets of edgewise projecting ears F and H respectively, and the combination distributing teeth N. The ears F and H of all elements are alike in thickness and are used to support the elements and to guide the elements, regardless of their variant body thicknesses, through a feed channel to the photographing devices of the machine. Notches K in the rear vertical edges of the elements co-act with a slide member having a V shape to align the character of each element at photographing position in the feed channel. The location of notches K bears a definite relation to the location of the different characters on the plaques B of the elements, i. e., the apex of each notch lies at the same distance in all cases from the point of intersection of fixed horizontal and vertical base lines which establish the location setwise and vertically of all characters.

The word space bands shown in the abovementioned application Serial No. 587,062 of which this is a continuation-in-part were of the conventional two-part sliding wedge construction, such as are employed in typographical machines except that they were provided with upper and lower supporting lugs like those F and H on the element E, and also had notches corresponding to notch K in Figure 3. But in the present embodiment the word-space elements correspond to those disclosed in Freund et al. Patent 2,395,659, issued February 26, 1946, and as will appear, the mechanism for justifying the composed line of elements utilizes the mechanism disclosed in the above-mentioned patent. The present invention is useful with either type of word space element.

*General organization and operation*

Before turning to a detailed consideration of the various parts of the apparatus embodying the invention, we shall briefly trace through the sequence of operations of the machine. Starting with the raising of assembly elevator AE and the delivery from that elevator of a line of composed elements to the transverse channel J, as the follower finger 5 moves leftward past elevator AE (Figure 2), a forwardly extending arm 10 carried thereby encounters and is interengaged by a stop 11 carrying a spring-pressed latch 12 that locks the arm to the stop (Figure 6). Stop 11 is adjustable along a feed rack 25, and its adjustment with respect thereto determines the length of line that will be produced on the film.

Upon approaching stop 11 arm 10 rides under and rocks latch 12, which in turn raises an overlying horizontal actuating bar 13 that actuates switch 14. The switch, through relays to be described, energizes a solenoid which effects starting of the main cam shaft of the machine. The cam shaft rotates through 150° and is stopped. The details of this operation will be described later.

As shown in Figure 12, when the stop 11 and the finger 10 are engaged and locked together, the composed line of elements lies in the transverse channel J between finger 5 and a left hand vertical wall 22ᵉ, and is ready for the justifying action that is carried out by mechanism operated by the 150° turning of the main cam shaft. The justifying mechanism is like that disclosed in the above-mentioned Patent 2,395,659. It measures the difference between the actual length of the composed line of elements and the actual length of the desired line. Subsequently this difference thus measured is distributed proportionately over the step-by-step film movement; the distribution being in proportion to the setwise widths of the elements making up the composed line.

Briefly, the justifying mechanism includes a rail 15 (referring to Figure 2) that is pushed upwardly about a pivot 16 by a justifying rod 20. Within the body of finger 5 is a wedge member 17 arranged to slide vertically within finger 5. When pushed upwardly, wedge 17 drives leftward a plunger 18 (Figure 6), slidable horizontally within the finger 5 and carrying a pusher 21. Wedge 17 carries a roller 19, and when rod 20 pushes rail 15 upwardly, the rail engages roller 19 and drives wedge 17 upwardly and plunger 18 and pusher 21 leftward to compact the composed line of elements between pusher 21 and forward wall 22ᵉ. The amount that wedge 17 moves upwardly and plunger 18 moves correspondingly to the left is a measure of the above-mentioned difference.

Rail 15 is locked in its inclined justifying position, and its inclination varies in accordance with the amount of difference or line shortage. As soon as the above-mentioned justifying action takes place and the rail 15 is locked, a depressor 23 lowers (Figure 2) to retract a spring-pressed locking stop 24 to release line-feed rack 25 locked to finger 5 and to the line-delivery lever 7. Unlocking rack 25 leaves only the line of composed elements holding rack 25 from moving leftward.

Subsequently the main cam shaft lowers distributing elevator DE to the position shown in Figure 2 to receive photographed elements discharged to it. As the elevator DE seats, in this position, it rocks an arm 27 which, through mechanism that will be described, causes a mechanical clutch to engage and drive a Geneva drive G (see the upper left hand corner of Figure 2).

Geneva drive G drives intermittently, but unidirectionally, element feed chains 32 in the direction indicated by the arrows.

Chains 32 pass over suitable upper and lower sprockets, and the free spans adjacent the element feed channel 22ᵃ are accurately guided and maintained steady by engagement with suitable structural ribs to be described. At equally spaced intervals chains 32 carry pick-up lugs 33 (Figure 50) freely pivoted on hinge pins. The lugs extend into the element feed channel and each has a notch 34 for embracing the lower ears of the leading element in a line of composed elements mounted in the transverse channel.

Upon each successive intermittent action of the feed chains an opposed pair of pick-up lugs 33 embrace the opposite lower ears of the leading line element and move it upwardly in the feed channel 22ᵃ to a photographing position on the optical axis O—O. Here the element is momentarily held and accurately located by the pointed feeler 340 (Figure 52) engaging the V-notch K. A light source is provided for effecting photographic exposure. A light meter is shown in Figure 2 to indicate the intensity and condition of the light. A shutter S (Figure 52) turned with the chain and feeler transmits the light to the film.

As each succeeding element is removed, the composed line of elements is of course shortened, and this shortening is transmitted to rack 25 which moves leftward in steps proportioned to the thicknesses of the successively removed elements.

The leftward movement of rack 25 is transmitted through suitable gears 37, 38 and 39 (Figure 2) to shaft 40; and from shaft 40 through a spur gear 41 and a train of gears in a gear box 42 to a vertical rack 43. Film holder 35 is positioned by vertical rack 43. As the feed rack 25 moves leftward in steps, and rack 43 drops vertically in steps, film holder 35 descends in steps. The gears and other mechanical connections between rack 25 and rack 43 which controls the downward movement of the film holder will be described.

The successive stepwise descents of the film holder are caused to differ from the exact edgewise body thicknesses of the successively removed elements, in order to effect justification, in the manner described in the above-mentioned Patent 2,395,659. A portion of the difference or amount of shortage in the line of elements as delivered to the position M² measured by the line-compacting action of pusher 21 and upward movement of rail 15 is added to the thickness of each element, because as roller 19 rides down rail 15 the pivot point of rail 15 is such that the wedge 17 gradually retracts until when finger 5 reaches its leftmost position, wedge 17 will be fully dropped, i. e., to its zero or starting position. Each increment of retraction of wedge 17 adds to the movement of rack 25, and so to the amount that the film holder lowers.

As stop 11 carried by rack 25 advances after removal of the last element from the composed line of elements, its nose 12ᵃ (Figure 2) carried by latch 12 moves against bar 22 of the vertical feed channel and rocks the latch counter-clockwise to release arm 10 carried by finger 5. Rocking of latch 12 pushes upwardly on a plunger 48 beneath which stop 11 has moved, and plunger 48 closes a switch to effect a restarting of the main cam shaft which turns through 210° and stops.

Meanwhile, however, the last-removed element has been carried by the feed chains to the top of the feed channel and discharged laterally into the distributing elevator DE, by a reciprocating pusher 49 (Figure 2).

Shortly after the main cam shaft starts its 210° rotation, distributing elevator DE is raised to register with the distributing organs of the distributor D and raising of the elevator releases arm 27 and the clutch is thrown out and the Geneva drive stops at a predetermined position.

The cam shaft also returns delivery lever 7 film holder and rack 25 to their starting positions as shown in Figure 2, unlocks rail 15 and swings it down to the position shown in Figure 2, locks the rack 25 in its starting position after delivery lever 7 returns finger 5 and feed rack 25, and advances the film for the next line. These operations and the mechanism for performing them will be described in detail hereinafter.

In the present machine and in the machine disclosed in the above-mentioned patent application of which this application is a continuation-in-part, provision is made for producing type matter of different point sizes from a single font of character-bearing elements. The present invention provides mechanism by which an operator may conveniently select the point size type to be reproduced, set the length of the line to be produced, and match the starting position of the film holder, the line-advancing of the film, and the stepwise operation of the film holder to the point size of type selected to be reproduced. The problems concerning each of the selections and adjustments will be pointed out as the mechanisms by which the problems have been solved are described.

The following description starts at the right hand side of the machine, as shown in Figures 1 and 2, with the mechanism for selecting the basic font to be used for the selected point size of type to be produced, and with the mechanism for correlating the desired line length with the point size. We then take up the line-delivery lever 7 and its finger 5 and the operation by which the line of elements is moved from assembler elevator AE to transverse channel J. Then follows the description of the main cam shaft, its starting and stopping, its cams, and the parts operated by its cams. Next, details of the mechanism by which the elements are successively removed from the composed line and the mechanism by which the resulting motion of the feed rack 25 is conducted to the film holder. This mechanism includes the gearing by which the desired proportionate film movement is obtained for different point sizes of type being produced.

Next we turn to the mechanism by which the line-starting position of the film holder is adjusted and then to the mechanism by which the line feed of the film in the film holder is accomplished and proportioned to the size of type being reproduced. These mechanisms are supplemented by safety and auxiliary shutter mechanisms, by line blank-out mechanisms, and by line-counting mechanisms, each of which is useful in solving the many problems which a machine of the type under consideration must successfully meet in fulfilling the rigorous requirements in commerce.

*Correlated line-length scales and fixed focus lenses*

As already pointed out, a font of elements bearing type characters of a given point size, say a 12-point font, may be used to reproduce the same type face in several different point sizes by photographic enlargement or reduction. In such cases the length of the photographically produced line will, of course, be greater or less than the length of the composed line of elements. Therefore, in order to attain a line of some specific length, the length of the composed line of elements must be made proportionate to the degree of enlargement or reduction.

In the machine disclosed in the above-mentioned application of which this is a continuation-in-part, the operator to match the desired length of reproduced line to the proper length of composed line of elements used a single em scale provided on the assembler slide as a guide and calculated the proportionate length of the composed line. In the present invention, however, the mechanism provided relieves the operator of such calculation. To this end the present invention provides a plurality of direct reading, line-length scales, the graduations of which are proportionate to the degree of enlargement or reduction obtainable from one or another of the plurality of fixed focus lenses mounted on a turret.

The mechanism for thus correlating the proper line length and point size is shown in Figures 2, 2A, and 4 through 15. One of the novel and useful features of this mechanism is the provision of a device for manually setting line-length determining stop 11 from a small hand wheel 138 mounted directly in front of the operator and above his keyboard. The operator, by turning wheel 138 by means of its handle, shifts scale *f* with reference to pointer 139, carried by assembly slide AS, to the length of line he desires to compose. Thus, if a line 30 ems long is required as shown in Figure 2, wheel 138 is turned until em scale *f* is moved to the point where pointer 139 points to 30 ems. Through suitable gearing, to be described, wheel 138 simultaneously moves stop 11 along feed rack 25 to a point corresponding to the 30 em point on the scale. With stop 11 thus accurately positioned, and the em scale properly positioned with reference to pointer 139, the operator starts feeding elements to the assembler elevator. The elements push finger 2 leftward and move assembler slide AS and pointer 139 leftward. The operator watches pointer 139, and when it approaches or reaches the zero mark on the scale he stops the composition and raises the assembler elevator to discharge the composed line. The operator cannot overfeed elements to the assembler elevator because the drum carrying the scale *f* carries a stop 129a against which a corresponding stop 139a abuts when pointer 139 reaches the zero mark. Finger lift 129b is variably movable to move stop 129a out of the way to permit the operator to add an additional element thereby to gain an additional em, or fraction thereof, if he so wishes.

In the present embodiment the machine is constructed to produce type matter of eight different point sizes using only three different fonts of matrices or character-bearing elements which will be referred to as basic fonts. They are, in this embodiment, an 8-point font, a 9-point font, and a 12-point font. By proper selection of these fonts and proper adjustment of the machine the following type sizes may be produced; namely, 6-point, 7-point, 8-point, 9-point, 10-point, 11-point, 12-point, 14-point, 16-point, 18-point, 24-point, 30-point, and 36-point. To adjust the machine the operator has only to select a correct basic font, i. e., either the 8, 9 or 12-point fonts, select the correct lens, which he does by turning a turret lens dial, select the proper gear ratio for the step-by-step feeding of the film, which he does by selecting the properly marked set of gears provided with the machine, set the correct line-starting position mechanism for the film which he does by turning a dial to the number corresponding to the point-size type being produced, and set the correct film feed for the line advance which he also does by setting a dial numbered in accordance with the point-size to be produced.

Turning now to the mechanism by which the operator without any calculation may properly correlate the length of line or number of ems desired with a given point-size type to be produced, Figure 15 shows eight em scales lettered *a* through *h*. These several scales are mounted on an eight-faced drum 127 (Figures 13 and 14). In practice, the em scale designated *b* is an actual standard 42 em scale, and is used when reproducing in 1:1 ratio type from the basic fonts of 8, 9 or 12 points. This is indicated at the right hand side of Figure 15. When the operator is producing type in the 1:1 ratio he turns the drum 127 to exhibit the scale designated *b* and shifts the scale with reference to pointer 139 as above described to indicate the desired number of ems he wishes to have reproduced on the film.

Should the operator wish to produce type matter in a 6-point size, he would use the 8-point basic font, and would turn drum 127 to exhibit the scale identified by the letter *a*. He would then move the drum and scale relative to pointer 139 until the pointer indicated on the scale the length of line desired, i. e., the desired number of ems. For 7-point type the operator would use the basic 9-point font and the same em scale *a*.

To produce a 10-point type, the operator would use an 8-point basic font and the em scale *c*. To produce an 11-point type he would use the basic 9-point font and the same em scale *c*. To produce a 14-point type he would use the 12-point basic font and the em scale *c*. To produce 16, 18, 24, 30 or 36-point type the operator would use the respective em scales *d, e, f, g,* and *h,* and the 12-point basic font. The foregoing is graphically indicated by arrows at the right in Figure 15.

Referring to Figure 2, drum 127 and its associated parts are rotatably supported on a shaft 128 which in turn is suitably rotatably mounted and held against axial movement by suitable supports. The drum unit itself which is part of the mechanism generally designated by numeral 140 is enclosed within a casing 132 provided with an elongated window 134 (Figure 5) which exposes only one em scale at a time.

Referring to Figure 13 the drum 127 is internally bored to accommodate the shaft 128. Its right end is rotatably supported on shaft 128 by a knurled knob 131 secured to drum 127 by suitable screws 131a. The left end of drum 127 is supported from shaft 128 by a bushing 129 internally threaded to receive threads of shaft 128. Drum 127 is rotatably mounted on bushing 129 as shown in Figure 13, but is held from relative axial movement with respect to the bushing by a suitable spring-pressed pin 130 which freely engages an annular groove 130a provided around the outside of bushing 129. Bushing 129 is held against rotation but permitted free axial movement by a notch 141 (Figure 14) provided in its outer flange, which notch receives a horizontal guide rail 142 (Figure 5) mounted below the assembler slide AS. Turning of the shaft 128 causes bushing 129 to thread axially along the shaft, it being held against rotation by the guide rail 142.

The cover 132 is secured at its left end to the non-rotatable bushing 129 by suitable screws 133, and is supported at its right hand end by a shoulder provided on the hand knob 131, the engagement being such as to permit free rotational movement between the knob 131 and cover 132.

For aiding in aligning a desired scale with window 134, a bracket 135 is secured to bushing 129 carrying a spring-pressed ball detent 136 that coacts with a detent ring 137 having indentations spaced to receive the ball detent at positions to align the em scales with the window. Knob 131 is turned until the appropriate scale appears in the window. The detent ball accurately locates and holds the scale properly aligned. Each scale is marked at its right hand end with the point-size to which it is suited.

After selecting the required point-size scale, the scale is shifted axially with respect to the pointer 139 through the agency of the hand wheel 138. In Figures 2 and 5 it will be seen that the *f* em scale for 24-point reproduction has been selected, and that the scale drum has been adjusted along threaded shaft 128 to the 30 em line-length position.

The shafts and gear trains by which axial movement of the drum assembly 140 is correspondingly transmitted to the line stop 11 are shown in Figure 2, and in detail in Figures 4 through 12. The left end of shaft 128 extends leftward from drum assembly 140 through a bearing bracket 156 (Figure 2) and carries pinned to it a pinion 157 (Figure 5). Pinion 157 meshes with a similar pinion 158 pinned to an extension shaft 159, the latter being supported at its right end in bracket 156 and at its left end in a bearing bracket 160 (Figure 2). Adjacent bracket 160, shaft 159 has pinned to it a bevel gear 161 which mates with a similar gear 162 pinned to the lower end of a vertical shaft 163, the latter carrying at its upper end a bevel gear 164.

It is through the medium of bevel gear 164 that a threaded screw 175 (Figures 2 and 4), attached at its left end to line stop 11, is axially moved to adjust line stop 11 along line feed rack 25. Inasmuch as line feed rack 25 and the threaded screw 175 are mounted to move as a unit (except when the screw is turned to adjust stop 11) during removal of elements from the composed line, and inasmuch as vertical shaft 163 carrying bevel gear 164 has only rotational movement, a detachable driving connection is provided between bevel gear 164 and threaded screw 175.

To this end, line-feed rack 25 carries a bracket 172 (Figures 11 and 12) from which projects rearwardly a forked flange 173. As shown in Figures 4 and 9, forked flange 173 rotatably supports and holds against axial movement an internally threaded bevel gear 178, having an enlarged hub portion formed with an annular groove which receives the forked flange 173. Gear 178 threadably receives rod 175.

As shown in Figures 11 and 12, the left end of rod 175 is pinned to bracket 174 carried by line stop 11, and the right end is pinned to a bracket 176, slidable on and supported by feed rack 25 and held in position by a keeper plate 177 (Figure 4.) So mounted, rod 175 is non-rotatable but is axially movable. The brackets 174 and 176 hold the bevel gear in the forked flange. Rotation of bevel gear 178 through its threaded engagement with the rod 175 moves rod 175 axially with respect to feed rack 25, and in this manner line-delivery stop 11 is adjustable along feed rack 25.

When feed rack 25 is in its starting position as shown in Figure 4, bevel gear 178 meshes with bevel gear 164, and turning of wheel 138 (Figure 5) to adjust the em scales of drum assembly 140 with respect to the pointer 139 produces an equivalent movement of rod 175 and of line-delivery stop 11 along the feed rack 25.

Thus, concurrently with turning of wheel 138 to adjust scale drum 127 to a desired line-measure position, stop 11 is moved along the rack 25 to the corresponding line-measure position, i. e., the distance from the front 22a of element feed channel bar 22 to the stop 11.

The feed rack 25 (Figure 4) is supported at its left end by a pinion 37 suitably supported on the framework of the machine, and at its right end by a bracket 46 carrying a roller 46a riding on a stationary track 47 secured to the framework. At the completion of a complete machine cycle, the line-delivery finger 5 is returned, as will be described, to the positions shown in Figures 2 and 4, where the finger is held locked in place by latch 9 (Figure 2). Movement of line-delivery finger 5 rightward to its starting latched position also pulls feed rack 25 back to its starting position, by an extension arm 10 carried by line-delivery finger 5 which engages bracket 46 as shown in Figure 4.

A further feature of the invention provides for holding the line stop 11 and rod 175 locked when the feed rack moves leftward for the film-holder-moving operation. As soon as the machine commences removing elements from the composed line for photographing, rack 25 moves rod 175 and its bevel gear 178 out of mesh with gear 164. This condition is shown in Figure 12, wherein an arbitrary number of elements have been removed.

Gear 178 is automatically locked by a brake lever 179 (Figures 7, 8, 9 and 10) by movement of rack 25 leftward from its Figure 11 starting position. Brake lever 179 is pivotally mounted on a stud screw 180 extending from the lower leg of forked flange 173 of bracket 172. Its elongated upstanding arm is curved to engage outer hub portion 181 of gear 178, and its short lower arm carries an inwardly turned ledge 182 (see Figure 10), provided with a bottom bevel edge 184. A spring 183 (Figures 7 and 8) contained in a bore in flange 173 pushes down on ledge 182 to urge the brake lever into gripping engagement with hub portion 181, as shown in Figure 8. In this position, gear 178 is held against rotation. When gears 164 and 178 are meshed as shown in Figures 4, 7, 9 and 11, brake lever 179 is pivoted (against the action of the spring) out of engagement with hub 181, and gear 178 is free to turn, in response to rotation of gear 164.

The automatic application and release of brake lever 179 is affected by a brake-operating part or member 168 (Figures 4, 6 and 10) which straddles upper bearing 165 supporting vertical shaft 163, and which is secured to frame member 167 by screws 169 (Figures 9 and 11). The member 168 is formed along its front edge with an upstanding T-shaped rib 170, and at its left edge and behind this rib the member is formed with a bevel 171. It is the movement of brake lever 179 into and out of engagement with bevel 171 that effects the automatic operation of the brake lever. As best shown in Figure 10, as the brake lever moves to engage brake-operating part 168, its bevel 184 rides up on bevel 171 and brake lever 179 pivots away from its braking position. But as brake lever 179 moves from the brake-operating part, bevel 184 rides down bevel 171 permitting spring 183 to pivot brake lever 179 into holding contact with hub portion 181 of bevel gear 178.

The T-shaped rib 170 hereinbefore referred to supports bracket 172 squarely and firmly against the rotational stress applied thereto when the gears 164 and 178 are meshed and rotated to effect unitary movement of the connected parts 11, 175 and 176 along the rack 25. The desirability of such support will be apparent from observation of the construction of the mechanism involved wherein bracket 172 is subjected not only to the aforementioned stress but also to such stress as results from compression of spring 183 in holding the brake lever 179 in released condition. The neat fit of the rib 170 in the correspondingly shaped aperture through the flange 173 of the bracket 172 affords the necessary firm support.

After wheel 138 has been turned to set the length of line to be produced, and to set the line-stop as above described, provision is made to lock the setting against accidental adjustment. To this end, referring to Figures 2 and 5, vertical shaft 163 may be locked in its adjusted position by a set screw 163ª threaded into bracket 166—the set screw extending through the bracket to the shaft 163 and being provided with a knurled head for finger tightening of the set screw.

Having pointed out the mechanism by which a line of elements is composed, the mechanism for setting stop 11 to determine the length of the line to be produced, we now turn to a consideration of the main cam shaft and the functions it performs during its 150° and 210° steps of rotation.

*Main cam shaft and its associated parts*

After the operator has composed a line of elements in assembly elevator AE and lifts the assembler lever AL to release latch 9 and line-delivery finger 5, spring 7ª (Figure 2) pulls the finger 5 leftward. It is mounted on a line delivery slide 6 (Figures 2 and 19) suitably mounted on rollers 6ª running in tracks 6ᵇ supported from the frame of the machine as shown in Figure 19. Suitable linkage generally indicated at 8 connects slide 6 with the line delivery lever 7. The leftward movement of line-delivery finger 5 pushes the composed line of elements from elevator AE against the forward wall 22ᵉ. Referring to Figures 2, 6 and 12, as line-delivery finger 5 reaches stop 11, arm 10 slips under latch 12 which thereupon locks arm 10, line-delivery finger 5 and stop 11 together as a unit. Movement of arm 10 past latch 12 causes the latch to raise to lift elongated swinging bar 13 (hinged as shown in Figure 2) causing the bar to depress a plunger of switch 14 to close the switch.

Referring to Figure 21, switch 14 closes a circuit which energizes a solenoid to start the main cam shaft in operation. Switch 14 also connects a source of power 235 with solenoid 240 through line 236, line 237, a switch 238 (closed when gear 263 is in its starting position), line 239, the solenoid 240 and line 241. Energizing of solenoid 240 pulls its core rod 242 (Figure 20) to the left and swings lever 243 counter-clockwise about its pivot 244. This motion of lever 243 is transmitted through its yoke 245 and a pin 246 to a hammer bar 247 which shifts to the right and dislodges a pawl 248 pivoted about an axis 249 carried by the main drive gear 263 (Figures 19 and 20). Pawl 248 is kicked by hammer bar 247 off its normal seat on a stop lever 250 pivoted at 251 by the action of hammer bar 247 on the flag 268 extending from the top end of the hollow vertical sleeve 268ª which is free to rotate to a limited extent about the stationary upright rod 250ª. When stop lever 250 is thus released, it rocks in response to a rocker lever 252 which, by reason of being urged by a spring 256 acting on the clutch shaft 257, pivots clockwise about its axis 254 and allows the clutch lever 255, pivoted at 255ª, to engage the conventional clutch 259 (Figure 17). Clutch 259 includes a drum 260 driven by belt 261 from a motor driven shaft 262.

Engaging of the clutch (Figure 19) rotates a hollow drive shaft surrounding the shaft 257 and which carries a pinion, not shown, which drives the main drive gear 263 and the main cam shaft 267. The gear 263 turns through approximately 150 degrees of rotation before it is automatically stopped by a second pawl 248ª (Figure 19) in a manner to be described.

The main cam shaft and gear 263 turning through 150° accomplishes the following operations. It raises justifying bar 15 to accomplish the line-measuring action for determining the amount of justification; locks the justifying bar in its pivoted justifying position; lowers the distributing elevator DE into position to receive character-bearing elements from the vertical feed channel, and releases the line-feed rack 25 by disengaging stop 24 from the pinion 37.

The distributing elevator when lowered to receiving position, as above mentioned, rocks arm 27 (Figure 2) which causes a clutch to start the Geneva drive that drives the rotary shutters and the element feed chains 32.

Referring to Figure 21, pawl 248ª holds the main drive gear stationary in its 150° position until roller 12ª carried by stop 11 engages a surface of the camera unit housing as the last element is removed from the composed line. This pivots latch 12 which depresses plunger 48 of switch 48ª (Figure 21). Switch 48ª connects the live line 236 with solenoid 240 through line 264, a switch 265 (closed when gear 263 is in its 150° position) and line 239. As before, energizing of solenoid 240 now kicks pawl 248ª off its seat on stop lever 250 and the gear 263 rotates 210° until the pawl 248 comes around and engages a stop 250 and throws out the clutch, thus stopping rotation of the gear 263.

Referring to Figure 2, during the return of the main cam shaft to its starting position, it accomplishes the following operations. It lowers the justifying bar 15, moves line-delivery lever 7 back to its starting position (thereby returning line-delivery finger 5, feed rack 25 and film holder to their starting positions), releases stop 24 to again lock pinion 27 and rack 25 in their starting positions, and accomplishes a line-advancing operation of the film.

The main gear drive wheel 263 (Figure 17) is, except for the solenoid operation, of conventional design, but for the convenience of the reader we will here review briefly the construction and operation of the parts.

Referring to Figures 17, 19 and 20, the solenoid 240 is suitably rigidly mounted on a portion of the frame of the machine. The same frame portion supports lever 243 and its pivot 244. When the solenoid is energized, it pulls the lever 243 toward the solenoid but pushes its lower end carrying the yoke 245 rightward as viewed in Figure 20 and toward the reader as viewed in Figure 17. The hammer bar 247 hits a flag 268 which extends from a vertical sleeve 268a freely supported for limited rotation about the stationary vertical pin or rod 256b (Figure 20), a spring (not shown) acting to return the sleeve 268a counter-clockwise whenever the flag 268 is struck by the hammer bar 247.

Referring to Figures 17 and 19, the flag 268 when it hits the pawl 248 knocks it off a flat seat on the stop lever 250 which has previously served to stop the gear wheel in the position shown in Figures 17, 19 and 20. Thereafter the clutch-engaging operation previously described takes place.

The main gear wheel 263 continues its rotation until pawl 248a comes around and engages on top of the stop lever 250 which (Figure 19) it pivots counter-clockwise, thereby rocking the rocker lever 252 and clutch lever 255 clockwise to compress spring 258 and to release the clutch. In other words, pawls 248 and 248a when turned into engagement with the stop lever 250 accomplish two things; (1) positively stops gear wheel 263, and (2) disengages the clutch.

As is customary with machines of this type, manual control is supplied by which the gear wheel may be stopped and/or started. Referring to Figures 1, 17, 19 and 20, a horizontally disposed hand lever 269 is pivoted at 270 at the front of the machine. It is linked by link 271 to a horizontal fore and aft bar 272, carrying at its rear end a pin 273 adapted to engage an arm 268b extending from the vertical sleeve 268a carrying flag 268. When handle 269 is pulled out from the "in" position shown in Figure 17, bar 272 is pulled out (to the right) and pin 273 engages arm 268b causing rotation of sleeve 268a and dislodging of the pawl 248 by flag 268 off its seat on the stop lever 250. In this manner the main drive gear may be manually started. When the next pawl 248a comes around and engages on top of the stop lever 250, the clutch is thrown out and the machine is stopped.

In addition, handle 269 and bar 272 are connected through a lost motion mechanism to clutch operating lever 255. By pulling handle 269 out as far as it will go, lever 255 is manually operated to dislodge a pawl and thus engage clutch 259.

Referring to Figure 21, it was observed that starting switch 14 had to go through a switch 238 to energive solenoid 240. Switch 238 is shown in Figure 17 at the upper portion of the drawing. It is mounted on a suitable support adjacent a timing cam 266 on the main cam shaft 267, which cam carries a lug 238a which, when opposite switch 238, serves to close the switch. Since switch 14 can energize solenoid 240 only when switch 238 is closed, and since switch 238 is closed only when drive shaft 267 is in its normal starting position, no accidental operation of switch 14 can energize the solenoid 240 when the cam shaft is away from its starting position.

It will also be observed that switch 48 can energize solenoid 240 only when switch 265 is closed. This switch is mounted adjacent cam 266 and is held closed by a lug 265, and only when the cam shaft is in its 150° position. Thus accidental operation of the switch 48 at any time other than when the cam is in its 150° position will not operate solenoid 240.

Referring to Figure 17, and considering the main cam shaft itself, it is mounted in suitable bearings 281 (Figures 1 and 17) supported on the base frame of the machine. The cam shaft carries the various cams shown in Figure 17. Cam 266 has already been described. Justifying cam 275 accomplishes the justification of the line of elements moved into position $M^2$ (Figure 2). Co-acting with this cam is a justifying lever 276 one arm of which has a cam-follower roller 276a and the other arm of which is linked by link 276d to the justifying rod 20. The justifying lever is pivotally supported on a shaft 277 mounted on a supporting plate 278 suitably secured to the frame of the machine (Figures 16 and 16a).

Referring to Figures 16 and 16a, justifying lever 276 is urged counter-clockwise by a spring 276c. When roller 276a is on surface 275a of justifying cam 275, the right end of lever 276 is pushed down against the action of spring 276c, and justifying bar 15 (Figure 2) is out of the path of finger 5 and wedge roller 19 in its lowermost position. But shortly after cam 275 turns during its first 150° of rotation, the cam-follower 276a rides onto the depression 275b of cam 275 and the justifying lever is pivoted by spring 276c to raise operating arm 20 and justifying bar 15. Surface 275b extends beyond the 150° position and so the lever is left in justifying position as long as pawl 248a holds the gear in the 150° position.

Rod 20 passes through two of four bearings 279 in the frame 280 (Figure 16a) and carries a bracket 276b to which link 276d is linked. A driving rod 20a passes through the companion bearings 279, and with rod 20 carries bracket 276b. The rail 15 is locked in justifying position by locking rods 20 and 29a. To accomplish this, cam shaft 267 carries locking cam 282 (Figure 17) having an unlocking cam surface 282a and a locking cam surface 282b (Figure 16). The locking mechanism, operated by locking cam 275, comprises a vertical lever 283 pivoted about shaft 284 and carrying a cam-follower roller 283a. Linked to lever 283 is a rod 285 (Figure 17) passing through a yoke 286 extending from the plate 278. A compression spring 285a constantly urges rod 285 to the left, and cam-follower roller 282a toward the cam.

The right end of rod 285 (Figure 18, Sheet 7) is connected by a pin 287 to two toggle arms 288 having forked ends 288a which receive rods 20 and 20a.

When cam-follower roller 283a moves from unlocking cam surface 282a, springs 285a are freed to urge rod 285 leftward to expand the toggle mechanism of Figure 18, which action binds and locks the rods 20 and 20a.

Unlocking cam surface 282a is positioned to release rods 20 and 20a before the surface 275a of justifying cam 275 lowers rail 15. Locking surface 282<sup>b</sup> is positioned to cause locking shortly after the justifying takes place and extends to hold rod 20 locked while the cam shaft is in its 150° position.

The next cam 350 operates stop rod 24 which locks and releases feed rack 25. Referring to Figure 16, cam 350 has a locking surface 350<sup>a</sup>, and a locking surface 350<sup>b</sup>. Operating lever 351, pivoted on shaft 277, has a cam-follower 351<sup>a</sup> urged by a spring 351<sup>c</sup> to follow cam 350. The other end of operating lever 351 is linked by a link 351<sup>b</sup> to a rod 290 that extends up through the wall 289 and carries the previously mentioned depressor 23 which operates the stop rod 24. When cam-follower 351<sup>a</sup> rides from surface 350<sup>a</sup> onto the raised surface 350<sup>b</sup> operating lever 351 pivots clockwise to lower rod 290 and depressor 23, thereby to lower stop rod 24 and release feed rack 25.

It will be noted from Figure 16, that the unlocking cam surface 350<sup>b</sup> does not start until after the locking action of the rail 15 has taken place.

Cam shaft 267 also carries a cam 291 for operating distributing elevator DE in the conventional manner. The elevator is mounted on arm 292 (Figure 19) suitably pivoted in known manner from the base of the machine and is connected by suitable linkage 292<sup>b</sup> to a cam-follower 292<sup>a</sup> which cooperates with the cam 291. As the main cam shaft moves into its 150° position, the cam-follower roller 292<sup>a</sup> moves off cam 291 to lower distributor elevator DE into its element receiving position as shown in Figure 2, and rocks arm 27 to start the feed chains and shutter drive.

Cam 291 is so positioned that elevator DE does not rock arm 27 to start the element removal until stop rod 24 (Figure 2) is retracted. In other words, lowering of the elevator is the last operation completed by the 150° rotation of the cam shaft.

The cam shaft holds its 150° position, and holds the justifying rail 15, the depressor bar 24, and distributing elevator DE in the position described during the removal of the elements from transverse channel J.

As previously described, when the last element is removed from transverse channel J, line delivery lever 7 moves roller 12<sup>a</sup> of stop 11 against the camera housing and roller 12 depresses plunger 48 and closes switch 48<sup>a</sup>. This action energizes solenoid 249 which kicks out pawl 248<sup>a</sup>, and the main cam shaft rotates through 210° to its original starting position where pawl 248 stops it. During the 210° rotation, cam 292 moves rod 285 to the right (Figure 17) to unlock rod 20, and cam 275 pivots lever 276 to lower rail 15.

Thereafter a cam 293 (Figure 17) on the main shaft causes a cam follower 294 mounted on shaft 295 to move against the action of spring 7<sup>a</sup> to swing line-delivery lever 7 to its starting position where it is engaged and held by latch 9 (Figure 2). When cam 293 is at its starting position, it leaves cam follower 294 free to swing, i. e. ready for spring 7<sup>a</sup> to drive lever 7 to perform its line-delivery function.

Shortly after the line-delivery lever is returned, cam 350 pivots lever 351 to raise rod 24 to engage and lock pinion 37 (Figure 2). Meanwhile distributing elevator cam 293 has raised elevator DE to its starting position shown in Figure 1, and lever 27 has rocked to release the clutch driving the feed chains and shutters.

The 210° rotation of the cam shaft also accomplishes two other functions, (1) discharging of the photographed elements from the distributing elevator to the distributing mechanism D (Figure 1) and (2) the line film advance.

The mechanism for discharging the photographed elements from the distributor elevator to the distributing mechanism D is accomplished by a cam 354 mounted on the cam shaft (Figure 17). A cam-follower roller 355, through suitable conventional mechanism generally designated at 356 (Figure 1), laterally swings an arm 357 to sweep the elements from the distributing elevator to the distributor.

The mechanism operated by the line film feed cam 66 (Figure 16) carried by the main cam shaft will be described in connection with the description of the line-advancing mechanism.

*Hinged camera unit*

Figure 25:
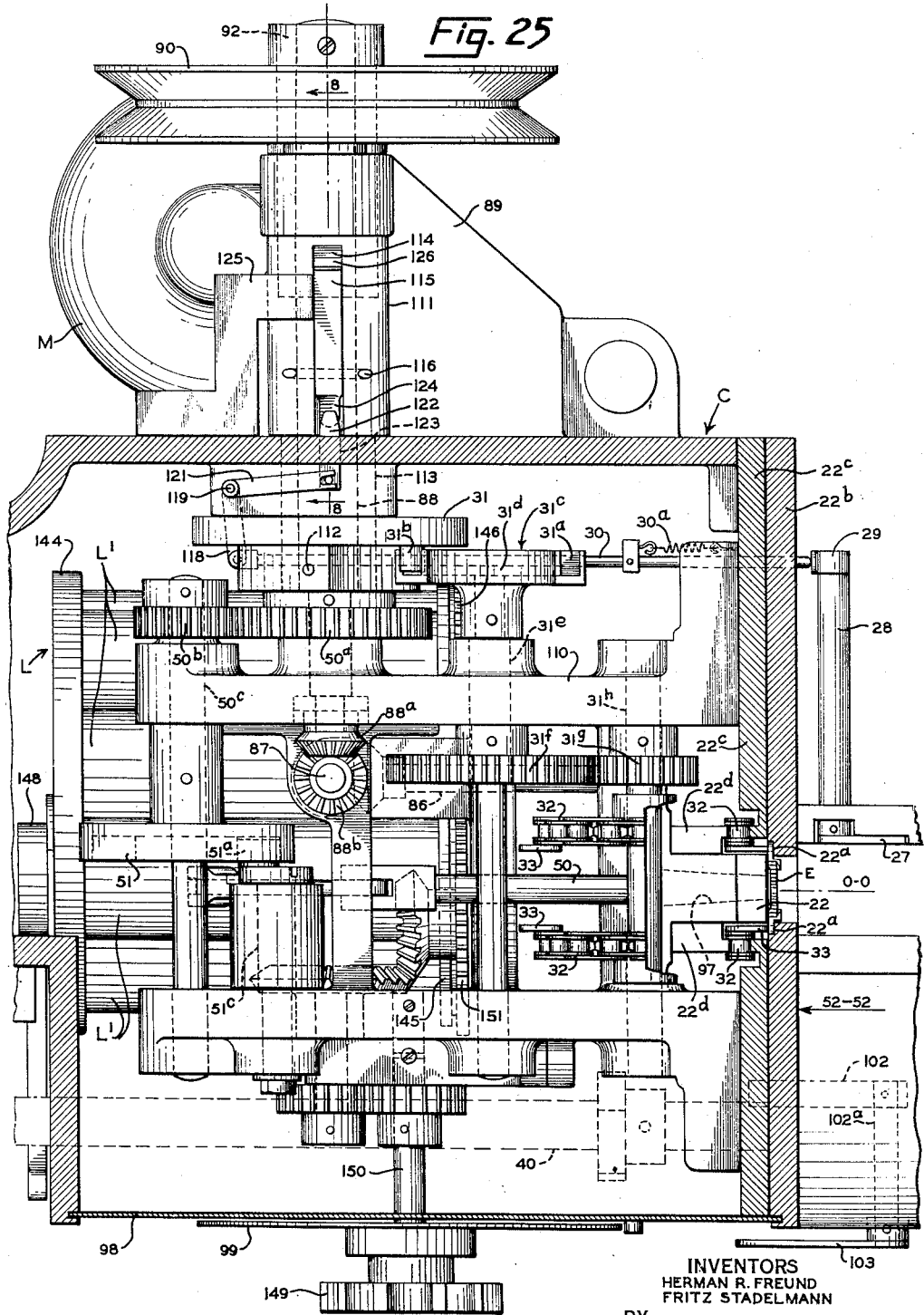
Figure 25 shows in top plan mechanism contained within the camera unit housing. The section through the housing is taken through line 25—25 of Figure 2.

In Figure 22 the camera unit 9 is shown detached from the machine. When in position, camera unit C is hingedly supported on outwardly extending upper and lower arms of a large bracket 100 (the upper arm only of which shows in Figure 23) secured to framework X of the machine by several bolts Y. Hinge pins 101 project upwardly from each arm of the bracket, support the unit and enable it to be swung back (dot-dash lines, Figure 23), or to be removed by lifting it off of the pins. When unit C is swung back, various parts may be cleaned, inspected and adjusted. As best shown in Figures 2 and 25, a hooked-nose latch 102 mounted on a short shaft 102<sup>a</sup> carrying a hand lever 103 serves to lock the camera unit in operating position and to release it for swinging out when desired.

The camera unit comprises a rectangular housing within which is contained, among other parts, the Geneva drive, and the element feed chains 32, a rotating shutter element ejecting mechanism driven by the drive; and a rotatable lens turret generally designated L (Figure 49) carrying a plurality of fixed focus lenses L<sub>1</sub>.

At the left side of the camera unit housing film holder 35 (Figure 22) is mounted on a vertical plate 94 provided at its edges with trackways 95 (Figures 2 and 37<sup>a</sup>, sheet 10) in which small rollers 96 run, thus to freely support and accurately guide the film holder in its up and down movements.

Referring to Figure 25, secured to the right side of the housing is plate 22<sup>b</sup> having grooves 22<sup>a</sup>, which accommodate the edgewise projecting lugs F and H of each element E, the elements while engaged by the feed chain 32 being confined in these grooves by the bar 22. At the level of the optical axis O—O in Figure 2, the bar 22 is provided with an aperture 97 for the passage of light through the character portion of each element from a fixed light source located at the right of element E as seen in Figure 25.

At the front of the housing unit are a removable cover 98 and a dial 99 by which the position of the lens turret is indicated.

*Drive for feed chains and shutters*

Figure 24:
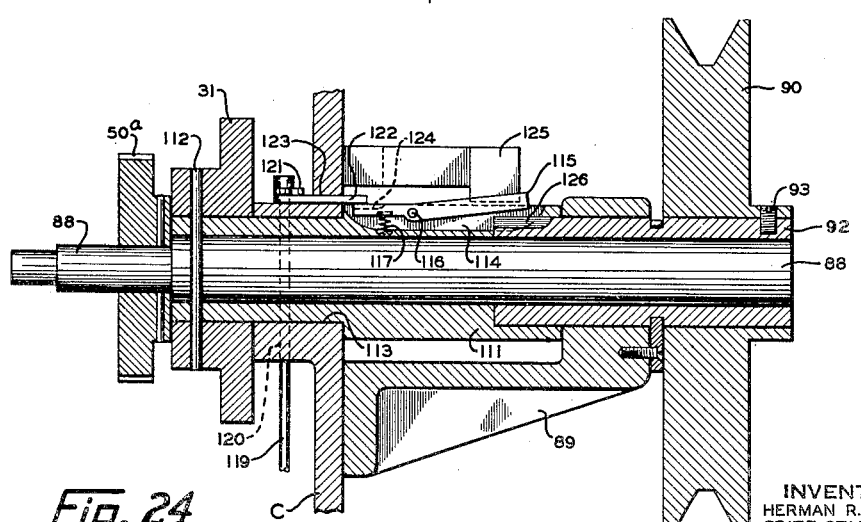
Figure 24 is a vertical sectional view taken on line 8—8 of Figure 25 and shows details of drive and clutch mechanism for driving parts of the camera unit.

As shown in Figures 1 and 22, the mechanism within camera housing C is driven by a motor M suitably mounted on the camera housing. The motor normally runs while the operator is composing, and is turned on and off by a switch 91 (Figure 2). Motor M, through a suitable gear reduction not shown, drives a belt 90<sup>a</sup> (Figures 22 and 23) passing over a pulley 90 keyed to a driving sleeve 92 (Figure 24). Referring to Figure 24, the clutch mechanism is supported on a bracket 89 secured to the upper rear wall of the camera housing. Sleeve 92 rotates in a bearing provided by bracket 89 and rotatably receives and supports the outer end of a shaft 88 supported at its reduced inner end in a bearing formed in a web 110 (Figure 25) within the housing. Another sleeve 111 on shaft 88 is pinned to the latter and to a Geneva driving gear 31 by a pin 112. Sleeve 111 extends through a bearing 113 in the housing rear wall and has a recess 114 in which a pawl 115 is pivoted on a pin 116 mounted in sleeve 111. Pawl 115 (as shown in Figure 24) is urged clockwise by a small spring 117. It is pawl 115 that, by engaging the constantly rotating clutch-driving sleeve 92, drives sleeve 111 and Geneva driver 31.

Pawl 115 is operated by lever 27 when the distributor elevator DE moves to and from its dotted line position as shown in Figure 2. To this end, referring to Figures 2 and 25, lever 27 extends upwardly from a shaft 28 suitably mounted on the camera housing. From the rear end of shaft 28, a lever 29 extends down to contact a horizontal push rod 30 extending from the camera housing. A spring 30a, suitably anchored to the camera housing and to push rod 30, always urges push rod 30 to the right, as shown in Figure 25, and thus normally holds lever 27 in its raised position.

Still referring to Figure 25, rod 30 at its left end is pivotally connected to a lever 118 extending forwardly from vertical shaft 119 suitably rotatably supported in the camera housing. The upper end of shaft 119 carries an arm 121 slotted at its end to receive a pin extending upwardly from a cam slide 122 reciprocatable in slot 123 (Figure 24). When the lever 27 is free, spring 30a pulls rod 30 to the right, rotates lever 121 to move and hold cam slide 122 forwardly into its clutch-releasing position. In this position cam slide 122 over-rides a tail 124 of pawl 115, pivots the pawl and holds the latter in its counterclockwise position against the action of spring 117 and partly out of recess 114 and out of a recess 126 in the sleeve 92. In this position, pawl 115 contacts a rigid stop 125 supported from the camera housing and thus not only prevents rotation of shaft 88, but also serves to stop shaft 88 always in a predetermined position.

As already explained, when the elevator seats as shown in Figure 1, and pushes arm 27 down and push rod 30 inwardly (to the left in Figures 2 and 25), cam slide 122 is withdrawn and the pawl is released and is free to seat in its recess 114 under the influence of the spring 117. However, since a portion of sleeve 92 extends within sleeve 111, the released pawl 115 cannot seek its recess 114 until a complementary recess 126 provided in the constantly driven sleeve 92 arrives beneath the pawl. As soon as this condition prevails, the pawl seats completely into the longitudinally aligned recesses 114 and 126 and completes a driving coupling; and the Geneva drive starts.

When cam slide 122 again moves forwardly to release the pawl, as above described, the tail of the pawl which is sharply tapered crosswise at 124 (Figure 24) to present a cam surface to cam slide 122 flush with outer surface of sleeve 111, is cammed inwardly by slide 122. This instantly uncouples sleeve 92 and shaft 88, and the raised pawl engaging stop 125 instantly stops the Geneva drive.

So long as pawl 115 couples drive sleeve 92 and shaft 88 (Figure 25) driver 31 is rotated constantly. It carries an inwardly projecting roller 31b that travels in grooves 31a of Geneva wheel 31c. Each time roller 31b makes a complete revolution, it imparts a quarter turn to Geneva wheel 31c. Referring to Figure 2, Geneva wheel 31c has outer concavely curved portions 31d cooperating in the usual way with convexly curved portions on the hub of driver 31 to align Geneva wheel 31c with driver 31 after each quarter rotation of Geneva wheel 31c.

The successive quarter rotations of Geneva wheel 31c are transmitted to a horizontal shaft 31e (Figure 25) to which Geneva wheel 31c is pinned. Also pinned to shaft 31e is a gear 31f which meshes with a gear 31g pinned to a shaft 31h on which are mounted sprockets 32a (Figure 2) for driving the feed chains 32 as will be described. Each quarter turn of Geneva wheel 31c moves the feed chains a different amount, sufficient to move one element from the transverse channel to the axis O—O, and from the axis O—O to the discharging position. The Geneva drive is more fully described in the above-mentioned application of which this present application is a continuation-in-part.

After each element has been photographed at the optical axis the chains (Figure 2) raise the photographed element to the discharging position designated 49a in Figure 2, where the elements are discharged from the vertical feed channel to distributing elevator DE. The operation of the discharging mechanism is synchronized with the drive of the chains. Referring to Figure 25, shaft 88 has pinned to it a gear 50a which meshes with and drives a pinion 50b pinned to a shaft 50c. Also pinned to shaft 50c is a "barrel" cam 51 in the groove of which runs a cam follower roller 51a mounted between the ends of a lever 51b (Figure 2) pivoted at its upper end from a stud screw 51c (Figures 2 and 25). The lower end of lever 51b is pivotally connected to a horizontal rod 50 carrying an ejector plunger 49 (Figure 2). The plunger 49 would normally show in Figure 25, but has been omitted for the sake of clarity. It is of the type described in more detail in the above-mentioned application of which the present application is a continuation-in-part.

Since shaft 50c and the drum cam 51 rotate continuously, the drum cam is so shaped as to move plunger 49 to eject an element while Geneva wheel 31c is stationary.

Referring to Figures 25, 49 and 52, shutter S with its two apertures $S^1$ is constantly driven, but in synchronism with the operation of the feed chains so that the apertures $S^1$ cross the optical axis only after the feed chains have moved an element to the optical axis and have stopped. Shutter S is driven from shaft 88 which, through bevel gears 88a and 88b respectively pinned to shaft 88 and to a vertical shaft 87 (Figure 52), drive a horizontal shaft 86 through bevel gears 86a. Shaft 86 (Figures 49 and 52) drives shutter S through gear 86b, pinned to shaft 86, idler gear 86c, and gear 86d, to which shutter S is attached. The provision of two apertures $S^1$ in shutter S permits driving shutter S at a lower speed than if only one aperture were provided.

Referring to Figure 52, shaft 88 also reciprocates the holding and aligning bar 340 which, as above described, cooperates with a notch K in each element properly to align it with reference to the optical axis. Gear 86c meshes with and drives a gear 341 mounted on shaft 342 suitably mounted in camera housing C, which shaft carries a cam 343. The element aligning bar 340 is on the outside of the camera housing and is secured to a bar 344 which is on the inside of the camera housing, the two bars together and the camera housing providing a sliding bearing surface for bar 340. Secured to the right end of bar 344 (Figure 52) is a cam follower 344$^a$ urged against cam 343 by a spring 345. For each complete rotation of cam 343 bar 340 reciprocates twice and in synchronism with shutter S and with the movement of feed chains 32, cam 343 being so constructed that point 340$a$ of bar 340 enters each notch K before aperture S$^1$ crosses the optical axis, and leaves each notch K before feed chains 32 start moving.

By stopping shaft 88 always at the same place, the shutter S, feed chains 32, plunger 49 and aligning bar 340 are always stopped in the same places. The feed chains are stopped approximately in the position shown in Figure 50 ready to receive the leading element from a composed line of elements. Shutter S is stopped with its apertures S$^1$ out of alignment with the optical axis. Plunger 49 is stopped while in withdrawing position after having ejected the last element, and bar 340 is stopped on its way toward the vertical feed channel.

Referring to Figures 52, 53 and 54, an auxiliary or safety shutter 358 is provided that assures the optical axis being shut off when aperture S$^1$ passes the optical axis without an element being present at the optical axis. Auxiliary shutter 358 is automatically opened by passage of an element through the feed channel from the transverse channel to the optical axis. It is automatically closed by bar 340 moving leftward (Figure 52) when an element is not present at the photographing position.

Shutter 358 is pivoted on a stud shaft 359 and is connected by a downwardly extending link 360 to an arm 361 suitably fixed to a horizontal shaft 362. Shaft 362 carries an operating arm 363 having a cam face 363$^a$ that extends through a slot into feed channel 22$^a$ between the optical axis and the transverse channel. When operating arm 363 is in its forward position, as shown in Figure 52, an over-centering mechanism generally indicated at 364, and having a spring 364$^a$, holds arm 363 forwardly and auxiliary shutter 358 in a position across the optical axis. But when an element, as shown in Figure 53, passes up through the feed channel, it cams operating arm 363 counter-clockwise, and over-centering mechanism 364 passes through center and snaps auxiliary shutter 358 away from the optical axis, as shown in Figure 54. The over-centering device 364 holds the auxiliary shutter in this position, out of the optical axis, until bar 340 moves sufficiently to the left (Figure 52), as when an element is not present at the optical axis. Bar 344 carries a pin 344$^b$ having a flattened surface that contacts a pin 358$^a$, on shutter 358, when bar 340 moves leftward beyond the point where it would normally be stopped by engaging an element. Thus, if no element is present at axis O—O, pin 344$^b$ rotates shutter 358 against the action of the over-centering device, which snaps shutter 358 into its position across the optical axis before an aperture S$^1$ crosses the optical axis. Auxiliary shutter 358 is always opened when an element is in photographing position before aperture S$^1$ crosses the axis; and is always closed before aperture S$^1$ crosses the optical axis when no element E is in position at the axis.

Mechanism controlling descent of film holder

Film holder 35 is positioned vertically by a vertically movable rack 43 (Figure 41) carrying at its upper end a tip or head 44 on which the bottom of the film holder rests. The vertical movement of rack 43 is controlled from feed rack 25 (Figure 2). The mechanism by which the feed rack moves vertical rack 43, and several auxiliary features, will now be described.

Referring to Figure 2, it will be apparent that whenever the camera unit is swung out from its operating position, bevel gear 39, forming part of the mechanical chain between racks 25 and 43, becomes disengaged from its companion gear 38, so that locking bolt 24 is no longer effective to retain the connected parts 39—43 against movement induced by gravity acting on vertical rack 43 and the film holder. To prevent such movement and sudden dropping by gravity of the film holder, locking mechanism is provided as shown in Figures 2, 26, 27, 28 and 30. The lock comprises a bolt 104 suitably slidably mounted and extending through the camera housing C. To the bolt 104 is pinned a collar 105$^a$ having a flat face 105. The collar is grooved to receive a fixed guide bar 106 extending from the housing and serving to engage and prevent rotation of the collar and a spring 109 urges the bolt 104 to the right. Adapted to coact with the flat face 105 of the collar 105$^a$ is a collar 107 pinned to the rotatable shaft 40 and having a flat face 108 adapted to mate with the flat face 105 when the bolt 104 moves to the right under the urge of spring 109.

In the closed position of the camera unit Figure 26, the bolt 104 is pushed back by abutment of its right end against an adjacent frame portion of the machine, and the flats 105 and 108 of the respective collars are in offset or displaced relation so that the shaft 40 is free to rotate as required upon release of the locking bolt 24. However, when the camera unit is swung open the spring 109 instantly advances the bolt 104 to the right whereby the flat 105 moves into overlying register with the flat 108 and thus locks the shaft 40 against rotation, as shown in Figure 27, in contrast with the non-registering relation of the flats 105 and 108 indicated in Figure 26. As a result, the connected parts 41—43 operatively associated with the shaft 40 are held at rest when the camera unit is swung out of its operating position.

Exchangeable fixed ratio gear units

Referring to Figure 2, the movement of rack 43 produced by a given movement of feed rack 25, to lower the film holder, is adjustable to match the film holder movement with the point size of type being produced. To this end the connection between shaft 40 and rack 43 is made through suitable inter-changeable fixed-ratio gear units having different gear ratios. The ratios of the gear units are selected to control the letter-by-letter advance of the film holder in accordance with the size of the images projected by the selected fixed focus lens carried by the lens turret. And after the point size of type is selected, the proper gear ratio unit is inserted to match the point size desired.

Referring to Figures 1 and 2, the 24-point unit, designated 42, is shown inserted in operative position. The exchangeable gear units not in use are stored in orderly manner in a compartment 185 below the camera unit C on upper and lower cross shafts. The side plates of each unit are provided at their lower ends with a crotch to straddle the cross shafts. Each gear unit is marked on its front face with the point-size of reproduction to which it is suited, and it will be observed that these markings correspond to those on the respective scales on the scale drum 127 as well as those on the lens selecting dial 99 (Figure 2).

Referring to Figures 2, 33 and 34, a selected gear unit is held in operative relation to vertical rack 43 by resting on a cross shaft 186, supported between a pair of brackets 187 suitably secured at the left of the camera housing. For latching the selected gear unit in operative position, a spring-pressed lever 188 engages a notch 189 in the upper edge of one of the side plates of the unit. To replace a unit, lever 188 is manually lifted, whereupon the unit to be withdrawn rocks backward on cross shaft 186, to a position where projecting pin 190 (in Figure 34) lodges in a notch formed in one of the brackets 187.

The driving ratio of each gear unit is dependent upon the gearing provided on its cross shaft 199 which carries a pair of gears fastened together for rotation in unison, and one of which permanently meshes with and is driven by gear 191, which latter gear is of the same size and axial location in all of the units. (It is gear 191 that meshes with gear 41 mounted on shaft 40.) To accommodate gears of different sizes on the shaft 199, this shaft is located differently on the respective units. The location is such that in each instance the gear 192 is positioned to mesh with vertical rack 43 and the gear 192a is positioned to mesh with gear 191. In this way the rotation of gear 41 drives and positions vertical rack 43.

To assure that upper gear 191 and the different ratio lower gears 192a and 192 in the several units will be maintained in timed relation for meshing, respectively, with driving gear 41 and rack 43 when moved into operative position, each unit has a locking mechanism for locking the gears against rotation when the units are not in use. Such mechanism comprises a timing pin 193 (Figures 31, 32 and 34) carried by a spring-pressed lever 194 pivoted at 195 on the inner face of a side plate of each gear unit. When a unit is latched in operative position by the lever 188, the lower arm of lever 194 encounters a stationary pin 196 which rocks the lever counter-clockwise (Figure 33) to move timing pin 193 clear of gear 191. However, when the unit is released, by lifting lever 188, the spring acting on lever 194 rocks it to the position shown in Figure 34 in which position pin 193 engages the teeth of upper gear 191, and holds all the gears in the unit against rotation and in proper timed relation for application of the unit when next required.

Driving gear 41 which, through the selected gear unit selected for the desired point size, transmits the step-by-step advances of line feed rack 25 to the film holder rack 43, is keyed to shaft 40. When it is desired to change a gear unit, gear 41 is shifted axially on this shaft from meshing relation with upper gear 191 of the gear unit into mesh with the vertical rack 43 as shown in Figures 32 and 34. In this position it retains rack 43 and the film holder against gravity descent, because gear 41 is already locked against rotation by the stop 24 (Figure 26). It also frees gear 191 so that the unit may rock backwardly as in Figure 34 for the purpose of exchange. After the unit has been changed and moved into operative position, gear 41 is axially shifted out of mesh with rack 43 and into mesh with gear 191. Figures 31 and 33 show the gear meshing with gear 191, and Figures 32 and 34 show it meshing with rack 43.

To axially shift gear 41, its hub is provided with an annular groove that accommodates a forked arm 196a at the left end of a rack 197 (Figures 2, 31, 32 and 33), the latter being disposed parallel to and above shaft 40, and being slidable in a bearing provided in the wall of the camera unit housing. Rotation of a finger lever 198, carrying a suitable pinion meshing with the rack 197, serves to axially move fork 196a and gear 41.

When a new gear unit is inserted on the brackets 187 and tipped upwardly, its lower gear 192 will mesh with the vertical rack 43 which is held in place by gear 41, and its upper gear 191 will be aligned to mesh with gear 41 when the latter is shifted rearwardly to the position shown in Figure 31, the timing pin 193 operating, as aforesaid, to hold the gears in the gear unit in proper timed relation for such meshing. As seen in Figure 33, when a unit is tipped upwardly into operating position the pin 196 acts to rock the lever 194 on its pivot 195 and thus withdraw the timing pin 193 from locking engagement with the teeth of upper gear 191.

It will be observed that a gear unit cannot be withdrawn without first rotating the finger lever 198 to move gear 41 into meshing engagement with the rack 43, because with gear 41 locked by stop 24, and with gear 41 meshing with gear 191, gear 191 is not free to turn as it would have to move the gear unit to be disengaged with gear 41 meshing with gear 191. This is so because rack 43 cannot move upwardly as it would have to if gear 191 were to rotate about gear 41. Consequently, the only condition under which the gear unit may be withdrawn is after gear 41 has been shifted laterally from gear 191, and into mesh with vertical rack 43.

As shown in Figures 31, 33 and 41, the upper movement of rack 43 is limited by U-shaped bracket 212 (secured to the lower end of the rack) abutting against the underside of a bar 43a, which supports rack 43 in a tongue and groove relationship.

*Adjustment for uniform line-starting margin*

Referring to Figures 22 and 41 as pointed out earlier in the specification, an adjustable head 44 attached to the upper end of the vertical rack 43 serves as a seat for bracket 45 secured to film holder 35. Since the top vertical position of rack 43 is pre-set and is not adjustable, it is the adjustment of this head 44 relative to rack 43 that determines the starting position from which the film holder starts to descend in response to advance of rack 25 upon removal of the first element from a line of elements at the position M—2 (Figure 2).

The purpose of this adjustment is as follows: the recumbently disposed character of the first removed element presented for exposure at the optical axis O—O will be photographically impressed at a mechanically pre-arranged distance from the lower edge of the film because the film holder is advanced prior to (not after) each exposure, and such advance and the extent thereof is controlled by the element moved out of the composed line into position for exposure. For projections in a one-to-one ratio the first character of each successive line will obviously be spaced an equal distance from the edge of the film and thus present a uniform left-hand or line-starting margin. However, should the projections be of an enlarged or reduced size, by virtue of using a lens of other than a one-to-one projection ratio, then the first photographically impressed character would be disposed either closer to or more distant from the left-hand edge of the film. Thus, in order that the first character in any point size of type may be photographically impressed at the proper distance from the left-hand edge of the film, the starting point of the film holder must be correlated to the size of the image to be projected. To this end and to maintain a uniform starting margin for all sizes of type, the invention provides the adjustable head 44 alluded to and which is adapted to alter the starting point of the film holder in accordance with the point-size of type being reproduced.

The mechanism for adjusting head 44 relative to vertical rack 43 includes gears 200, 201 and 202 (Figures 2, 22, 41 and 42). Gear 202 has an upright hub, encircled by a sleeve 203 secured to the hub by a pin 204. Between head 44 and gear 202 is an upright tubular member 205, the lower end of which is provided with a tight fitting shouldered plug 206, formed at its underside with a tongue which engages a complementary slot in the hub of gear 202. At its upper end the tubular member 205 is provided with a tight fitting shouldered plug 207 to which is secured, by a pin 208, the externally threaded member 209.

The adjustable head 44 is internally threaded to receive member 209. A wing portion 210 extends from head 44 and slidably engages a guide 211 secured to the vertical rack 43. This construction holds head 44 against rotation.

Secured to the lower end of rack 43 is a U-shaped bracket 212 formed and disposed at its lower end to encircle the hub of gear 202 between the toothed portion of the latter and the sleeve 203, as shown in Figure 41. Between the underside of bracket 212 and the toothed portion of gear 202 is a notched collar 213 secured to the gear by a pin 214, the notches in the collar cooperating with a bowed spring 215 secured to an upright arm of the bracket 212 to provide a detent action.

As seen in Figures 2, 22 and 41, a flange portion of gear 200 is provided with point-size markings, and by rotation of the gear a spring and ball detent 216 suitably pocketed in the flange may be brought into register with one or another of a series of depressions 217 formed in a detent plate 218 disposed beneath gear 200. The depressions in detent plate 217 are located so as to receive the ball detent when any one of the point-size markings on the gear flange register with the scribe line 219, Figure 22, on the front cover of the camera unit. The notches in collar 213 are located in correspondence with the depressions 217 in the detent plate, the purpose of this double locating means being to assure accuracy of the settings in spite of any wear or play in the gear train.

From the foregoing it will be apparent that rotation of the gear 200 operates, through the connected parts described, to move head 44 vertically relative to rack 43. And since the pitch of the threads by which head 44 is moved is properly coordinated with the transmission ratio of the gearing by which the threaded member 209 is turned, the position of the head 44 and consequently the line-starting position of the film holder will be determined by the point-size setting of the gear 200. As a result, lines of images which are photographically enlarged or reduced over the basic size characters of a given font of elements will be reproduced at the same starting point on the film and thus present the desired uniform left-hand margin.

It will be observed that the point-size markings on the gear 200 correspond to like markings on the scale drum 127, the lens dial 99 and the exchangeable gear units hereinabove described, thus rendering the operation of correlating the settings of these organs a simple matter, requiring no calculation and avoiding the possibility of confusion or error.

Restoration of film holder

After the film holder has completed its downward step-by-step movement to photograph a composed line of elements, it is of course necessary to restore the film holder to its initial starting position as determined by the starting position of the vertical rack 43 and the position of the adjustable head 44. The film holder in the present invention is returned independently of rack 43 by the line-delivery lever 7 moving clockwise to its starting position as shown in Figure 2. Thus the return of the film holder by lever 7 is accomplished not by the mechanical train of connections 25—43 which controls the step-by-step gravity descent of the film holder, but by a link chain 52 connected to delivery lever 7 at one end by a hook 53, and to a hook 53a (Figure 37a, Sheet 10) secured to the rear of cover 55 of the film holder. Between delivery lever 7 and hook 53a, the chain passes over a series of sprockets by which its direction is suitably changed so that the vertical passage of the chain is approximately aligned with the vertical axis of the hinges 101, Figure 23, supporting the camera housing.

When the lever 7 makes its leftward or line-delivery stroke, an initial amount of slack is induced in the horizontal portion of chain 52 between hook 53 and the lower sprocket 54, the amount of slack depending upon the extent that lever 7 travels in moving finger 5 to stop 11. The slack is always sufficient as lever 7 swings further to permit the step-by-step descent of the film holder during the element-removing operation. During the return stroke of lever 7 the film holder starts its upward movement as soon as the lever swings far enough to take up the slack in the chain, which operation is always accomplished before arm 10 of finger 5 engages the bracket 46 (Figure 4) to start the return movement of rack 25. When finger 5 returns to be engaged by latch 9 (Figure 2) lever 7 has fully elevated the film holder, which is then held above the starting position of head 44. As previously pointed out, as finger 5 is latched, cam 350 (Figure 16) raises depressor 23, whereupon the locking rod 24 springs upwardly to lock spur gear 27, to retain in starting position the train of connections 25—43.

Accordingly, the train of connections 25—43 which are moved reversely by the return movement of rack 25 are not subjected to such strain and wear (detrimental to the precision with which they are made to assure accurate letter spacing) as would result if they were called upon to lift the weight of the film holder after completion of each line of exposures.

Advance of film for line spacing

After completing each line of exposures the film is advanced to present a fresh area for the next line. According to the present invention, such line-spacing advance of the film is effected by mechanism actuated from the main cam shaft of the machine after the film holder is fully restored to its top position, instead of by devices operating during the upward or restoring movement of the film holder as in the machine of our application Serial No. 587,062 referred to at the start of this specification.

Referring to Figure 22 (Sheet 11) and Figure 37a (Sheet 10), film holder 35 carries on one side a light tight supply case 81, and on the other side a light tight receiving case 82. Referring to Figures 36a and 37a (respectively on Sheets 11 and 10), the roll of film in holder 81 passes through film holder box 35 and into the receiving case 82. It is caused to move from case 81 into case 82 by rotation of scored discs 79 and 80, which discs are driven, and by reason of their friction engagement with the film (shown in solid lines in Figure 37a) cause the film to advance rightward as shown in Figure 37a. An idler roller 80a, aligned with discs 79 and 80 and mounted in back of the film supports the film for its friction engagement by discs 79 and 80.

Discs 79 and 80 are fixed to a vertical shaft 78, suitably rotatably mounted in the film holder as will be described in more detail. Shaft 78, as shown in Figure 22, extends through the top cover 55 and through the bottom cover 56. The scored discs 79 and 80 are respectively located inside but adjacent the top and bottom covers.

The line-spacing film advance is accomplished by rotating shaft 78 and the discs 79 and 80 in steps. As shown in Figure 36a (Sheet 11) both the upper and lower ends of the vertical shaft 78 that extend beyond the film holder 35, carry clutch mechanisms. The upper clutch mechanism is used in connection with mechanism for manually producing incremental line-space advance of the film, as will be described. The lower clutch mechanism is used for the automatic line-space advance with which we are at present concerned. Both clutch mechanisms operate in and are constructed in the same manner. The details of the upper clutch mechanism are shown in Figures 39 and 40 (Sheet 5). A general view of the lower clutch mechanism looking up from the bottom is shown in Figure 37 (Sheet 11).

Referring to Figures 37, 38, 39 and 40, each clutch member has an outer ring member, that of the lower clutch mechanism being 83 and of the upper one being 83a. The clutch mechanisms are of the conventional slip-clutch type. Referring first to the upper clutch mechanism, its ring member 83a is essentially dish-shaped and is pinned to shaft 78. Inside ring member 83a is a clutch rotor 223 freely rotatable about shaft 78. Pinned to rotor 223 and also concentric with shaft 78 is a member provided with teeth which mesh with a pivotal member 220, rotatable about a shaft or pin 221, mounted in the top cover 55. The clutch rotor 223 is provided with cut-out portions which carry balls spring-pressed against the inner surface of ring member 83a. When the clutch rotor 223 is rotated counter-clockwise as viewed in Figure 39, the balls move freely over the inner surface of the ring member 83a. But clockwise rotation of rotor 223 forces the balls against the rotor and ring member 83a and sets up a driving engagement between the rotor and the ring member.

Referring now to Figure 37 which shows the lower clutch mechanism, we see a clutch rotor 77a similar to that of rotor 223 of the upper clutch mechanism. It is within the ring member 83 which is identical to that of ring member 83a, and which is pinned to the shaft as in Figure 36a.

Clutch rotor 77a is secured to the inner side of a pulley 77 and both are freely rotatable on shaft 78. With this construction, clockwise rotation of rotor 77a as viewed in Figure 37, results in no driving engagement between it and ring member 83 and shaft 78. But counter-clockwise rotation results in immediate and positive driving engagement.

To rotate pulley 77 and clutch rotor 77a, a wire belt 76 is wrapped around pulley 77; one end of the wire belt is secured at point 74 to a bar 57 suitably mounted for endwise sliding movement on the bottom cover 56, and the other end is secured at point 75 to this same bar 57. With this construction, movement of the bar 57 to the left (Figure 36a) drives pulley 77 and its rotor 77a clockwise, but does not drive shaft 78. But movement of bar 57 to the right drives pulley 77 and rotor 77a counter-clockwise, and the balls engage and drive ring member 83 and so drive the shaft 78 to feed the film forwardly.

Bar 57 is moved leftward by spring 59 (Figure 37) fastened to a pin 59a on bar 57 and to a hook extending from cover 56. Movement of bar 57 to the right (its film line-space producing movement) is accomplished by lever 60 (Figure 36a) pivoting about shaft 61 and contacting a suitable roller 58 carried by bar 57. The extent of the right-hand movement of bar 57 is fixed and is determined by the movement of a lever 60 mounted on shaft 61. The extent of the left-hand movement of bar 57 is adjustable in accordance with the point-size of type being produced. Thus the reciprocation of bar 57 is between an adjustable position and a fixed position.

Referring to Figures 22, 36a and 37, the extent of the line-space advance of the film is made adjustable by a drum 70 having a stepped surface 73. The drum is pinned to a shaft 71 at the right end of which is a dial 72 for rotatably setting the drum 70 according to a point-size scale on the dial. Setting the dial brings a corresponding step of surface 73 into alignment with a pin 69 carried by bar 57 which pin engages the step and limits the leftward stroke of bar 57. For small point-size type the leftward stroke of bar 57 is less than for larger point-size type, and consequently the rightward movement of bar 57 is less, and the line-space advance of the film is less.

Turning now to Figure 16a, mechanism for rocking shaft 61 and operating lever 60 is shown. Shaft 61 carries a downwardly extending lever arm 65 (shown in side elevation in Figures 43, 44 and 45) normally held against a stop 65a by a spring 65d, and in this position the lever 60 is at its inactive position out of contact with roller 58.

Returning now to Figure 16a, the downwardly extending end of lever 65 normally engages a roller 64d carried on an arm 64b of a bell crank 64, suitably supported in a bearing 64c from the housing 260. The other arm 64a of bell crank 64 is connected (Figures 16 and 17) to rod 62 which at its other end is connected to a lever 63 pivoted at 264. Lever 63 carries a follower 63a which cooperates with a cam 66 carried by the main cam shaft 267. A spring 68 urges rod 62 leftward (Figure 16) and cam-follower roller 63a against cam 66. A lost-motion device 62a (of conventional type) is provided in rod 62 so that positive movement of rod 62 to the right by cam 66 can take place even though lever 65 is not free to move for reasons that will be hereinafter described.

Returning now to Figures 35, 35a, 36 and 36a (Sheet 11) bar 57 is moved to the right by cam 66 through the mechanical train just described. The operation is as follows: cam 66 in Figure 36 is ready to start to swing lever 60 clockwise, and in this position of cam 66 cam 293 (Figure 17) has swung lever 7 to its starting position and has returned film holder 35 to its topmost position. As cam 66 continues to rotate it forces cam roller 63a and lever 63 clockwise, and simultaneously swings lever 60 clockwise. As lever 60 swings clockwise, it engages roller 58 carried by bar 57, at which moment it starts to move bar 57 to the right. It is during this rightward movement of bar 57 that the aforesaid clutch associated with shaft 78 grips and thereby turns the shaft to advance the film for the line spacing. Figure 35 shows cam 66 holding bar 57 at its extreme right position. Further rotation of cam 66 moves its receding contour beneath follower roller 63a, and allows spring 66 to swing lever 60 anti-clockwise to its normal inoperative position which, as shown in Figure 43, is determined by stop 65a and which position as shown in Figure 36 is well to the left of the leftmost position of roller 58 of bar 57. Bar 57 and roller 58, under the urge of spring 59, follow the retreat of lever 60 until the leftward movement of bar 57 is stopped by pin 69 contacting that step on drum 70 that is in its path. Thus the amount shaft 78 is turned and the amount the film is advanced is determined by the position that roller 58 of bar 57 occupies when lever 60 contacts it to move it to the right as shown in Figure 35.

Cam 66 continues to rotate until the main cam shaft 267 stops at its starting position, at which time the point marked X on cam 66 comes to rest beneath cam-follower roller 63a. As above-pointed out, cam 267 comes to rest at this position at the end of a complete cycle.

*The "jogger" for manual incremental line-space advance of the film*

In addition to the mechanism already described for automatic line-space advance of the film, the invention provides for advancing the film manually when it is desired to widen the space between lines or paragraphs for purposes of emphasis or for insertion of titles or the like. Thus, without disturbing the setting of the automatic line-space mechanism (the stepped drum 70) the operator may at any time advance the film measured amounts by actuating the "jogger" lever 85 (Figure 22) associated with the top clutch mechanism located at the top of the film holder. Referring to Figures 38, 39 and 40 (Sheet 5) it will be seen that the lever 85 is secured to the toothed member 220 pivoted on pin 221 in top cover 55 of the film holder, and that the teeth on the member 220 engage teeth on a similar member 222 secured to the underside of clutch rotor 223, the latter being freely rotatable about the shaft 78. A spring 224 acts to hold lever 85 in its normal or inactive position resting against a wall 225 of a slot in the cover 84.

As earlier stated, ring member 83a of this clutch is secured to the upper end of shaft 78, as by a pin passing through the shaft and through a small hub projecting downwardly from the underside of the ring member (Figure 40). When shaft 78 is actuated by the lower clutch, the upper clutch ring 83a which turns with the shaft simply runs free with respect to its rotor 223.

As will be apparent, movement of lever 85 in the direction indicated by the arrow effects rotation clockwise of clutch rotor 223 and its balls grab the clutch ring 83a to turn it and shaft 78 clockwise.

The mechanism functions to increment rather than to effect a full line-space advance of the film. In the parlance of the printer such incrementation simulates the operation of "leading out" between lines by inserting blank strip material made of lead.

In practice the amount by which it is necessary or desired to increment the spacing between lines depends upon several factors. Among them is the necessity to insert a subtitle in a column of matter or the need to open up the space between paragraphs for the sake of emphasis or appearance. Also the need to "stretch" a column in order to fill it out to a given column length on a page, or to provide more head space than foot space, respectively, above and below an inserted subtitle or main title.

To meet these and other variable conditions requiring more or less alteration of the line spacing attained automatically, the slidably adjustable stop 226 is provided for regulating the stroke of the "jogger" lever 85. For practical purposes the stop 226 is provided with steps 227 by which, according to the setting of the stop, one stroke or jog of the lever 85 will effect an advance of the film from 1-point (.014″) to 6-points (.084″). The spring 224 acts to return the lever 85 after each film advancing stroke, and it will be apparent that with the stop set, for example to effect a 2-point advance, a 4-point advance can be attained simply by jogging the lever twice. In other words, it is not necessary constantly to change the stop, but the provision of six steps has the advantage of enabling the operator to set the stop initially to a position which is best suited to a given job or type-size, thus eliminating the necessity of keeping in mind the number of jogs required to be made and the consequent possibility of errors.

From Figures 22, 38 and 40 it will be observed that the upper end of the shaft 78 is provided with a knurled knob 78a, the purpose of which is to advance the film manually when threading in the leading end of a new supply or when taking out a used portion. Thus, to thread in a new supply of film contained in case 81, a portion of the film is unrolled in daylight and led into the holder until engaged by the milled discs 79, 80, whereupon the knob 78a is turned to advance the useless (exposed) portion of the film past the exposure aperture. Should it be desired to cut off a portion of film containing a line or lines of a given body of composition in order to develop such portion before the supply of film is exhausted, the knob 78a is given one full turn in the direction indicated by the arrow in Figure 38, which is sufficient to advance the last exposed line from the exposure aperture into the receiving container 82. A full turn of the knob is indicated when the scribe mark 78b on a flange attached to the knob arrives in register with the particular graduation on a fixed ring 79c from which it started.

*Line-blankout mechanism*

As hereinbefore pointed out, it is at times desirable to pass a composed line of elements through the photographing mechanism without photographing the characters of the elements. For example, if in following his manuscripts the operator should inadvertently skip a line or compose a wrong line, or leave out a word, or underset or overset a line, or make any other error which is too time-consuming to correct by hand manipulation of the elements in the assembling elevator, the most efficient procedure is to allow the unwanted line of elements to circulate and distribute without photographing, while the operator meanwhile composes a new line.

The present invention provides novel and useful mechanism that acts, when an unwanted line or lines of elements may be circulated (1) to prevent light from reaching the film and (2) to render ineffective the line-advancing mechanism for advancing the film.

Referring to Figure 1, there is shown in the front of the camera unit housing a handle 296a with which the operator, by depressing, can cause unwanted lines of elements to circulate through the machine without being photographed and without causing a line-space advance of film.

Turning now to Figures 43, 44 and 45, handle 296a is mounted on a lever 296, one end of which extends forwardly through an opening 98a in camera housing cover 98, and the other end of which extends rearwardly in the camera housing C. Lever 296 is fixed to a shaft 297 suitably mounted in bearings in opposite sides of the camera housing. The lever 296 at its inner end carries a link 298 which receives in a notch a pin 300 fixed to an auxiliary shutter bar 299 suitably slidably mounted in the camera housing, and carrying at its upper end an auxiliary shutter 301. A spring 300a holds link 298 in engaged relation with the pin 300. When blank-out lever 296 is pushed down, i. e., when its 296a is pushed down, auxiliary shutter bar 299 is shifted upwardly and moves auxiliary shutter 301 to a position across the optical axis O—O, and in this position it prevents any light from passing through shutter apertures S—1 as they cross the optical axis O—O during rotation of the shutter S, see Figure 52.

When blank-out lever 296 is pushed down as just described, and referring now to Figures 43, 44 and 46, mechanism is also operated to prevent lever 60 from rocking forward to engage roller 58 of bar 57 to line-space the film. To this end, shaft 297 carries at its left end, that is its end next to the inside left wall of the camera housing C, an L-shaped lever 302 whose right arm, as viewed in Figure 43, is provided with a yoke 302a which embraces a pin 303 extending from an L-shaped slide 304 suitably mounted, by means of a strap 305 shown in Figures 45 and 46, for vertical sliding movement along an inner wall of the camera housing C. Resting on top of slide 304 is a rod 306 suitably supported for vertical movement by supports 307 extending from the camera housing C. On top of rod 306 rests a pin 308, carried by a lever 309, the latter being pivoted from the camera housing C by a stud shaft 310 and normally urged counter-clockwise by a spring 311 having one end anchored to the camera housing C and the other end secured to lever 309.

Lever 309 is disposed in the same vertical plane as is the lever 65b pinned to shaft 61, there being also pinned to this shaft the depending lever arm 65 and the line-spacing lever 60.

As previously pointed out (referring to Figure 43), after the film holder is returned to its top or line-starting position, cam 66 rocks lever 60 counter-clockwise to move slide 57 leftward to accomplish the line-space advance of the film. But when blank-out lever handle 296a is pushed down, and the auxiliary shutter thus moved to close the optical axis O—O, the L-shaped lever 302 rocks along with the shaft 297 and in so doing it pushes slide 304 and rod 306 upward. In turn, the lever 309 is rocked clockwise to position its tip 309a, as shown in Figure 44, in line to be engaged by lever arm 65b when the shaft 61 to which it is pinned is free to rock clockwise in response to cam 66. With the parts in the position shown in Figure 44, when roller 64d moves, in response to cam 66, to engage and swing lever arm 65 counter-clockwise, the lip 65c at the upper end of lever arm 65b hooks over the tip 309a, and swinging of the lever arms 65 and 65b is stopped and consequently lever 60 does not operate to advance the film for a line-space.

Referring to Figure 16 (Sheet 7) the lost-motion connection 62a yields during the time that the cam 66 is trying to force lever 60 counter-clockwise as shown in Figure 44 so that the parts are not strained.

Mechanism is provided for automatically restoring or re-setting the line blank-out lever 296 to its normal inoperative position after an unphotographed line of elements has been run through. To this end, referring to Figures 43, 44 and 45, the L-shaped lever 302 on shaft 297 carries on its upper arm 302b a pawl 317 suitably pivoted for rocking movement but urged counter-clockwise by a spring 319. The right end of pawl 317 carries a pin 318 adapted to contact a cam surface 304a on the L-shaped slide 304. The other end of pawl 317 carries an operating pin 320. When the slide 304 is in its lower or normal position (Figure 43) engagement of pin 318 against cam surface 304a holds pawl 317 in its clockwise position against the action of spring 319. But when the blank-out lever handle is pushed down, whereby L-shaped lever 302 acts to raise slide 304 (Figure 44), pawl 317 is free to respond to the urge of spring 319 and swings to a counter-clockwise position to the extent that its pin 320 rests on the top edge of a pawl driving arm 315.

Mechanism operated by rack 43 returning to its uppermost position operates the pawl 317 in such manner as to cause it to rotate shaft 297 and to return blank-out lever 296 to its inoperative position. This mechanism (referring to Figures 46 and 48) includes a double-ended camming lever 312 secured to a sleeve 313 freely rotatable on shaft 297. Camming member 312 is located outside of the camera housing C as shown in Figure 46. Also mounted on shaft 297 is a second sleeve 316 which carries a pawl driving arm 315 located inside the camera housing C. The two sleeves 313 and 316 are keyed together at 314 (Figure 48) so that they rotate freely as a unit on shaft 297, but are separable for assembling and disassembling purposes. The parts are normally urged counter-clockwise (referring to Figure 45) by spring 312c secured at one end to the camera housing and at its other end to the lower part of camming lever 312.

Referring to Figures 43 and 43a, camming lever 312 is normally held in the position shown by slide 304 contacting the surface 312b of the camming lever. When so held, the camming lever 312 remains stationary when the rack 43 descends. But if at the time the rack descends the slide 304 has been raised, as shown in Figure 44a, then as the rack lowers and face 212a of bracket 212 moves away from surface 312a, camming lever 312 is free to turn counter-clockwise under the influence of spring 312c to the position shown in Figure 45a. Due to the key connection between parts 312 and 315 such counter-clockwise turning of camming lever 312 also turns the pawl driving arm 315 to the position shown in Figure 45, whereupon the pin 320 carried by pawl 317 enters into the notch 315a in arm 315.

Now, as rack 43 is restored to its upper or starting position, the vertical face of bracket 212 engages face 312a of camming lever 312 and swings this lever back to its vertically aligned position; and as it thus swings, the pawl driving arm 315 swings likewise and its notch 315a pushing against pin 320 causes pawl 317 to drive the L-shaped lever 302 clockwise. This latter action lowers slide 304 by reason of engagement of the arm of lever 302 with pin 303. Further, since lever 302 is pinned to shaft 297, the driving action applied to this lever rocks this shaft and thus returns blank-out lever 296 to its inoperative position, and simultaneously moves auxiliary shutter 301 down and out of the path of optical axis O—O.

This operation obviously takes place during the last stage of ascent of the film holder to its topmost or line-starting position and before cam 66 has rotated to the point (Figure 36) to move lever 60 into contact with roller 58 carried by slide 57. Lowering of slide 304 would of course normally permit rocking of lever 309 (Figure 44) counterclockwise and out of line with the upright lever arm 65b and thus permit lever 60 to operate the film advancing slide 57. But such is prevented by providing on cam 66 (Figures 16 and 36) a surface 66a which engages roller 63a of lever 63 to move lever arm 65 (Figure 45) away from stop 65a and the lip 65c into engagement over the tip 309a of lever 309 before the bracket 212 engages camming arm 312 (Figure 45a) during the ascent of the vertical rack 43. The lip 65c (Figure 45) extending from the upright lever arm 65b holds lever 309 from moving counter-clockwise, under the action of its spring 311, after rod 306 is lowered by the lowering of slide 304. In this way operating lever 60 is prevented from functioning to advance the film for line-spacing even though the other parts of the line-blankout mechanism have been returned to their inoperative positions.

The very slight movement of lever arm 65b to engage and hold lever 309 after slide 304 is lowered is not sufficient to move lever 60 to a position where it could engage roller 58 of bar 57, even when bar 57 has moved to its extreme left position by reason of cam 66 being set for the maximum line-space film feed.

As soon as cam 66 rotates to an extent (Figure 16) to release the lever arm 65 from contact with roller 64d, lever arms 65 and 65b are freed to respond to the action of spring 65d which pulls the arm 65 against stop 65a and pulls lip 65c away from end 309a of lever 309. Spring 311 then acts to rock lever 309 to its counter-clockwise position out of alignment with lever arm 65b, as shown in Figure 43.

Referring to Figure 43, during the upward movement of the rack 43 which drives pawl 317 to turn shaft 297 and lower slide 304, the cam surface 304a engages the pin 318 on pawl 317 and pivots the pawl clockwise. This action lifts pin 320 out of notch 315a and disconnects the drive between the camming arm 312 and shaft 297. The remaining or full movement of the slide 304 and lever 296 required to return these parts to their inoperative positions is by the action of the following described detent mechanism.

Thus, referring to Figures 43 and 44, shaft 297 carries a cam 327 having two faces 327a and 327b which cooperate with a roller 328 suitably carried in a support 329 and urged upwardly by a spring 330. When roller 328 pushes on surface 327a, it causes shaft 297 to turn lever 269 to its horizontal inoperative position shown in Figure 43. When roller 328 engages surface 327b it holds shaft 297 and lever 296 in their operating positions shown in Figure 44. As shaft 297 is turned by pawl 317, roller 328 rides onto surface 327a which is provided with a sufficiently steep slope to enable the spring 330 and roller 328 to complete the above-mentioned full return of lever 269 and slide 304 to their inoperative positions. The surface 327b is only slightly sloped, as shown in Figure 45, so that there is only a relatively light resultant force holding the lever 296 in its operating position. This force is easily overcome by the action of pawl 317 at the time the blank-out lever is returned to its inoperative position.

Provision is also made for holding the blank-out lever 296 in its blanking-out position when it may be desired to pass successive composed lines of elements through the camera unit, for testing purposes in respect to the elements or the mechanism by which they are circulated through this unit. Referring to Figures 2 and 30, a push button 321 is mounted to project through the front cover of the camera housing. Button 321 at its left end carries a rack 322 meshing with a pinion 323 carried by a shaft 324 (Figure 46) suitably journaled in the side walls of the camera housing. Referring to Figures 43 and 44, shaft 323 carries a part 326 adapted when turned to the position shown in Figure 47 to block counterclockwise turning of arm 315 which in turn prevents pin 320 on pawl 317 from entering the notch 315a. Thus, whenever part 326 is in this turned position and pawl 317 rocks counter-clockwise, the pin 320 is prevented from engaging the pawl-operating arm 315. Accordingly rack 43 when returned to its uppermost position does not turn shaft 297, wherefore the blank-out lever 296 is not returned to its inoperative position.

Thus to maintain the blank-out mechanism in operation, as when desired to circulate and distribute elements without photographing them, it is only necessary to push the button 321 inwardly after the handle 296a has been pushed down. Pushing button 321 inward causes the part 326 to turn into its operating position in the path of the pawl driving arm 315, as shown in Figure 47.

To restore the blank-out mechanism to its inoperative position after button 321 has been pushed in, a cam 325 is provided on shaft 324 (Figures 30 and 47) adapted to be engaged by the pin 296b carried by lever 296. Thus, by manually raising handle 296a (Figure 47) cam 325 is turned counter-clockwise, shaft 324 is correspondingly turned and button 321 is driven outward, whereupon part 326 is turned out of engaging relation with the arm 315 (Figure 43), clockwise rotation imparted to the lever 302 by such raising of handle 296a operating to drop the block 304 and shutter 301 being simultaneously pulled down.

Line-counting mechanism

The invention includes mechanism for counting and recording the number of lines composed by an operator and actually photographed by the machine, and mechanism for throwing such counting mechanism out of operation (a) whenever composed lines are being circulated through the camera unit while the blank-out lever is down and the elements are not being photographed, and (b) whenever the camera unit is swung open.

Referring to Figure 2 (central lefthand portion) a counter of conventional construction, generally indicated at 331 and comprising a series of numbered rotatable disks, is visible through an elongated opening in the front cover 98 of the camera housing. Referring to Figures 26–30, the counter carries an operating arm 332 having a pin 332a, and each oscillation of the arm by action upon pin 332a is registered by the counter. Arm 332 is operated each time the depressing rod 24 is operated to release a composed line of elements for passage through the photographing position. To this end rod 24 carries a collar 24a on which rests one end of an actuating lever 335 pivoted on the camera housing at 333, this lever carrying at its other end a pin 335a adapted to contact the pin 332a of the operating arm 332. A spring 334 continually urges lever 335 clockwise and against the collar 24a. In Figure 26 collar 24a is shown in the raised position it normally stands prior to releasing a line of elements for photographing, and lever 335 bearing on collar 24a is held in the counter-clockwise position shown. In Figure 28 collar 24a has been lowered by the depressing of rod 24 to release a line of elements for photographing, and lever 335 has swung clockwise to the position shown by the action of spring 334.

Whenever the blank-out lever is pushed down to blank out a line, the actuating lever 335 is prevented from rocking on its pivot 333, and consequently depressing of the rod 24 does not affect any register on the counter. To this end, and referring to Figures 26 and 29, a lever 336 suitably pivoted at 337 is provided at its upper end with a hook 336a, and at its lower end a cam surface 336b. A spring 338 urges lever 336 counter-clockwise as shown in Figure 28, and as the blank-out lever 296 is pushed down, the pin 296b carried by this lever rides over the cam surface 336b and swings lever 336 clockwise, the hook 336a in this lever then hooking over a pin 339 carried by the actuating lever 335. Thus, when the parts are in the blank-out position shown in Figure 29, lowering of collar 24a does not permit the lever 335 to operate and the counter is accordingly unaffected.

When the camera housing unit is swung away from its operative position, as shown in Figure 27, the lever 335 under the influence of its spring 334 would normally rock clockwise to produce a counting operation of the lever 332. But such is prevented by providing a locking lever 340 having offset upright and depending arms and pivoted at 341 from the camera housing. The depending arm of lever 340 has a notch 340a to receive the pin 335a carried by the actuating lever 335. The upright arm of lever 340 has a tip 340b adapted to contact the block 105a secured to rod 104. A spring 342 urges the tip 340b against the block 105a. When the parts are in the position shown in Figure 27, i. e., with the bolt 104 and its block 105a moved to the right into locking position with the collar 108, the lever 340 is positioned with its notched end 340a engaged over the pin 335a and lever 335 is thus held from rocking clockwise under the action of its spring 334. But as shown in Figure 28, when the camera unit is closed and locked in its operative position, bolt 104 is moved to the left and block 105a holds the notch in the depending arm of lever 340 out of the path of pin 335a, operation of the counting mechanism then being free to take place.

*Fixed focus lens*

As pointed out earlier, different magnifications are required to produce different point sizes, and in the present invention this different magnification is accomplished by providing a plurality of fixed focus lens. In Figure 1, a handle 99 is shown by which the fixed focus lens may be selected. Referring to Figures 25 and 49, a lens turret L is shown. It carries a plurality of fixed or prefocused lens L—1. The respective lens are designed to project an image of the point-size indicated on one of the scales of the drum 127.

The turret L is rotatably mounted on a horizontal shaft 143 which is fixed against rotation in the upright bracket 144 within the camera unit C. The lens tubes are threaded into a notched disc 145 to which is secured a toothed disc 146, these discs (adjacent bracket 144) constituting the base of the turret assembly. The shaft 143 is somewhat longer than the lens tubes and is threaded and shouldered at its free end to receive the unitary circular lens cap or cover 147. The cover 147 remains stationary when the turret is turned on the shaft 143 to position a desired lens in alignment with the aperture piece 148 secured to the fixed cover 147 at such position as to align with the optical axis O—O.

For turning the lens turret there is provided a knob 149 secured to a shaft 150 the turning of which, through suitable gear and shaft connections such as indicated in Figures 6 and 12 operates to turn the gear 151, the latter meshing with the toothed disc 146, whereby to transmit rotation to the turret. For accurately locating a selected lens before the aperture piece 148, there is provided a spring-pressed lever 152 pivoted at 153 on the bracket 144. At its free end the lever 152 carries a roller 154 adapted to seat in the respective notches 155 in the edge of the disc 145. As partly visible in Figure 22, it will be seen that the lens turret dial 99 bears point-size markings corresponding in sequence and value to those at the right-hand end of the line-measure scales on the scale drum 127, thus enabling the operator to select, by direct reading, the correlated lens and scale for a desired size of reproduction.

The rotary shutter 8, which lies just behind the bracket 144 carrying the lens turret, is also shown in Figure 49. As hereinbefore stated, the shutter is driven at a constant speed through connections including the shafts 86 and 87 operated from the driving clutch shaft 88, see Figure 52. The timing of the shutter drive is such that an aperture $S^1$ therein crosses the optical axis O—O the instant each element is positioned for exposure.

The provision of the turret with the fixed focus lenses to change the magnification to obtain different point sizes has made it possible to materially simplify the construction of the photo-composing machine and has made it possible to simplify the change from one magnification to the other. Thus, one of the advantages of the fixed focus lenses is that the distance between the photographing position of the elements and the sensitized surface of the film may be made constant for all magnifications and the entire camera unit may be made compact and the mechanical chain by which the film holder is lowered in steps is greatly simplified. Also the construction supporting the film holder is readily constructable in a compact form so that errors due to temperature variations and the like do not have to be taken into consideration.

*Pick-up lugs on the element feed chains*

In Figures 25 and 50, there is shown an improved form of pick-up lugs 33 provided on the element feed chains 32. As already stated, these lugs are arranged at appropriate intervals and in opposed pairs on the front and rear feed chains, see Figure 25, and are freely pivoted on the appropriate opposed links of the respective chains. Further, the free spans of the chains adjacent the element feed channel are steadied and guided by engagement with ribs indicated in Figure 50 on the side plates 22d, and with the similar ribs on the plate 22c.

The lugs 33 project into the grooves 22a which accommodate, with slight clearance, the upper and lower ears of the elements and the lugs are provided with a notch 34 which in an opposed pair of lugs is adapted to embrace the lower ears at each side of an element E at the head of a line of elements compacted against the bar 22. As seen in Figure 51, such element at the head of the line is supported on a ledge 228 at the bottom of the opening 229 provided in the plate 22b for the passage of the elements to the bar 22. The ledge 228 extends forwardly, in a direction away from the bar 22, far enough to receive and support the leading element from its bottom just prior to the moment the upper ears of this element leave the usual supporting rails 230 provided in the line-delivery channel.

For limiting the extent of free rocking of the lugs 33 on their pivots 231, the pin 232 projects into an enlarged aperture 233 formed toward the upper end of each lug. Since the span of the chains which runs in the feed channel is traveling upwardly, see Figure 2, the freely pivoted lugs 33, after rounding the lower sprockets, will most naturally hang in the backwardly rocked position indicated in Figure 50 as they approach an element resting on the ledge 228. Accordingly, the short lower ledge of the notch 34 in an approaching pair of lugs will be disposed in the path of the ears of the element. Then, due to the continued upward movement of the chains and the mild resistance of the element to displacement (by reason of the leftward pressure on the line of elements), the lugs will be rocked forwardly as the ears of the element enter the notch 34. To assure that the lugs assume a full upright position, in case of binding or for other reasons, the side plates 22d secured to the bar 22 are formed with the cam surface 234 over which the rear upper edge of the lugs must pass in their upward travel.

The lugs 33 retain their engagement with the lower ears of each element until the element arrives at the top of the feed channel where it is discharged laterally by the pusher 49 onto the second elevator bar 26. And as previously explained, the chains 32 are driven intermittently by the Geneva drive C, whereby they are momentarily stopped for exposure of each element at the photographing position in the feed channel.

Lugs 33 are light in weight and if a lug 33 is not tipped in the position shown in Figure 50 at the time it rises to engage an ear of the element, the leading edge of the lug is so sloped that when it engages the ear the lug tips to the position shown in Figure 50. Since the lugs are so light in weight any contact between the leading edge of the lug and an ear of the element does not produce wear on the ear and does not tend to force the element upwardly.

The inner vertical surface that extends upwardly from cam surface 234 also serves to prevent lugs 33 from rocking to release an ear engaged by the lug when the feed chain stops abruptly to position the element at the optical axis and later at the discharging position. In other words lugs 33 are held in engaging position over the ears and positively stop ascent of the elements at the photographing and discharging positions even though the momentum of the moving elements might otherwise have carried them beyond the optical axis or discharging position.

Since many embodiments might be made of the present invention and since many changes might be made in the embodiment disclosed herein, it is to be understood that the foregoing description is to be interpreted as illustrative only and not in a limiting sense.

We claim:

1. In apparatus for producing justified lines of type matter of desired type size by photographically reproducing in line on a sensitized surface in the same or reduced, or magnified size, the characters of individual character-bearing elements successively removed from lines thereof composed from a given type size font of such elements and including, an optical system adjustable to change the size of the projected images of said characters to produce the desired type size from the characters of said font, a line-assembler for receiving the elements as they are composed into a line, a line-resistant finger associated with the line-assembler and progressively moved from a starting position by the elements as they are composed into a line, and a justifying channel into which each composed line of elements is moved as a unit from said line-assembler, the combination of a line-stop movable along said justifying channel to line-measure positions proportionately related to justified lines of type matter of the desired length and type size, a scale-supporting member having an em scale graduated in proportion to the adjustment of said optical system required to photographically produce the desired type size from the characters of said font, a pointer mounted to cooperate with said scale, said pointer and scale being relatively moved by said line-resistant finger to indicate in ems the length of the line of type matter that the assembled line of elements will produce, line-length selecting means manually operable to relatively move said scale and pointer independently of said line-resistant finger to set said pointer and scale to indicate in ems the desired length of the line to be produced in the desired type size, and a mechanical train connecting said line-length selecting means and said line-stop and operative to move the line-stop in correspondence with the manually produced relative movement between said pointer and scale.

2. In apparatus for producing justified lines of type matter of desired type size by photographically reproducing in line on a sensitized surface, in the same or reduced or magnified size, the characters of character-bearing elements composed from a given type size font of such elements, the combination of a justifying channel adapted to hold a composed line of elements, a line-stop movable along said justifying channel to line-measure positions proportionately related to justified lines of type matter of the desired length and type size, a scale-supporting member having an em scale graduated in proportion to the reduction or magnification required to photographically produce the desired type size from the characters of said font, a pointer mounted to cooperate with said em scale, line-length selecting means manually operable to relatively move said pointer and scale to set the relation between said pointer and scale to indicate in ems the desired length of the justified line to be produced in the desired type size, and a mechanical train connecting said line-length selecting means and said line-stop and operative to move said line-stop in correspondence with the manually produced relative movement between said pointer and scale.

3. Apparatus as set forth in claim 1 and in which said scale-supporting member supports a plurality of em scales each graduated in proportion to such different adjustments of said optical system as are required to produce desired type sizes from the characters of said font, and mechanism operative to move said scale-supporting member to bring into operative relationship with said pointer the em scale appropriate to the adjustment of said optical system.

4. Apparatus as set forth in claim 1 and in which said scale-supporting member comprises a drum supporting a plurality of em scales each graduated in proportion to such different adjustments of said optical system as are required to produce desired type sizes from the characters of said font, said drum being rotatable to bring into operative relation with said pointer the em scale corresponding to the adjustment of said optical system.

5. In apparatus for producing justified lines of type matter of desired type size by photographically reproducing in line on a sensitized surface, in the same or reduced or magnified size, the characters of individual character-bearing elements of variant thicknesses successively removed from lines thereof composed from a given type size font of such elements, the combination of a justifying channel from which the elements are removed individually for photographing, a line-follower mechanism movable in steps proportioned to the thickness of each removed element, a holder for the sensitized surface, a mechanical connection between said line-follower mechanism and holder operative to move the sensitized surface in proportion to each step movement of the line-follower, an optical system adjustable to vary the image size of said characters to produce the desired type size from the characters of said font, a line-stop adjustable along said justifying channel to line-measure positions proportionally related to justified lines of type matter of the desired length and type size and movable by said line-follower in response to each removal of an element, a scale-supporting member, an em scale supported by said member and graduated in proportion to the reduction or magnification required to photographically produce the desired type size from the characters of said font, a pointer cooperating with said em scale, line-length selecting means manually operable to relatively move said scale and pointer to set said pointer and scale to indicate in ems the desired length of the line to be produced in the desired type size, and a mechanical train connecting said line-length selecting means and said line-stop and operative to move said line-stop in correspondence with the manually produced relative movement between said pointer and scale, said mechanical train including a first gear mounted on said line-follower mechanism and permanently mechanically connected to said line-stop, a second gear adapted to mesh with the first gear and mounted for rotation about a fixed axis and permanently mechanically connected with said line-length selecting means, said gears being mechanically related to move out of meshing engagement when said line-follower mechanism moves in response to removal of elements from a composed line thereof for photographing.

6. Apparatus as set forth in claim 5 having in addition brake means mounted on said line-follower mechanism and operative to lock said first gear and said line-stop in the manually adjusted position of said line-stop when said first and second gears move out of meshing engagement, and a cam operated brake release operative to release said brake when said gears are moved into meshing engagement after having disengaged during the element-responsive movements of the line-follower.

7. Apparatus as set forth in claim 5 and in which said line-follower mechanism includes an elongated rack rotatably supporting said first gear and slidably supporting said line-stop, a worm screw held against rotation and fixed to said line-stop, but mounted for sliding movement along said rack and threadedly received by said first gear whereby turning of said gear moves said line-stop along said rack, and in which said second gear is mounted on a fixed shaft rotatable by said line-length selecting means, whereby when said gears are in meshing engagement turning of said second gear turns the first gear and moves said worm screw and line-stop along said rack.

8. In apparatus for producing on a sensitized surface a line of type matter by photographing at a photographing position individual character-bearing elements successively removed for such purpose from a composed line of such elements carried in a line-holding channel, in combination, an endless conveyor travelling in a path passing across the leading end of said composed line, a plurality of spaced element-engaging and carrying devices mounted upon said conveyor and advanced by said conveyor in one direction only along said path, each device being freely pivoted on said conveyor and having engaging means projecting therefrom formed to interlock with a part of each element when the device is pivoted toward the element, and means coacting with each device to hold it in interlocking engagement while carrying its element along said path.

9. A conveyor as set forth in claim 8 and in which said path lies in a vertical plane, and each device travels upwardly while in that portion of said path that passes across the leading end of said composed line and while in said portion of said path each device is pivoted below its center of gravity and in said plane and said engaging means is located above said pivot, whereby when a lower part of the engaging means of a device contacts an element while traveling upwardly in said portion of said path, the device pivots and moves an upper part of the engaging means to interlock with the element, and in which there is a fixed vertical guide cooperating with each device when in said portion of said path to hold such device against pivoting and releasing its element.

10. A conveyor as set forth in claim 8 and in which each device is provided with motion limiting means limiting its to and fro pivotal motion, and in which the point of first contact between the engaging means of a device and an element is so located with reference to the pivot point of said device that advancing movement of said conveyor operates automatically to turn the device into interlocking engagement with the element.

11. Apparatus for photographically producing on a sensitized surface successive lines of type matter by photographing character-bearing elements individually removed in succession from composed lines of elements and having thicknesses proportioned respectively to the setwise widths of the characters borne thereby, comprising in combination, selectively adjustable image-altering mechanism operative to change the size of the images of said characters projected on said sensitized surface and so change the point size of the produced type matter, a line-follower movable in steps proportioned to the thicknesses of the elements as they are removed from a composed line, a holder for said sensitized surface, a movable support for said holder, and a mechanical train between said support and line-follower adapted to move said support in steps as the composed line is reduced by the successive removal of elements, said mechanical train including a drive gear operatively interconnected with and rotatable by movement of said line-follower, gear means connected with said support, a removable fixed-ratio gear unit operative to connect mechanically the said drive gear and gear means to move said holder and sensitized surface as and to the extent required to correspond with a given selected adjustment of said image altering mechanism, and mechanism to lock said holder and sensitized surface against movement when said gear unit is removed from said mechanical train for exchange with another gear unit.

12. Apparatus as described in claim 11 and in which said locking mechanism includes the shaft supporting said drive gear and driven by said line-follower, a manually shiftable lever operative to slide said drive gear along said shaft into meshing engagement with said gear means, and a lock for said shaft holding it against rotation except during said element removal, whereby when said drive gear and gear means are in meshing engagement said movable support is locked against movement.

13. Apparatus as described in claim 11 and in which each gear ratio unit comprises spaced supporting plates, a first gear of uniform size operative to mesh with said drive gear, a second gear of uniform size operative to mesh with said gear means, and intermediate gears connecting said first and second gears and selected to give the unit its desired gear ratio, and a locking pin for holding said first and second gears in fixed positions when the unit is removed from said mechanical train, and a part movable by contact with a stationary member as a gear unit is inserted in said mechanical train to withdraw said locking pin.

14. Apparatus for producing on a sensitized surface successive spaced lines of type matter in column form from successively composed and photographed lines of character bearing elements, by individually removing the elements from each successive composed line and photographing them, comprising in combination, image altering mechanism operative to change the size of the images projected on said surface from said elements to change the type size of the produced type matter, a line-follower movable in steps in response to said element removal, a holder for said sensitized surface mechanically connected to said line-follower to move in response thereto, and an adjustable support associated with said holder and operative to position said holder independently of said line-follower to establish the starting position of said holder for each line in accordance with the point size of the type being produced, thereby to provide the same starting margin for a column of type matter regardless of the size of type produced in different lines.

15. Apparatus as set forth in claim 14 and in which a hand wheel is mechanically connected to said adjustable support and is operative to adjust the same upon turning of the wheel, said wheel carrying a scale cooperating with a fixed index to indicate the type size for which the wheel and adjustable support are set, and in which a detent is associated with the hand wheel to assure correct aligning of said wheel and index for each setting of the wheel.

16. In apparatus having instrumentalities for photographically producing on a sensitized surface spaced lines of type matter in columns by photographing character-bearing elements of successive composed lines of such elements, in combination, a main cam shaft whereof each complete revolution operates mechanism which accomplishes the production of one complete line of type matter, said cam shaft being rotated intermittently in steps, one step of said rotation initiating the operation of said instrumentalities on a composed line of elements to carry out the photographing operation, and a succeeding step effecting the return of said instrumentalities to starting condition for operation on the next composed line of elements, a holder for the sensitized surface, line-spacing mechanism movable in steps to advance said surface to present an unexposed portion thereof for receiving the images of the next succeeding composed line of elements, a movable part connected to the line-spacing mechanism to operate said mechanism, an operating member movable from an inactive position to engage and move said movable part, an adjustable stop for limiting the movement of said movable part in accordance with the selected position of said stop, and a cam on said cam shaft to move said operating member during said succeeding step of the rotation of said shaft to engage and move said movable part to effect spacing of the lines at predetermined distances.

17. Apparatus as described in claim 16 and in which said sensitized surface comprises a roll of film, and said line-spacing mechanism includes driving rolls engaging said film, clutch mechanism movable in one direction independent of said rolls, and movable in the opposite direction to drive said rolls, and said movable part being connected to said clutch mechanism and being movable to and fro to move said clutch mechanism in said opposite direction thereby to accomplish a single line-space advance of said film for each combination of to and fro movements, and said adjustable stop determining the limit of said "to" movement, and said cam determining the limit of said "fro" movement, whereby by setting said adjustable stop the desired line-spacing of said film is obtained after the photographing of each composed line of elements has been completed.

18. Apparatus as set forth in claim 17 and in which said sensitized surface is the surface of a sensitized film, said line-spacing mechanism includes driving rolls engaging said film, and an auxiliary manually operable line-spacing mechanism is provided comprising, a lever shiftable manually between a zero position and an adjustable stop having graduated steps and being adjustable to cause a selected step to be engaged by said lever, clutch mechanism connected to said rolls and movable in one direction independently of said rolls and operative when moved in the opposite direction to drive said rolls, and a gear connection between said clutch mechanism and said lever whereby one complete to and fro movement of said lever produces a measured step movement of said film corresponding to the position of the selected step of said adjustable stop.

19. In apparatus for photographically producing on a sensitized surface a line of type matter by photographing character-bearing elements composed into a line, in combination, a fixed guideway, a channel operative to support a composed line of elements with the leading element against said guideway, element-removing means movable in one direction only along said guideway and operative to remove the elements successively from the leading end of the line and present them momentarily at rest at a photographing position and thence at a discharging position, a line-follower movable in response to each element removal, a mechanical drive operative to advance said sensitized surface and engageable with said line-follower, said line-follower and mechanical drive being movable from separate starting positions, cam means for returning said line-follower and mechanical drive to their respective starting positions after removal of the last line element, releasable stop means for holding said mechanical drive at its starting position after said line-follower has moved from its starting position to deliver a composed line of elements to said channel and before a line element has been removed, driving means for driving said element-removing means, a first control synchronized with releasing movement of said releasable stop to start said driving means, and a control responsive to movement of said line-follower after removal of the last line element to set in operation said cam means, and a mechanical connection between said cam means and driving means operative to stop said driving means when said cam means acts to return said line-follower and mechanical drive to their respective starting positions.

20. Apparatus as described in claim 19 and in which said driving means include a start and stop lever, and said first control includes a distributor elevator which when moved to a receiving position to receive photographed elements from said guideway causes said lever to move into its starting position, and when moved from said receiving position causes said lever to move into its stopping position, and in which said mechanical connection includes a cam shaft operative to move said distributor into and out of said receiving position.

21. In apparatus for producing justified lines of type matter of desired type size by photographically reproducing in line on a sensitized surface the same, or reduced, or magnified size the characters of individual character-bearing elements successively removed from lines thereof composed from a given type size font of such elements the combination of, a justifying channel from which the elements are removed individually for photographing, line-follower mechanism movable in steps proportioned to a dimension of each element removed, a holder for the sensitized surface, a mechanical connection between said line-follower mechanism and holder operative to move the sensitized surface in proportion to each step movement of the line-follower mechanism, an optical system adjustable to vary the image size of said characters to produce the desired type size from the character of said font, ratio-changing mechanism in said mechanical connection operative to adjust the motion of said holder produced by a given motion of said line-follower mechanism to match the adjustment of said optical system, and said line-follower mechanism including a line-stop adjustable along said justifying channel to line-measure positions proportionally related to justified lines of type matter of the desired length and type size and movable with said line-follower mechanism in response to said element removal, a drum supporting a plurality of em scales, each em scale being graduated in proportion to a particular image size obtained by adjustment of said optical system, said drum being manually rotatable to expose the desired em scale, a pointer cooperating with the selected em scale, line-length selecting means manually operable to relatively move said scale and pointer to set the relation between said pointer and scale to indicate the desired length in ems of the line to be produced in the type size corresponding to the selected scale and optical system adjustment, and a mechanical train connecting said line-length selecting means and said line-stop and operative to move said line-stop in correspondence with the manually produced relative movement between said pointer and scale.

22. Apparatus constructed in accordance with claim 21 and in which said ratio-changing mechanism comprises a gear connected with and rotatable by movement of said line-follower mechanism, gear means connected with said holder, a removable gear ratio unit operative to mechanically connect said gear and gear means in accordance with a selected gear ratio, and mechanism locking said gear and gear means against movement when said gear unit is removed for exchange with a gear unit having a different gear ratio.

23. Apparatus constructed in accordance with claim 21 and which include means associated with said holder and movable independently of said mechanical connection to adjust the starting position of said holder to the type size of the type matter being produced, thereby to adjust the starting margin of each line of produced type matter.

24. A conveyor as set forth in claim 8, in which said path is disposed transversely of the line-holding channel and each element-engaging device moves along said path in a direction such that a portion thereof encounters a portion of the leading element of said composed line lying in its path, and in which said device is pivotally mounted to rock and is formed to embrace the encountered portion of the leading element that lies in its path as the device advances from element encountering position along said path by the travel of said endless conveyor, said device upon embracing the element operating to move it along said path to the photographing position and subsequently to release the element.

25. In apparatus for photographically producing lines of type matter by photographing individually character-bearing elements, in combination, a film holder supporting a photosensitive film, element-moving mechanism for moving successive character-bearing elements into a photographing position on an optical axis passing through said film, film holder-moving mechanism for moving said holder and film stepwise past said photographing position, an apertured rotary shutter mounted for rotation between said film and said photographing position, a safety shutter normally positioned in registry with said optical axis and movable away from said axis in timed relation with movement of the first of said successive character-bearing elements to photographing position, driving means for driving said apertured shutter, said element-moving mechanism and said film holder-moving mechanism in timed relation to cause successive character-bearing elements to move into said photographing position to be photographed on said film, a blank-out shutter movable from a normal position away from the optical axis to a position across said axis and a manually operated element mechanically connected to said blank-out shutter and manually movable from a normal position to a blank-out position to cause said blank-out shutter to move across said axis to close said axis during the movement past said photographing position of a line of said elements when it is desired to prevent photographing of a line of said elements.

26. In apparatus for photographically producing lines of type matter by photographing individually character-bearing elements removed in succession from successively composed lines of said elements, in combination, a film holder supporting a photosensitive film, element-moving mechanism for moving successive elements of a line of said elements into a photographing position on an optical axis passing through said film, an apertured rotary shutter mounted for rotation between said film and said photographing position, driving means for rotating said shutter and intermittently driving said element-moving mechanism in timed relation to cause successive character-bearing elements to move into said photographing position and be photographed on said film, a blank-out shutter movable from a normal position away from the optical axis to a position across said axis, and a manually operated element mechanically connected to said blank-out shutter and manually movable from a normal position to a blank-out position to cause said blank-out shutter to move across said axis to close said axis during the movement past said photographing position of a line of said elements when it is desired to prevent photographing of a line of said elements.

27. In apparatus for photographically producing lines of type matter by photographing character-bearing elements of successively composed lines of said elements, in combination, a film holder for supporting a photosensitive film, element-moving mechanism for moving said elements into a photographing position on an optical axis passing through said film, an apertured rotary shutter mounted for rotation between said film and said photographing position, driving means for rotating said shutter and intermittently driving said element-moving mechanism in timed relation to cause said character-bearing elements to move into said photographing position and be photographed on said film, a blank-out shutter movable from a normal position away from the optical axis to a position across said axis, a manually operated element mechanically connected to said blank-out shutter and manually movable from a normal position to a blank-out position to cause said blank-out shutter to move across said axis to close said axis when it is desired to prevent photographing of a line of said elements, and reset mechanism conditioned for operation by movement of said manually operated element from said normal position to said blank-out position and operable in timed relation to completion of the photographing of a line of elements at said photographing position to restore said manually operated element and said blank-out shutter to said normal position.

28. In apparatus for photographically producing lines of type matter by photographing individually character-bearing elements removed in succession from successively composed lines of said elements, in combination, a film holder for supporting a photosensitive film, element-moving mechanism for moving successive elements of a line of said elements into a photographing position on an optical axis passing through said film, an apertured rotary shutter mounted for rotation between said film and said photographing position, driving means for rotating said shutter and intermittently driving said element-moving mechanism in timed relation to cause successive character-bearing elements to move into said photographing position and be photographed on said film, a blank-out shutter movable from a normal position away from the optical axis to a position across said axis, a manually operated element mechanically connected to said blank-out shutter and manually movable from a normal position to a blank-out position to cause said blank-out shutter to move across said axis to close said axis when it is desired to prevent photographing of a line of said elements, reset mechanism conditioned for operation by movement of said manually operated element from said normal position to said blank-out position and operable in timed relation to passage of the last element of a line of elements through said photographing position to restore said manually operated element and said blank-out shutter to said normal position, and manually operated reset inactivating mechanism mechanically related to said reset mechanism and movable at will from a normal position to an inactivating position to prevent operation of said reset mechanism when it is desired to prevent photographing of more than one line of said elements.

29. In apparatus for photographically producing lines of type matter by photographing individually character-bearing elements removed in succession from successively composed lines of said elements, in combination, a film holder supporting a photosensitive film, element-moving mechanism for moving successive elements of a line of said elements into a photographing position on an optical axis passing through said film, an apertured rotary shutter mounted for rotation between said film and said photographing position, driving means rotating said shutter and intermittently driving said element-moving mechanism in timed relation to cause successive character-bearing elements to move into said photographing position and be photographed on said film, a blank-out shutter movable from a normal position away from the optical axis to a position across said axis, a manually operated element mechanically connected to said blank-out shutter and manually movable from a normal position to a blank-out position to cause said blank-out shutter to move across said axis to close said axis when it is desired to prevent photographing of a line of said elements, reset mechanism conditioned for operation by movement of said manually operated element from said normal position to said blank-out position and operable in timed relation to passage of the last element of a line of elements through said photographing position to restore said manually operated element to said normal position, and manually operated reset inactivating mechanism mechanically related to said reset mechanism and movable at will from a normal position to an inactivating position to prevent operation of said reset mechanism when it is desired to prevent photographing of more than one line of said elements, said manually operated element being manually returnable to its normal position whether or not said reset inactivating mechanism has been actuated and including a part which actuates said reset inactivating mechanism as said manually operated element is moved back to its normal position, to restore said reset inactivating mechanism to its normal position.

30. In apparatus for photographically producing lines of type matter by photographing character-bearing elements of sucessively composed lines of said elements, in combination, a channel for supporting a composed line of elements, element-moving mechanism for moving said elements to a photographing position, photographing means including a movable sensitized surface and optical axis, an apertured rotary shutter, driving means for rotating said shutter and intermittently driving the element-moving means in timed relation with the shutter aperture crossing the optical axis, a holder for holding said sensitized surface, line-advancing mechanism for advancing the sensitized surface in said holder upon completion of the photographing of each composed line of said elements, a blank-out shutter movable from a normal position away from the optical axis to a position across said axis to prevent photographing of a composed line of elements, holding mechanism movable to an active position to engage and hold said line-advancing mechanism inoperative, and a manually operated element mechanically connected to said blank-out shutter and said holding mechanism and operative when moved from a normal position to a blank-out position to move said shutter into axis-closing position and said holding mechanism into active position when it is desired to prevent photographing of a line of elements.

31. In apparatus for photographically producing lines of type matter by photographing individually character-bearing elements removed in succession from successively composed lines of said element, in combination, a channel for supporting a composed line of elements, a guideway extending transversely from said channel, element-moving mechanism for moving said elements singly from the end of the line adjacent said guideway along the guideway to a photographing position, photographing means including a movable sensitized surface and an optical axis, an apertured rotary shutter, driving means for rotating said shutter and intermittently driving the element-moving means in timed relation with the shutter aperture crossing the optical axis, a holder for holding said sensitized surface and moving it from an initial position in steps as each of said elements is photographed, holder-return mechanism for moving said holder back to said initial position when the last element of a line has been photographed, line-advancing mechanism for advancing the sensitized surface in said holder upon completion of the photographing of each composed line of said elements, a blank-out shutter movable from a normal position away from the optical axis to a position across said axis to prevent photographing of a composed line of elements, holding mechanism movable to an active position to engage and hold said line-advancing mechanism inoperative, a manually operated element mechanically connected to said blank-out shutter and said holding mechanism and operative when moved from a normal position to a blank-out position to move said shutter into axis-closing position and said holding mechanism into active position when it is desired to prevent photographing of a line of elements, and reset mechanism conditioned for operation by movement of said manually operated element to its blank-out position and actuated by the return movement of said holder to said initial position to restore said manually operated element to its normal position.

32. Apparatus according to claim 31 and wherein said line-advancing mechanism includes an element engaging and retaining said holding mechanism in its active position when said manually operated element is restored to said normal position and until said line-advancing mechanism has been reactivated.

33. In apparatus for photographically producing lines of type matter by photographing individually character-bearing elements removed in succession from successively composed lines of said element, in combination, a channel for supporting a composed line of elements, a guideway extending transversely from said channel and adapted to receive elements from said composed line, element-moving mechanism for moving said elements singly from the end of the line adjacent said guideway along the guideway to a photographing position, photographing means including a movable sensitized surface and an optical axis, an apertured rotary shutter, driving means for rotating said shutter and intermittently driving the element-moving means in timed relation with the shutter aperture crossing the optical axis, a holder for holding said sensitized surface and moving it in steps from an initial position as each of said elements is photographed, holder-return mechanism for moving said holder back to said initial position when the last element of a line has been photographed, line-advancing mechanism for advancing the sensitized surface in said holder upon completion of the photographing of each composed line of said elements, a blank-out shutter movable from a normal position away from the optical axis to a position across said axis to prevent photographing of a composed line of elements, holding mechanism movable to an active position to engage and hold said line-advancing mechanism inoperative, a manually operated element mechanically connected to said blank-out shutter and said holding mechanism and operative when moved from a normal position to a blank-out position to move said shutter into axis-closing position and said holding mechanism into active position when it is desired to prevent photographing of a line of elements, reset mechanism conditioned for operation by movement of said manually operated element to its blank-out position and actuated by the return movement of said holder to said initial position to restore said manually operated element to its normal position, and reset inactivating mechanism including a manually movable element movable from a normal position to an inactivating position and by its movement causing said inactivating mechanism to engage said reset mechanism and prevent operation thereof when it is desired to prevent photographing of more than one line of elements.

34. Apparatus as claimed in claim 33 and wherein the manually operated element is movable from its blank-out position to its normal position whether or not said reset inactivating mechanism has been operated, there being provided a part cooperative with said reset inactivating mechanism and actuated by said manually operated element upon movement thereof from its blank-out position to its normal position to restore said reset inactivating mechanism to its normal position.

35. In a machine of the class described in which character-bearing elements are released from a storage station to form composed lines of elements and are thereafter passed through photographing mechanism for exposure of their respective characters in line to a sensitized surface, in combination, a structural framework having mounted thereon in orderly relation the element-storage station, element-releasing and line-composing devices and a channel for supporting a composed line of elements, said channel having an outlet end, a line-moving member movable along said channel for advancing the composed line of elements toward said outlet end, a housing hingedly supported on said framework, said housing having mounted therein the photographing mechanism and element-feeding mechanism operative to remove elements individually from the outlet end of the channel to a photographing position when said housing is in operating relation with said channel, a holder for the sensitized surface mounted on said housing, operating connections between the line-moving member and said holder for moving the latter in response to advances of the line of elements upon each removal of an element by said feeding mechanism, and locking mechanism operative upon the swinging of said housing out of operating relation with said channel to lock said holder against movement.

36. In a machine of the class described in which character-bearing elements are released from a storage station to form composed lines of elements and are thereafter passed through photographing mechanism for exposure of their respective characters in line to a sensitized surface, in combination, a structural framework having mounted thereon in orderly relation the element-storage station, element-releasing and line-composing devices and a channel for supporting a composed line of elements, said channel having an outlet end, a line-moving member movable along said channel for advancing the composed line of elements toward said outlet end, a housing hingedly supported on said framework, said housing having mounted therein the photographing mechanism and element-feeding mechanism operative to remove elements individually from the outlet end of said channel to a photographing position when said housing is in operating relation with said channel, a holder for the sensitized surface mounted on said housing, operating connections between the line-moving member and said holder for moving the latter in response to advances of the line of elements upon each removal of an element by said feeding mechanism, line-counting mechanism mounted in said housing and actuated each time a line of characters is photographed to record the number of lines produced, and locking mechanism operative upon the swinging of the housing out of operating relation with said channel to lock said holder against movement and hold inoperative the line-counting mechanism.

37. In a machine of the class described in which character-bearing elements are released from a storage station to form composed lines of elements and are thereafter passed through photographing mechanism for exposure of their respective characters in line to a sensitized surface, in combination, a structural framework having mounted thereon in orderly relation the element-storage station, element-releasing and line-composing devices and a channel for supporting a composed line of elements, said channel having an outlet end, a line-moving member movable along said channel for advancing the composed line of elements toward said outlet end, a housing hingedly supported on said framework, said housing having mounted therein the photographing mechanism and element-feeding mechanism operative to remove elements individually from the outlet end of said channel to a photographing position when said housing is in operating relation with said channel, a holder for the sensitized surface mounted on said housing, operating connections between the line-moving member and said holder for moving the latter in response to advances of the line of elements upon each removal of an element by said feeding mechanism, line-counting mechanism mounted in said housing and actuated each time a line of characters is photographed to record the number of lines produced, line blank-out mechanism including a manually operated member movable to an active position when desired to prevent photographing of the line of elements passing through the photographing position, and counter inactivating mechanism mechanically associated with said line-counting mechanism and said manually operated member to hold the line-counting mechanism inoperative when said member is moved into its active position.

38. In a machine of the class described in which character-bearing elements are released from a storage station to form composed lines of elements and are thereafter passed through photographing mechanism for exposure of their respective characters in line to a sensitized surface, in combination, a structural framework having mounted thereon in orderly relation the element-storage station, element-releasing and line-composing devices and a channel for supporting a composed line of elements, said channel having an outlet end, a line-moving member movable along said channel for advancing the composed line of elements toward said outlet end, a housing hingedly supported on said framework, said housing having mounted therein the photographing mechanism and element-feeding mechanism operative to remove elements individually from the outlet end of said channel to a photographing position when said housing is in operating relation with said channel, a holder for the sensitized surface mounted on said housing, operating connections between the line-moving member and said holder for moving the latter in response to advances of the line of elements upon each removal of an element by said feeding mechanism, line-counting mechanism mounted in said housing and actuated each time a line of characters is photographed to record the number of lines produced, line blank-out mechanism including a manually operated member movable to an active position when desired to prevent photographing of a line of elements passing through said photographing position, first locking mechanism operative upon the swinging of said housing out of operating relation with said channel to lock said holder against movement, second locking mechanism operative upon swinging said housing out of operative relation with said channel to lock said line-counting mechanism and third locking mechanism mechanically associated with said line-counting mechanism and said manually movable member for inactivating said line-counting mechanism when said member is moved into its active position to prevent counting of a blanked-out line.

39. In a machine of the class described in which character-bearing elements are released from a storage station to form composed lines of elements and are thereinafter passed through photographing mechanism for exposure of their respective characters in line to a sensitized surface, in combination, a structural framework having mounted thereon in orderly relation the element-storage station, element-releasing and line-composing devices and a channel for supporting a composed line of elements, said channel having an outlet end, a line-moving member movable along said channel for advancing the composed line of elements to said outlet end, a housing hingedly supported on said framework, said housing having mounted therein the photographing mechanism and element-feeding mechanism operative to remove elements individually from the outlet end of said channel to a photographing position when said housing is in operating relation with said channel, a holder for the sensitized surface mounted on said housing and operating connections between the line-moving member and said holder for moving the latter in response to advances of the line of elements upon each removal of an element by said feeding mechanism, line-counting mechanism mounted in said housing for recording the number of lines produced, a lock holding the line-moving member in a position such that the leading line element is at the outlet end of said channel, mechanism operating to release the line-moving member lock in timed relation to the removal of the leading line element by the element-feeding mechanism, and mechanism operating in response to release of said lock to actuate said line-counting mechanism to record the production of a line.

40. In apparatus for photographically producing lines of type matter by photographing character-bearing elements composed into a line, in combination, a film holder supporting a photo-sensitive film, element-moving mechanism for moving the elements of a composed line into a photographing position on an optical axis passing through said film, film holder-moving mechanism for moving said holder and film past said photographing position, driving means for driving said element-moving mechanism and said film holder-moving mechanism in timed relation to cause the respective elements of the composed line to move into said photographing position and be photographed on said film, a blank-out shutter movable from an inactive position to a position across said axis and a manually operated element mechanically connected to said blank-out shutter and manually movable from a normal position to a blank-out position to cause said blank-out shutter to move across said axis to close said axis during the movement past said photographing position of a line of said elements when it is desired to prevent photographing of a line of elements.

41. In apparatus for photographically producing on a sensitized surface a line of type matter by photographing individually character-bearing elements composed into a line with spacer elements, said elements having body thicknesses proportioned to the setwise widths of characters and spaces represented thereby, in combination a channel supporting a composed line of such elements, a guideway at one end of said channel providing a path extending therefrom to a photographing position, element-removing means movable in one direction and operative to engage and move the elements singly from the composed line along said guideway to said photographing position, a line-follower movable from a starting position in steps proportioned to the thickness of each element removed, a line-length determining member adjustable relative to said guideway, line-justifying means movable to justify the composed line between said guideway and line-length determining member, a cam shaft for operating said line-justifying means and a releasable stop normally holding said line-follower at its starting position, said cam shaft being operative to start said element-removing means in operation subsequent to said line-justifying operation and the release of said stop, and a control responsive to the removal of the last line element immediately to start said cam shaft, and said cam shaft when so started operating to stop said element-removing means after the last line element is photographed.

42. Apparatus for photographically producing on a sensitized surface a line of type matter by photographing individually character-bearing elements composed into a line, in combination, a guideway, a channel for supporting a composed line of elements with the leading element against said guideway, element-moving means positioned to operate along said guideway and adapted to engage and remove successive leading elements individually from the adjacent end of the line and to present each element at a photographing position, a line-follower responsive to each removal of an element to advance with the remaining elements toward said guideway until all of the elements are removed, photographing means including an optical axis and a rotary shutter having an aperture for exposing the character of an element each time said aperture crosses said axis, a safety shutter movable by the first removed element to a position out of said optical axis, a sensitized surface for receiving the successive photographic impressions and movable under control of the line-follower as the latter advances in response to each removal of an element, a blank-out shutter movable at will to a position in registry with the optical axis to prevent when desired the exposure of a line of elements, and locking means responsive to movement of said blank-out shutter to axis closing position to hold the sensitized surface stationary as the follower advances during removal and presentation of the elements of the line at the photographing position.

43. Apparatus for photographically producing on a sensitized surface a line of type matter by photographing individually character-bearing elements composed into a line, in combination, a support for holding successive composed lines of elements, periodically operable element-moving means movable intermittently in one direction across one end of said support and constructed and arranged to engage and remove the elements individually from the end of the line adjacent to the element-moving means, said means being operative to present each element momentarily at rest for exposure at a photographing position and thereafter to remove the element from such position, a line-follower releasable from a starting position related to the length of the composed line of elements and movable in steps in response to each removal of an element, photographing means including an optical axis and an apertured rotary shutter, driving means for rotating said shutter and intermittently driving the element-moving means in timed relation with each crossing of the optical axis by the shutter aperture, a safety shutter normally maintaining the optical axis closed, a first member movable by each first element removed from the line to move said safety shutter to axis opening position, a second member movable in response to absence of an element at said photographic position to move said shutter to close said axis, and control means operable after release of the line-follower to start said driving means and then after removal of the last line element from the photographing position to stop the driving means.

44. Apparatus for photographically producing on a sensitized surface a line of type matter by photographing individually character-bearing elements composed into a line, in combination, a guideway, a channel for supporting a composed line of elements with the leading element against said guideway, intermittently operable element-moving means for removing the elements successively from the end of the line adjacent to said guideway and operative to move each such element to a photographing position and momentarily hold it at rest for photographic exposure and then to move it to a discharging position and to hold it at rest for discharge, a line-follower movable in response to each removal of an element, photographing means including the sensitized surface and an optical axis, mechanical connections between the line-follower and the sensitized surface for advancing said surface step-by-step across the optical axis to photograph in line the successive characters of the elements, an apertured rotary shutter, driving means for rotating said shutter and for operating the element-moving means in timed relation with the shutter aperture crossing the optical axis, safety shutter means maintaining the optical axis closed so long as the element-moving means moves without moving an element to the photographing position, said safety shutter means including a member acuated by the first element removed from a composed line into photographing position to open the safety shutter means and including also mechanism responsive to the absence of an element at the photographing position to close said safety shutter means, and a blank-out shutter movable at will from a normal axis opening position to a position for closing the optical axis when said safety shutter is open, whereby to prevent the photographing of a line of elements, when desired.

45. Apparatus for photographically producing on a sensitized surface a line of type matter by photographing individually character-bearing elements composed into a line, in combination, a feed channel, a channel for supporting a composed line of elements with the leading element at said feed channel, element-removing means movable progressively in one direction and including a series of spaced parts operative to inter-engage and move successive leading elements singly from the composed line to a photographing position, and to a discharging position, photographing means, and discharging means, line-follower means movable from a starting position in steps proportioned to the thickness of each element as it is removed, a drive for driving said photographing and discharging means and for driving said element-removing means intermittently with dwells timed with arrival of the elements for photographing and discharging, releasable stop means holding said line-follower means at a starting position, control mechanism synchronized with the releasing operation of said releasable stop means to start said drive, and control mechanism responsive to the removal of the last line element and synchronized with the discharge of said element to stop said drive.

46. Apparatus for photographically producing on a sensitized surface a line of type matter by photographing individually character-bearing elements composed into a line, in combination, a guideway, a channel for supporting a composed line of elements with the leading element at said guideway, element removing means movable progressively in one direction including a series of spaced parts inter-engaging and moving successive leading elements singly from the composed line to photographing and discharging positions respectively, photographing and discharging means, receiving means movable to and from a receiving position to receive elements discharged from said discharging position, line-follower means movable from a starting position in steps in response to each removal of an element, driving means for driving said photographing and discharging means and for driving said element-removing means intermittently and in timed relation for the photographing and discharging operations, and control mechanism actuated by movement of said receiving means into receiving position to start said drive, and actuated by movement of said receiving means from receiving position to stop said drive.

47. Apparatus for photographically producing on a sensitized surface a line of type matter by photographing individually character-bearing elements composed into a line, in combination, a guideway, a channel for supporting a composed line of elements with the leading element at said guideway, a line-delivery device movable to deliver a composed line to said channel, element-removing means movable progressively in one direction including a series of spaced parts inter-engaging and moving successively leading elements singly from the composed line to photographing and discharging positions respectively, photographing and discharging means, receiving means movable to and from a receiving position to receive elements discharged from said discharging position, line-follower means engageable by said line-delivery device and movable from a starting position in steps in response to each removal of an element, a releasable stop normally holding said line-follower means in a starting position, driving means driving said photographing and discharging means and driving said element-removing means intermittently and in timed relation for the photographing and discharging operations, and control mechanism responsive to movement of said receiving means into receiving position to start said drive, and responsive to movement from receiving position to stop said drive, a drive mechanism movable progressively from a starting position to an intermediate position and back to said starting position and operative to move said releasable stop and said receiving means in fixed timed relation, switch means responsive to movement of said line-delivery device to initiate movement of said drive mechanism to its intermediate position during which movement it moves said receiving means into receiving position, and said releasable stop from holding position, and responsive to movement of said line-follower means by removal of the last line element to initiate movement of said drive mechanism to its starting position during which movement it moves said receiving means from receiving position timed with the discharge of the last line element.

48. Apparatus for photographically producing on a sensitized surface a line of type matter by photographing individually character-bearing elements composed into a line, in combination, a guideway, a channel for supporting a composed line of elements with the leading element at said guideway, a line-delivery device movable to deliver a composed line to said channel, element-removing means movable progressively in one direction including a series of spaced parts inter-engaging and moving successive leading elements singly from the composed line to photographing and discharging positions respectively, photographing and discharging means, receiving means movable to and from a receiving position to receive elements discharged from said discharging position, line-follower means movable from a starting position in steps in response to each removal of an element, driving means for driving said photographing and discharging means and for driving said element-removing means intermittently and in timed relation for the photographing and discharging operations, and control mechanism responsive to movement of said receiving means into receiving position to start said drive, and responsive to movement from receiving position to stop said drive, drive mechanism movable in steps from a starting position to an intermediate position and back to said starting position and operative to move said receiving means to and from its receiving position, switch means responsive to movement of said line-delivery device to initiate movement of said drive mechanism to its intermediate position during which movement it moves said receiving means into receiving position, and responsive to movement of said line-follower means by removal of the last line element to initiate movement of said drive mechanism to its starting position during which movement it moves said receiving means from receiving position after discharge of the last line element.

49. In apparatus for photographically producing on a sensitized surface a line of type matter justified to a desired length by photographing character-bearing elements composed into a line and having thicknesses proportioned to the setwise width of the characters borne thereby, in combination, a guideway, a channel for supporting a composed line of elements for movement bodily endwise toward said guideway, a line delivery device constructed to deliver each composed line to said channel, element-moving means movable along said guideway for engaging and moving the elements singly from the end of the line at said guideway and advancing them to photographing and discharging positions along said guideway, means for photographing each element at the photographing position, means for discharging each element at the discharging position, a line-follower movable in steps proportioned to the thickness of each element moved from a composed line in said channel, a sensitized surface proportionally moved by said line-follower from a starting position, a releasable stop normally holding the line-follower and sensitized surface at starting positions, justifying means for justifying the line between said guideway and said line-follower, while the latter is held by said releasable stop, element-receiving means movable to and from a receiving position at said discharging position, a common drive movable from a starting to an intermediate position to move said justifying means into justifying position, said releasable stop into releasing position and said receiving means into receiving position, and movable from said intermediate to said starting position to move said justifying means out of justifying position, said receiving means out of receiving position, said releasable stop into holding position and said sensitized surface, line-follower and line-delivery devices to their starting positions all in timed sequence, drive means driving said element-removing, photographing, and discharging means, control means responsive to movement of a part moved by said common drive to start said drive means after releasing movement of said releasable stop, and to stop said drive means after discharge of the last line element, and switch means responsive to line-delivery movement of said line-delivery device to initiate movement of said common drive to its intermediate position, and responsive to removal of the last line element to initiate movement of said common drive to its starting position.

50. Apparatus for photographically producing on a sensitized surface a column of lines of type matter by photographing individually character-bearing elements of successively composed lines thereof, in combination, a channel for supporting a composed line of elements, element moving means for successively removing the leading elements from one end of said line to a photographing position, line-follower means movable from a starting position in response to each removal of an element, photographing means including a fixed optical axis and a holder for the sensitized surface, said holder being movable in steps from a starting position in response to the movements of said line-follower means to present to said axis aligned fresh portions of the sensitized surface for receiving in line the successive photographic impressions, mechanical means operative to return the holder and line-follower means to their starting positions, a device responsive to removal of the last line element to set said mechanical means in operation, and line-spacing mechanism for advancing the sensitized surface columnwise for line spacing, said line-spacing mechanism comprising feed rolls, an adjustable member determining the amount of advance for line spacing, a driving element movable to and from said adjustable member, the amount of its movement being determined by the adjustment of said member, a slip-clutch connected with said feed rolls and driving element, and operative to disconnect said driving element and feed rolls during one direction of movement of the driving element and to connect the feed rolls and driving element during its reverse movement.

51. Apparatus for photographically producing on a sensitized surface successive lines of type matter by photographing character-bearing elements of successive composed lines thereof, in combination, a channel for supporting a composed line of elements, element-removing means removing successive leading elements from said line to a photographing position, photographing means including lens means and a holder for the sensitized surface, line-follower means movable from a starting position in response to the removal of each element from a composed line, means supporting said holder for movement in response to each advance of the line-follower means as the successive elements are removed, means for adjusting said lens means relatively to the photographing position to produce on adjacent fresh areas of the sensitized surface projected images in enlarged or reduced sizes, as desired, a movable member controlling the movement of said film holder and driven by said line-follower means from a starting position related to the position of said line-follower before removal of the first line element, said member correlating the line-starting and line-ending positions of the holder and line-follower means and accordingly the relative positions of the images produced in line on the sensitized surface, and adjustable ratio driving mechanism for moving said member in proportion to movement of the line-follower means and adjustable to select the extent of the successive responsive movements of the holder in conformity with the enlargement or reduction of the projected images, line-spacing mechanism for advancing the sensitized surface for line-spacing after each composed line is photographed, said mechanism including an adjustable member, a driving element alternately movable in opposite directions, and the extent of said movement being determined by the position of said adjustable member, and a friction clutch connecting said driving element and said sensitized surface, and operative to provide free relative movement between said sensitized surface and driving element when the latter moves in one direction, and to provide driving engagement therebetween when the driving element moves in the other direction, thereby to provide the line spacing.

52. In a photo-composing machine in which character-bearing elements are manually released from a magazine to form a composed line of elements which thereafter passes through successive mechanisms which individually photograph the elements, produce a justified line of type matter from each composed line and redistribute the elements into the magazine, in combination, a main framework supporting conventional storage mechanism, assembling mechanism and distributing mechanism, and having a section for justifying a composed line of elements, said section having a transverse element-supporting channel therein and a rack movable relative to said section as each element of a composed line is removed for photographing; a housing supporting photographing mechanism and element-feeding mechanism, and having a feed channel adapted to align with and extend at right angles to said transverse channel, said housing having an opening therein for receiving said rack, and a bracket carried by said main framework for supporting said housing, said housing being readily movable on said bracket away from said framework thereby to expose portions of said housing for cleaning and adjustment.

53. Apparatus for photographically producing on a sensitized medium a line of type matter by photographing individually character-bearing elements composed into a line, in combination, a guideway, a channel for supporting a composed line of elements with the leading element at said guideway, element-moving means movable intermittently in one direction for removing each successive leading element from the composed line along said guideway to a photographing position and momentarily holding it at rest for photographic exposure, a line-follower movable in response to each element removal, photographing means including the sensitized surface and an optical axis, mechanism under control of said line-follower for advancing said sensitized surface step by step across the optical axis to photograph in line the characters of the successively removed elements, an apertured rotary shutter, driving means for rotating said shutter and intermittently driving the element-moving means in timed relation with the shutter aperture crossing the optical axis, a manually operable blank-out shutter movable from a normal position away from said optical axis to a position across the optical axis to prevent the photographing of a composed line of elements, and mechanism set in motion by movement of the last line element from the guideway to return said blank-out shutter to its normal position.

54. Apparatus for photographically producing on a sensitized surface a line of type matter by photographing individually character-bearing elements composed into a line, in combination, a channel for supporting a composed line of elements, intermittently movable element-removing means including driving means for successively moving each leading element from said line to a photographing position and holding each such element momentarily at rest at said photographing position, a line-follower movable in response to each removal of an element from said line, photographing means including lens means and a movable holder for the sensitized surface, said lens means being adjustable to produce on said surface characters of the same size as the characters on said elements or of enlarged or reduced size, a movable member mechanically connected to and movable by the line-follower and providing a support fixing the line-starting position of the holder relative to the starting position of said line-follower and moving said holder in proportion to movement of said line-follower to space the successive images in line on the sensitized surface, an adjustable mechanical connection between the line-follower and said movable member adjustable to change the ratio of the movement of the movable member and holder produced by a given movement of said line-follower in accordance with the magnification of the type produced, and manually movable means movable to lock said movable member prior to disengaging said mechanical connection to effect its adjustment.

55. Apparatus for photographically producing on a sensitized surface a line of type matter by photographing individually character-bearing elements composed into a line, in combination, a channel for supporting a composed line of elements, a guideway extending transversely from said channel, the leading element of said line being positionable at said guideway, element-moving means for moving the elements singly from the end of the line adjacent said guideway along the guideway to a photographing position, photographing means including a movable sensitized surface and an optical axis, an apertured rotary shutter, driving means for rotating said shutter and intermittently driving the element-moving means in timed relation with the shutter aperture crossing the optical axis, a holder for holding said sensitized surface and moving it in steps for each exposure by said shutter, thereby to produce in line on said sensitized surface the characters of a composed line of elements and line advancing mechanism for advancing said sensitized surface in said holder for the photographing of each composed line of elements, a blank-out shutter movable from a normal position away from the axis to a position across the axis to prevent photographing of a composed line of elements, and holding mechanism rendering said line-advancing mechanism inoperative to advance the sensitized surface when said blank-out shutter is moved to its axis closing position.

HERMAN R. FREUND.
FRITZ STADELMANN.

REFERENCES CITED

The following references are of record in the file of this patent:

UNITED STATES PATENTS

| Number | Name | Date |
|---|---|---|
| 1,884,169 | Owens | Oct. 25, 1932 |
| 2,207,265 | Ogden | July 9, 1940 |
| 2,356,620 | Schade | Aug. 22, 1944 |
| 2,391,021 | Klingberg et al. | Dec. 18, 1945 |